(12) United States Patent
Tyan et al.

(10) Patent No.: US 8,459,726 B2
(45) Date of Patent: Jun. 11, 2013

(54) MULTI-CORNERED STRENGTHENING MEMBERS

(75) Inventors: Tau Tyan, Northville, MI (US); Yu-Kan Hu, Ypsilanti, MI (US); Leonard Anthony Shaner, New Baltimore, MI (US); Jiamaw Doong, Northville, MI (US); Kirk David Arthurs, Newport, MI (US); Senthil Kumar Mahadevan, Sterling Heights, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 53 days.

(21) Appl. No.: 13/087,663

(22) Filed: Apr. 15, 2011

(65) Prior Publication Data

US 2012/0261949 A1    Oct. 18, 2012

(51) Int. Cl.
*B60R 19/34* (2006.01)
*B60R 21/00* (2006.01)
*B21D 53/00* (2006.01)

(52) U.S. Cl.
USPC ............... 296/187.03; 296/133; 296/205

(58) Field of Classification Search
USPC ... 296/187.03, 187.09, 205; 293/133; 52/836, 52/846; 703/1, 6; 29/897.2, 602.1
See application file for complete search history.

(56) References Cited

U.S. PATENT DOCUMENTS

| | | | |
|---|---|---|---|
| 1,951,292 A * | 3/1934 | Cahill | 405/278 |
| 2,340,003 A | 1/1944 | McDermott | |
| 3,092,222 A | 6/1963 | Heinle | |
| 3,412,628 A * | 11/1968 | De Gain | 74/492 |
| 4,018,055 A | 4/1977 | Le Clercq | |
| 5,431,445 A | 7/1995 | Wheatley | |
| 5,480,189 A | 1/1996 | Davies et al. | |
| 5,913,565 A | 6/1999 | Watanabe | |
| 6,068,330 A * | 5/2000 | Kasuga et al. | 296/187.09 |
| 6,179,355 B1 * | 1/2001 | Chou et al. | 293/132 |
| 6,523,576 B2 * | 2/2003 | Imaeda et al. | 138/121 |
| 6,588,830 B1 | 7/2003 | Schmidt et al. | |
| 6,705,653 B2 | 3/2004 | Gotanda | |
| 6,752,451 B2 | 6/2004 | Sakamoto et al. | |
| 6,799,794 B2 | 10/2004 | Mochidome et al. | |
| 6,893,065 B2 | 5/2005 | Seksaria et al. | |
| 7,044,515 B2 | 5/2006 | Mooijman et al. | |
| 7,252,314 B2 | 8/2007 | Tamura et al. | |

(Continued)

FOREIGN PATENT DOCUMENTS

JP    08-337183    12/1996

OTHER PUBLICATIONS

Ali Najafi et al., "Mechanics of Axial Plastic Collapse in Multi-Cell, Multi-Corner Crush Tubes," sciencedirect.com, Sep. 1, 2010.

(Continued)

*Primary Examiner* — Glenn Dayoan
*Assistant Examiner* — Sunsurraye Westbrook
(74) *Attorney, Agent, or Firm* — O'Brien Jones PLLC.; Jason Rogers

(57) ABSTRACT

A strengthening member for an automotive vehicle comprises an eight-cornered cross section including sides and corners. The sides comprise four straight sides and four curved sides. A length of each straight side ranges from about 10 mm to about 200 mm and a length of each curved side is about 10 mm to about 200 mm.

25 Claims, 79 Drawing Sheets

SQUARE    HEXAGONAL    CIRCULAR    OCTAGONAL    TWELVE CORNERED    FOUR STRAIGHT, FOUR CIRCULAR

U.S. PATENT DOCUMENTS

| | | | |
|---|---|---|---|
| 7,264,274 | B2 | 9/2007 | Ridgway |
| 7,303,219 | B2 | 12/2007 | Trabant et al. |
| 7,357,445 | B2 | 4/2008 | Gross et al. |
| 7,407,219 | B2 | 8/2008 | Glasgow et al. |
| 7,445,097 | B2 * | 11/2008 | Tamura et al. ............... 188/377 |
| 2002/0153719 | A1 * | 10/2002 | Taguchi ..................... 280/784 |
| 2003/0085592 | A1 | 5/2003 | Seksaria et al. |
| 2005/0028710 | A1 | 2/2005 | Carpenter |
| 2006/0033363 | A1 | 2/2006 | Hillekes et al. |
| 2006/0181072 | A1 | 8/2006 | Tamura et al. |
| 2006/0202493 | A1 | 9/2006 | Tamura et al. |
| 2006/0202511 | A1 | 9/2006 | Tamura et al. |
| 2006/0249342 | A1 | 11/2006 | Canot et al. |
| 2008/0012386 | A1 | 1/2008 | Kano et al. |
| 2008/0030031 | A1 | 2/2008 | Nilsson |
| 2008/0036242 | A1 | 2/2008 | Glance et al. |
| 2008/0106107 | A1 | 5/2008 | Tan et al. |
| 2008/0185852 | A1 | 8/2008 | Suzuki et al. |
| 2009/0026777 | A1 | 1/2009 | Schmid et al. |
| 2009/0085362 | A1 | 4/2009 | Terada et al. |
| 2009/0102234 | A1 | 4/2009 | Heatherington et al. |
| 2009/0174219 | A1 | 7/2009 | Foreman |
| 2010/0066124 | A1 | 3/2010 | Terada et al. |
| 2010/0072788 | A1 | 3/2010 | Tyan |
| 2010/0102592 | A1 | 4/2010 | Tyan et al. |
| 2011/0015902 | A1 | 1/2011 | Cheng et al. |

OTHER PUBLICATIONS

Xiong Zhang et al., "Crushing Analysis of Polygonal Columns and Angle Elements," sciencedirect.com, Jun. 27, 2009.

Sivakumar Palanivelua et al., "Comparison of the Crushing Performance of Hollow and Foam-Filled Small-Scale Composite Tubes With Different Geometrical Shapes for Use in Sacrificial Structures," sciencedirect.com, Jun. 1, 2010.

Fyllingen et al., "Simulations of a Top-Hat Section Subjected to Axial Crushing Taking Into Account Material and Geometry Variations," sciencedirect.com, Jul. 31, 2008.

Minoru Yamashita et al., Quasi-Static and Dynamic Axial Crushing of Various Polygonal Tubes,: sciencedirect.com, Jun. 2007.

JP 08-337183 English Abstract, Dec. 24, 1996.

Office Action dated Aug. 19, 2011 from U.S. Appl. No. 12/233,808.

Office Action dated Mar. 7, 2012 from U.S. Appl. No. 12/233,808.

Office Action dated Jul. 31, 2012 from U.S. Appl. No. 12/233,808.

Office Action dated Jul. 20, 2012 from U.S. Appl. No. 12/651,614.

Response to Office Action dated Aug. 19, 2011 from U.S. Appl. No. 12/233,808.

Response to Office Action dated Mar. 7, 2012 from U.S. Appl. No. 12/233,808.

Response to Office Action dated Jul. 31, 2012 from U.S. Appl. No. 12/233,808.

Response to Office Action dated Jul. 20, 2012 from U.S. Appl. No. 12/651,614.

* cited by examiner $Ss_j$: length of straight side j
$Ts_j$: thickness of straight side j
$Sc_j$: length of curved side j
$Tc_j$: thickness of curved side j

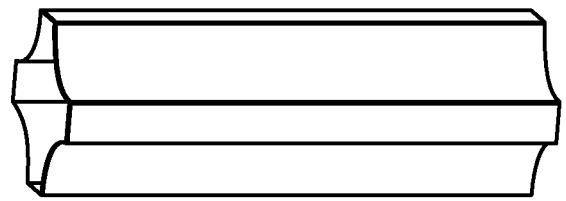
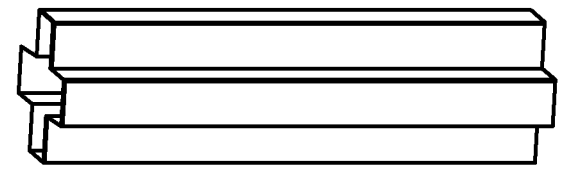
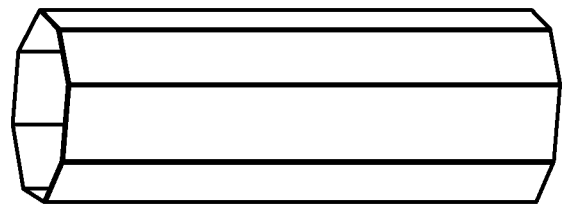
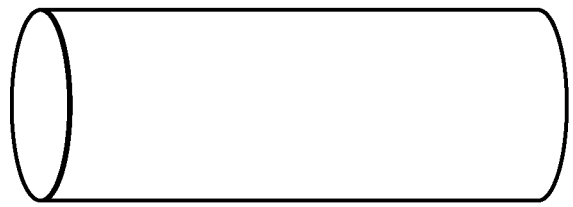
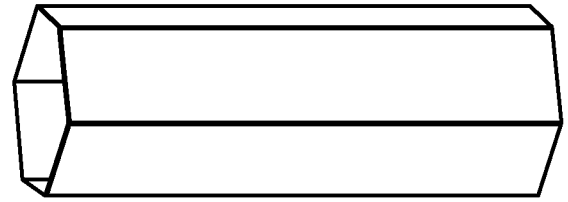
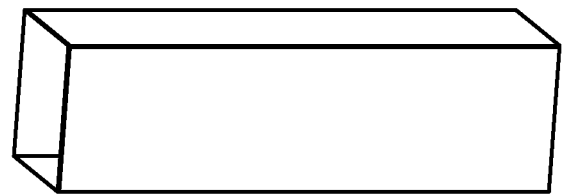
FIG. 3

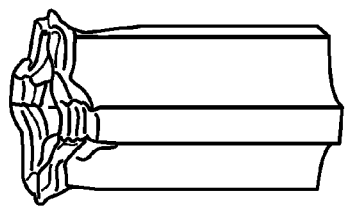
FOUR STRAIGHT, FOUR CIRCULAR
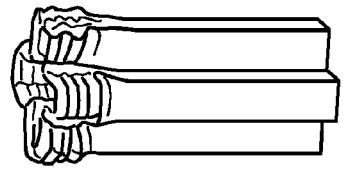
TWELVE CORNERED
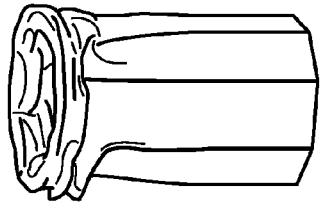
OCTAGONAL
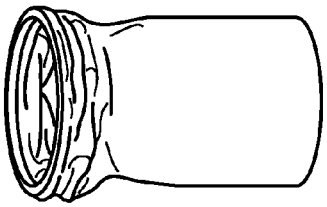
CIRCULAR
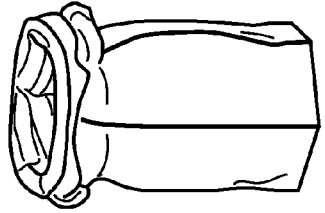
HEXAGONAL
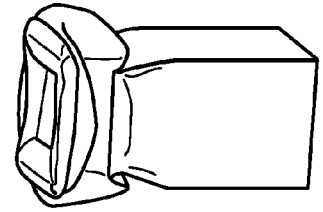
SQUARE
FIG. 4
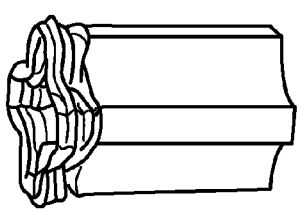
FOUR STRAIGHT, FOUR CIRCULAR
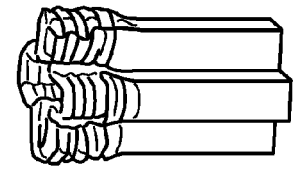
TWELVE CORNERED
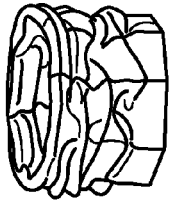
OCTAGONAL
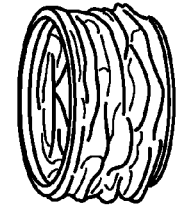
CIRCULAR
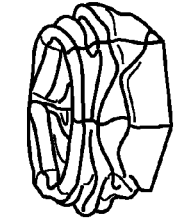
HEXAGONAL
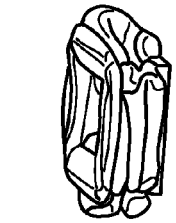
SQUARE
FIG. 5

$Ss_j$: length of straight side j
$Ts_j$: thickness of straight side j
$Sc_j$: length of curved side j
$Tc_j$: thickness of curved side j

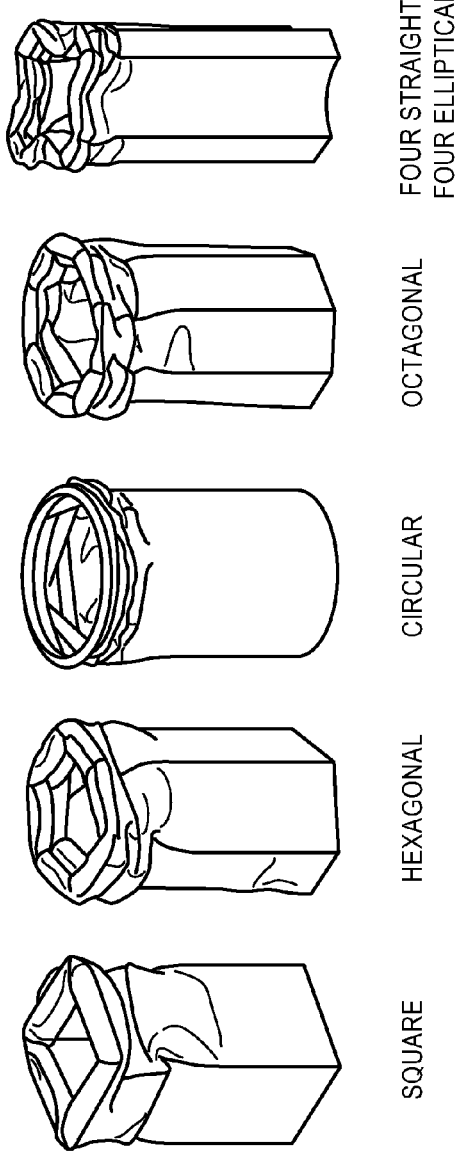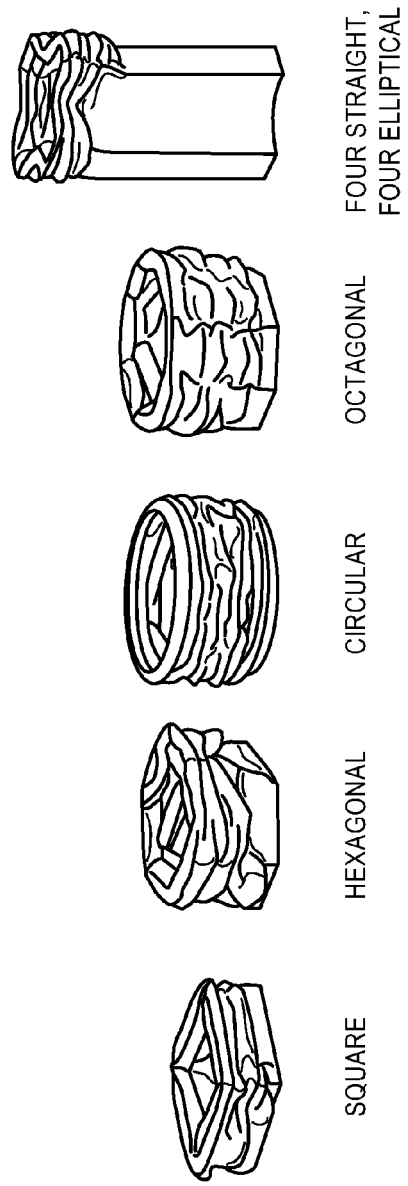

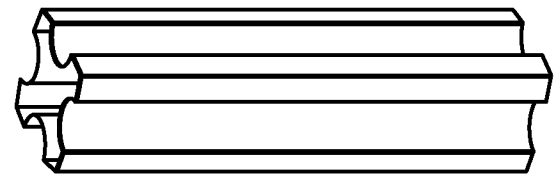
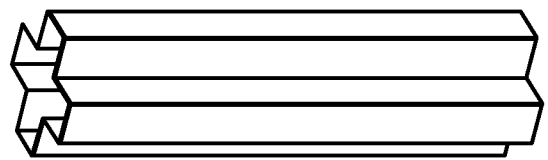
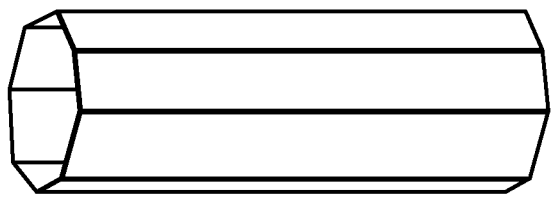
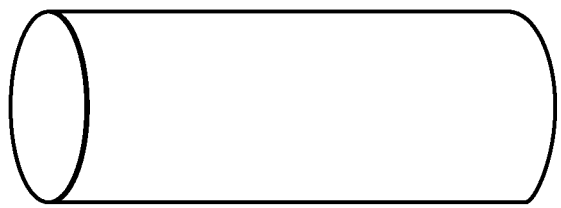
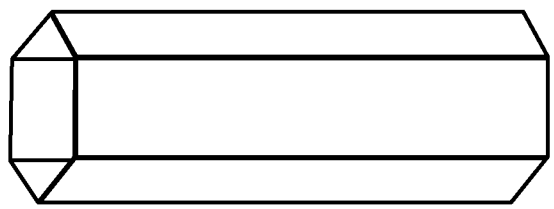
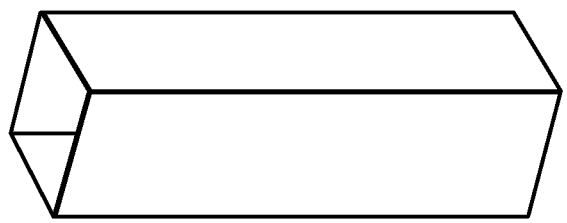
FIG. 17

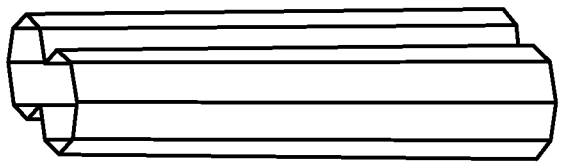
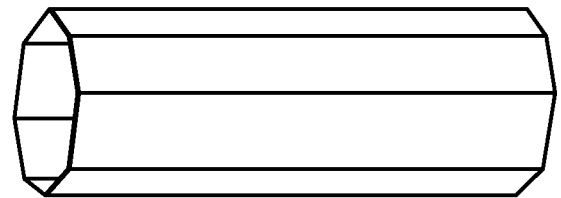
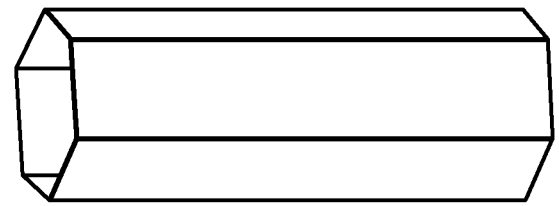
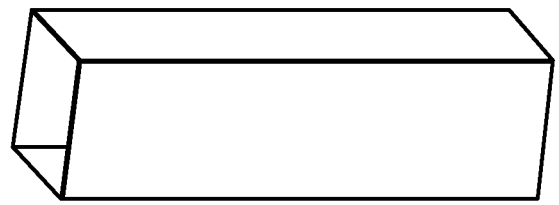
FIG. 31

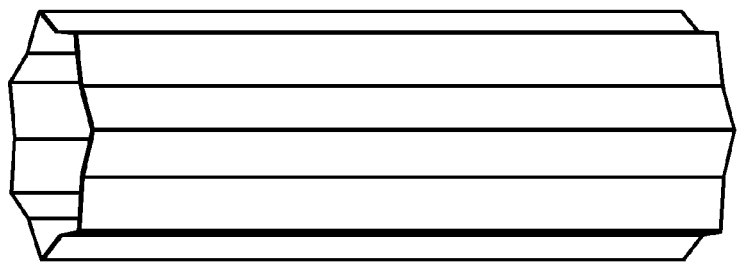
FOURTEEN CORRUGATED
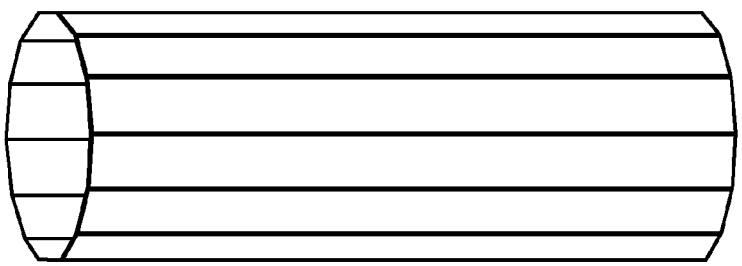
TETRADECAGON
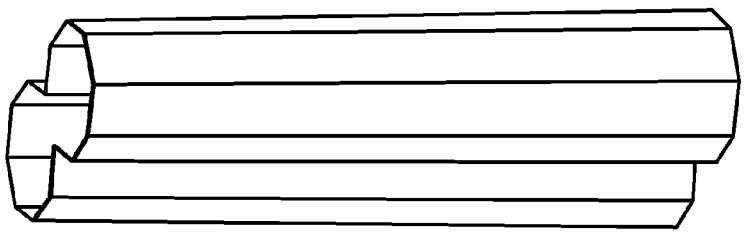
FOURTEEN CORNERED
FIG. 36

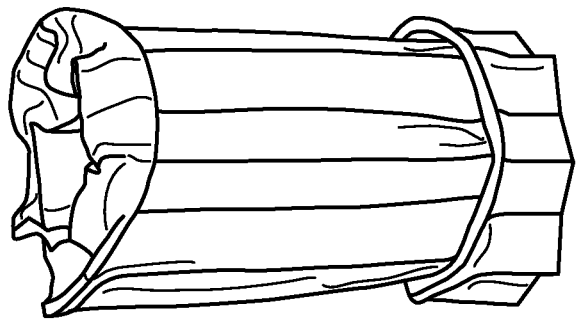
FOURTEEN CORRUGATED
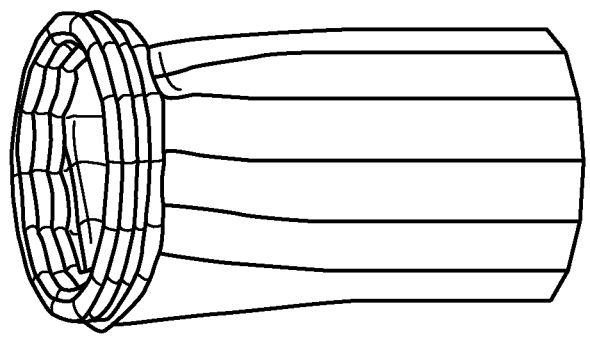
TETRADECAGON
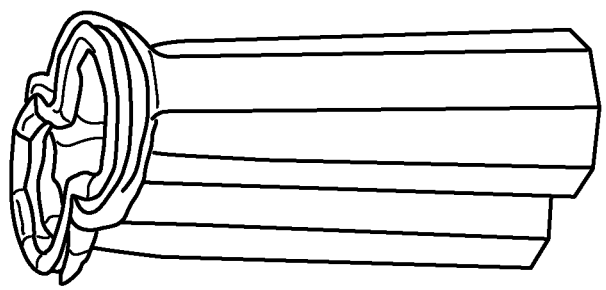
FOURTEEN CORNERED
FIG. 37

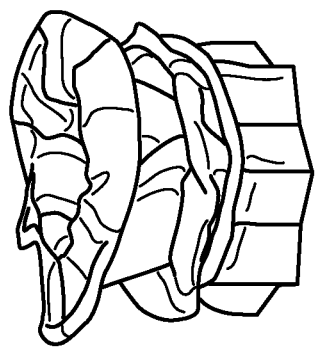
FOURTEEN CORRUGATED
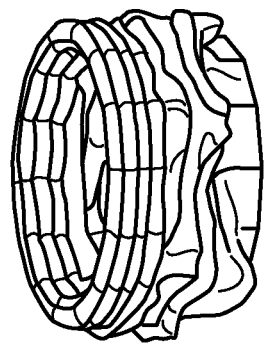
TETRADECAGON
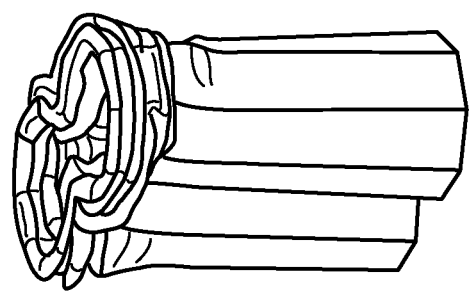
FOURTEEN CORNERED
FIG. 38

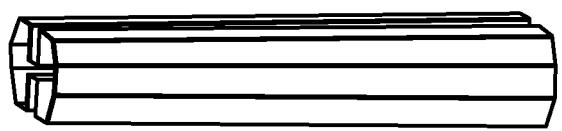
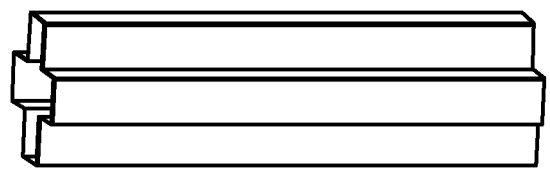
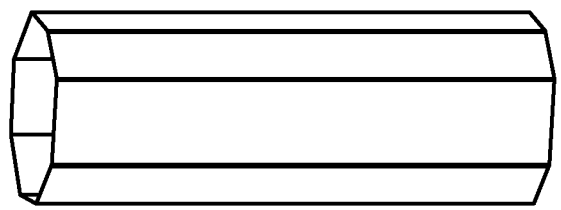
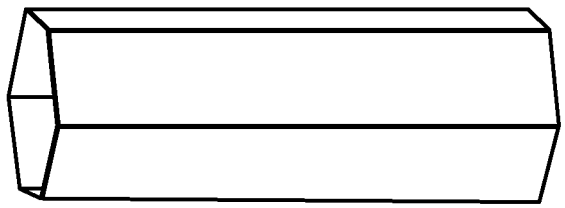
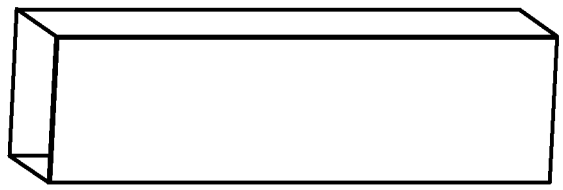
FIG. 43

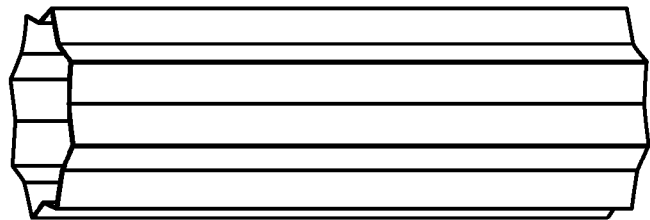
SIXTEEN CORRUGATED
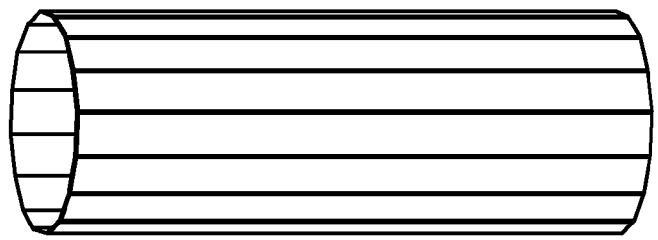
HEXADECAGON
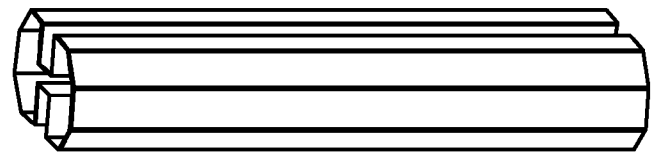
SIXTEEN CORNERED
FIG. 48

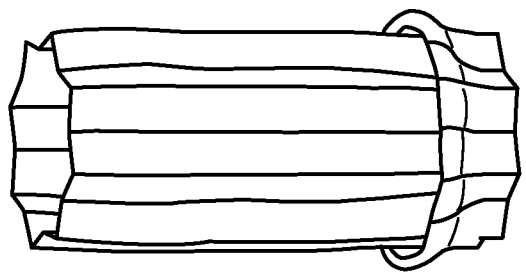
SIXTEEN CORRUGATED
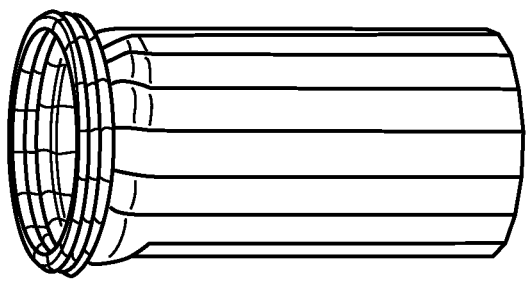
HEXADECAGON
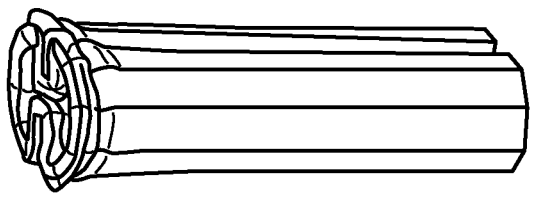
SIXTEEN CORNERED
FIG. 49

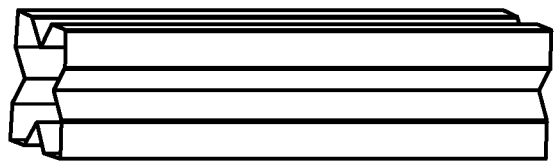
SIXTEEN CORNERED
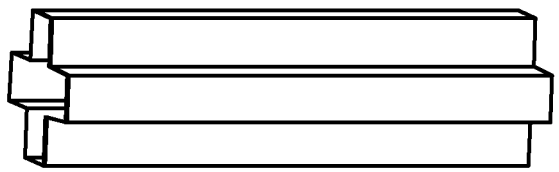
TWELVE CORNERED
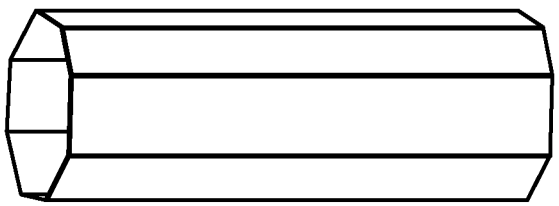
OCTAGONAL
CIRCULAR
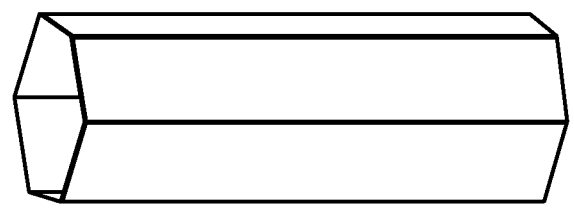
HEXAGONAL
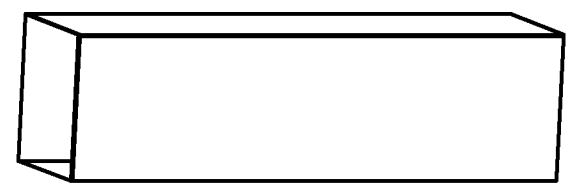
SQUARE
FIG. 55

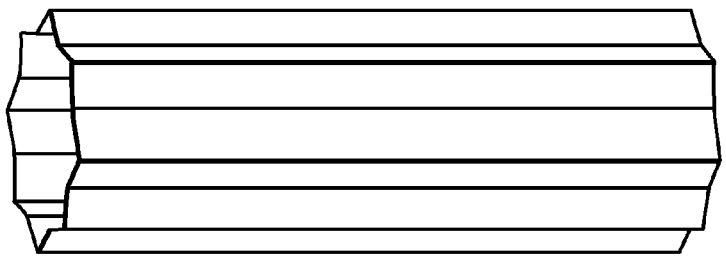
SIXTEEN CORRUGATED
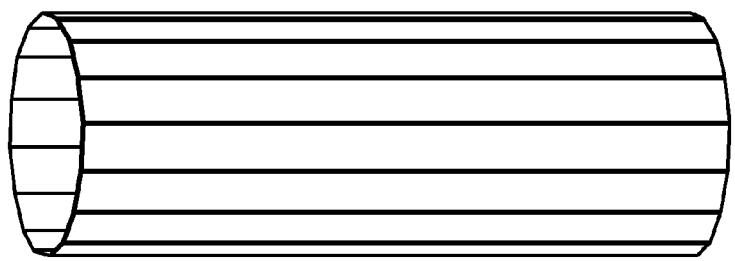
HEXADECAGON
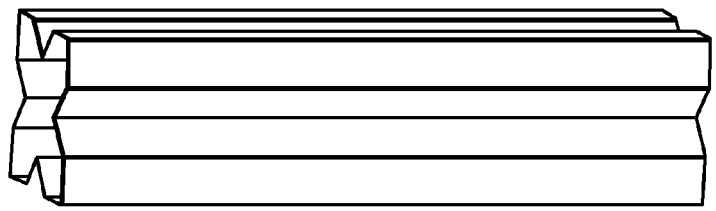
SIXTEEN CORNERED
FIG. 60

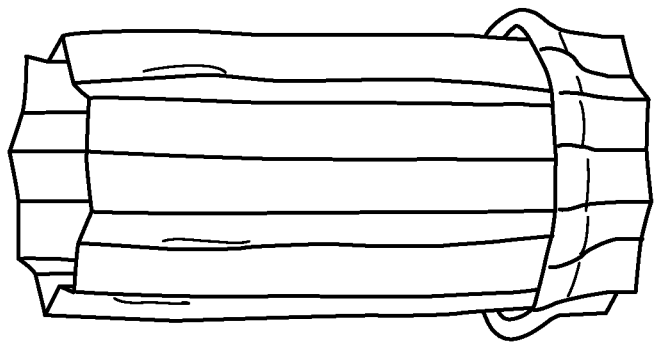
SIXTEEN CORRUGATED
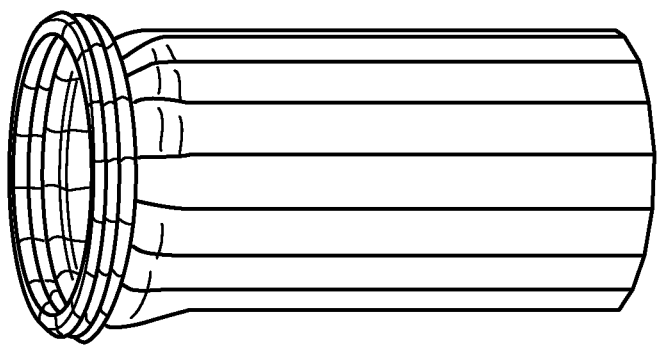
HEXADECAGON
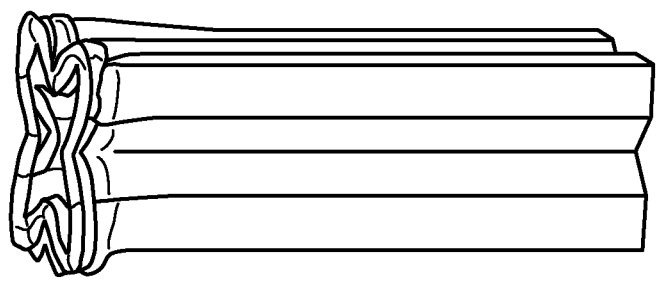
SIXTEEN CORNERED
FIG. 61

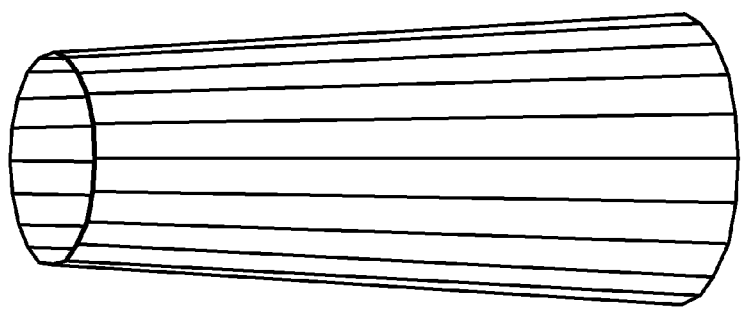
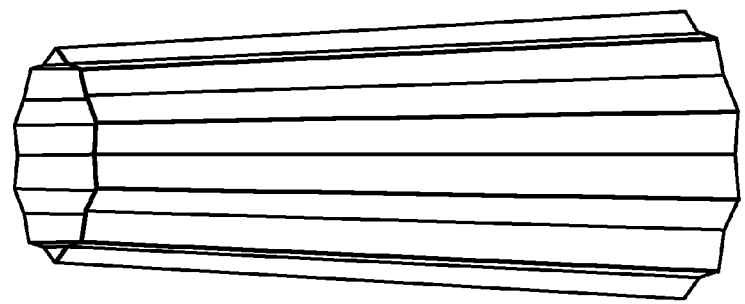
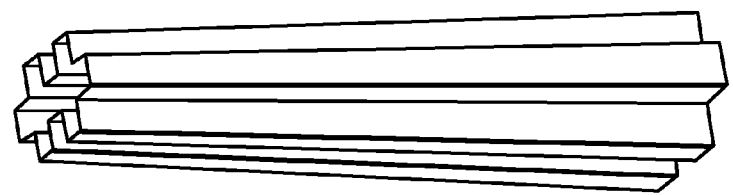
FIG. 72

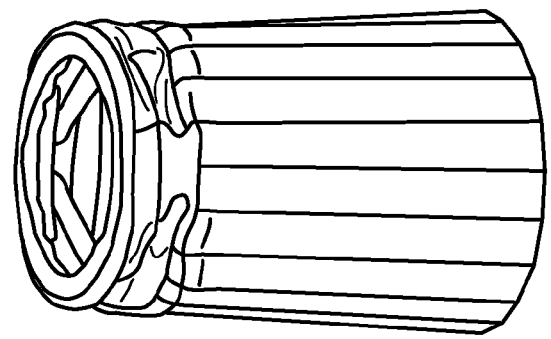
ICOSAGON
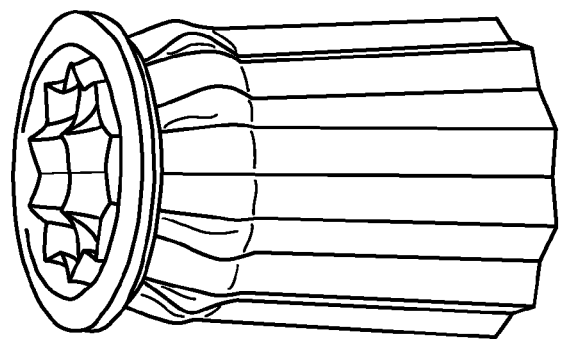
TWENTY CORRUGATED
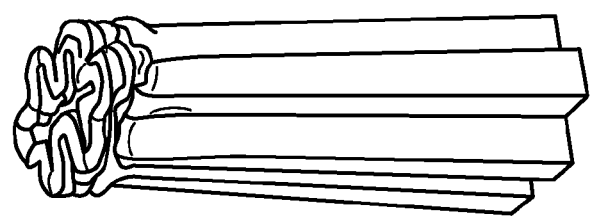
TWENTY CORNERED
FIG. 73

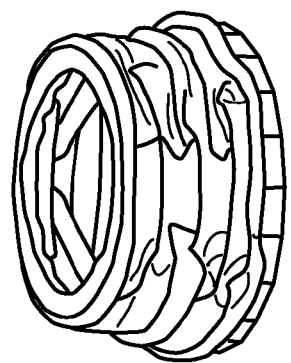
ICOSAGON
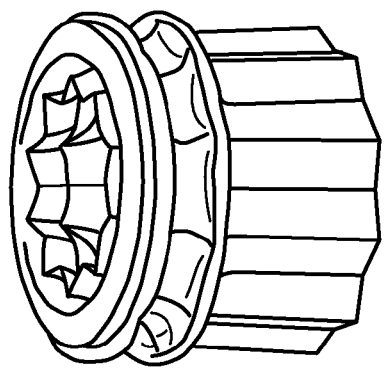
TWENTY CORRUGATED
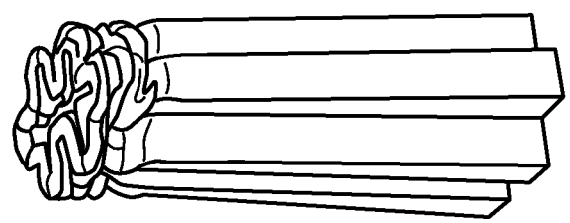
TWENTY CORNERED
FIG. 74

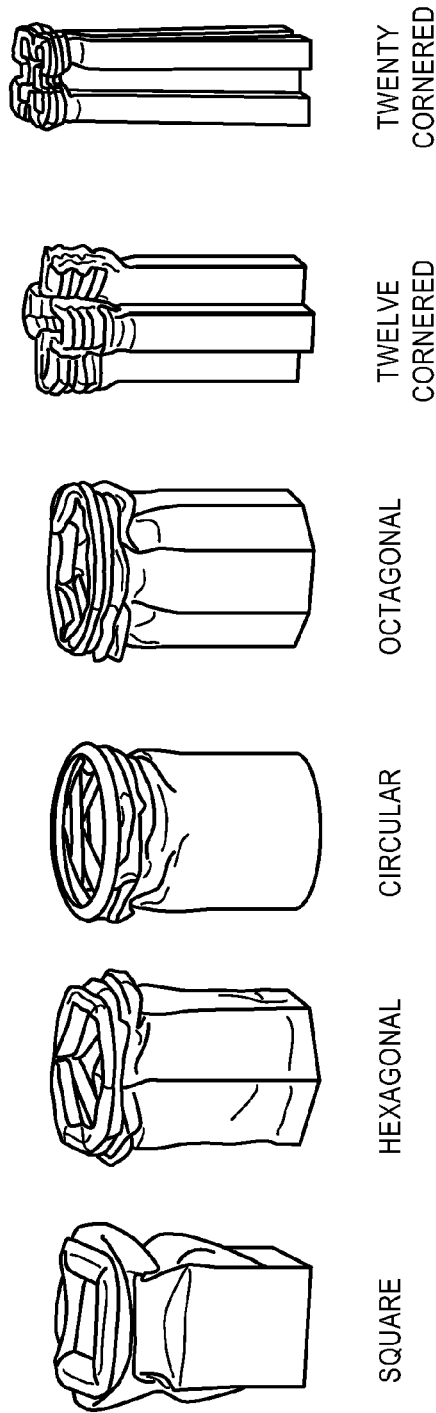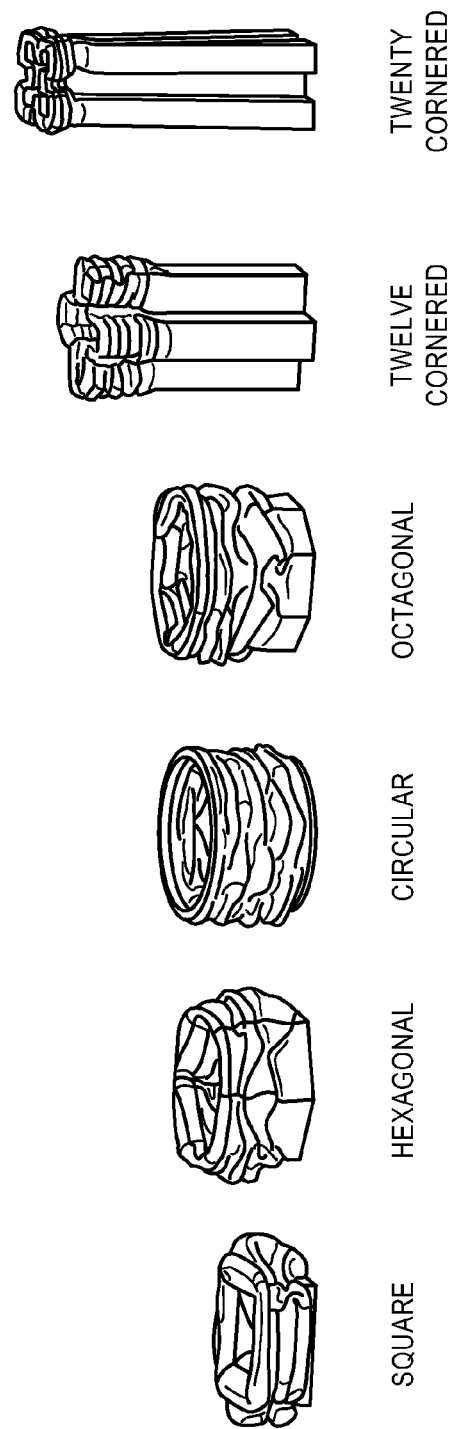

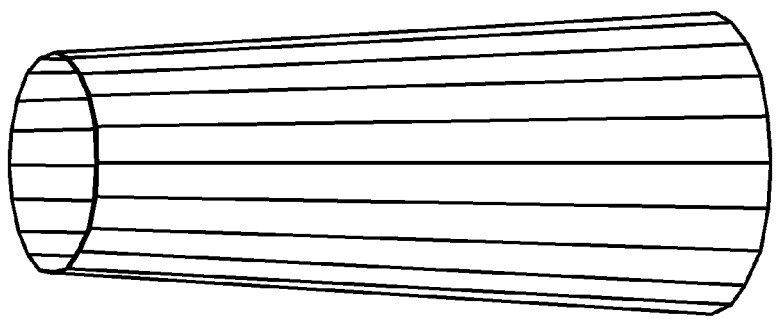
ICOSAGON
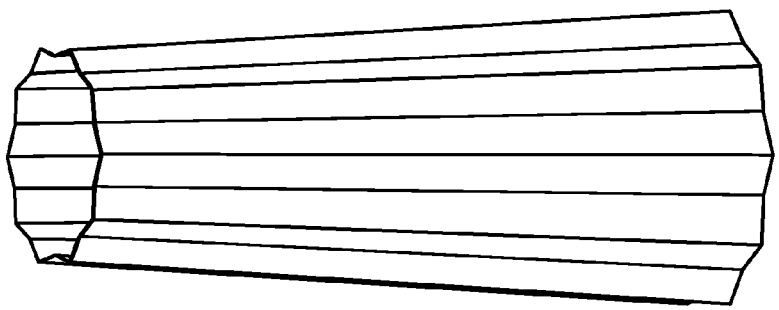
TWENTY CORRUGATED
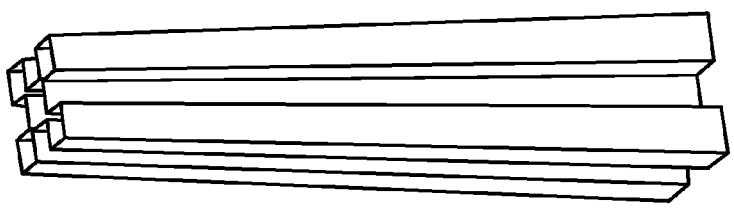
TWENTY CORNERED
FIG. 84

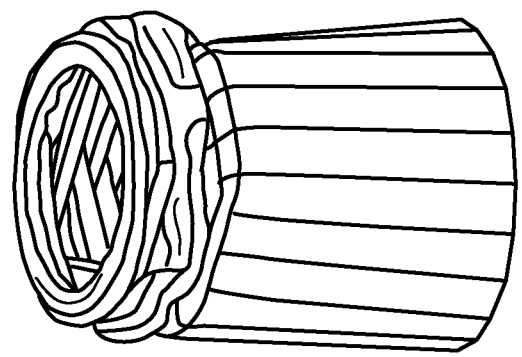
ICOSAGON
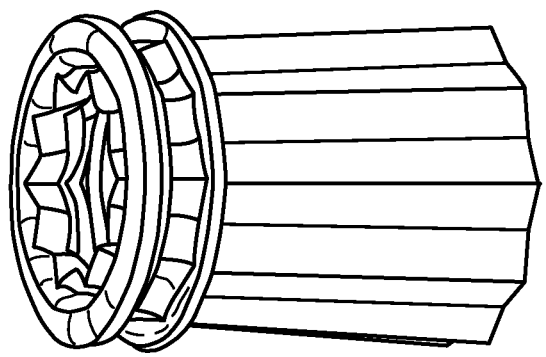
TWENTY CORRUGATED
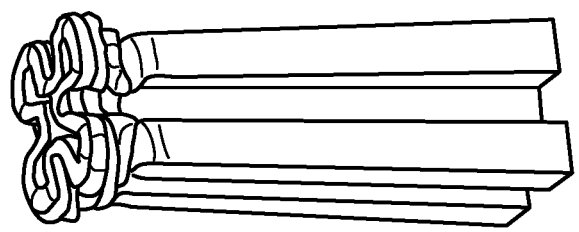
TWENTY CORNERED
FIG. 85

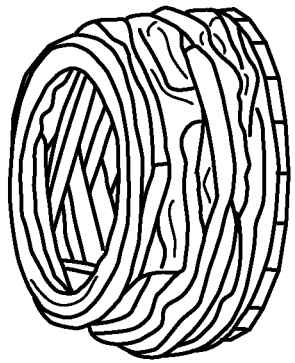
ICOSAGON
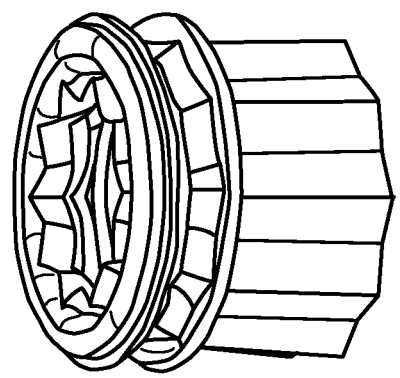
TWENTY CORRUGATED
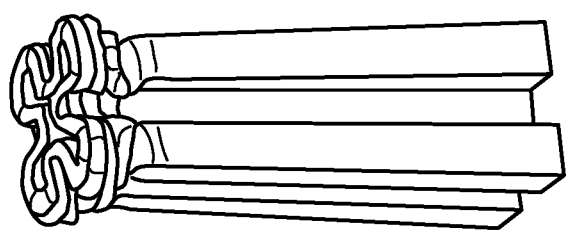
TWENTY CORNERED
FIG. 86

MULTI-CORNERED STRENGTHENING MEMBERS

FIELD OF THE INVENTION

The present teachings relate generally to a strengthening member for a vehicle body or other structures. The present teachings relate more specifically to strengthening members having multi-cornered cross sections.

BACKGROUND OF THE INVENTION

It is desirable, for vehicle strengthening members, to maximize impact energy absorption and bending resistance while minimizing mass per unit length of the strengthening member.

When a compressive force is exerted on a strengthening member, for example, a force due to a front impact load on a vehicle's front rail or other strengthening member in the engine compartment, the strengthening member can crush in a longitudinal direction to absorb the energy of the collision. In addition, when a bending force is exerted on a strengthening member, for example a force due to a side impact load on a vehicle's front side sill, B-pillar, or other strengthening member, the strengthening member can bend to absorb the energy of the collision.

Strengthening members have traditionally had rectangular cross sections, with an axis of maximum moment of inertia aligned with a horizontal Y axis (i.e., a lateral axis) of the member. During axial crush, however, rectangular strengthening members may be susceptible to inboard and/or outboard bending (i.e., bending in the Y plane respectively toward and/or away from a vehicle centerline) about the axis of minimum moment of inertia (i.e., the vertical axis), thereby essentially providing unilateral resistance to bending. Consequently, to absorb crush energy more efficiently, a number of non-traditional strengthening member cross sections have been developed.

U.S. Pat. No. 6,588,830, for example, discloses a strengthening member having a polygonal cross section of more than four sides, resulting in greater reliability and higher energy absorbing efficiency. A strengthening member with a basic octagonal cross section is disclosed as a preferred embodiment.

U.S. Pat. No. 6,752,451 discloses a strengthening member having concave portions at the four corners of the basic rectangular cross section, resulting in four U-shaped portions forming an angle of 90 degrees with each other. To avoid cracks at the concave portions at the four corners and to increase strength, the concave portions have increased thickness and hardness. Increased thickness and hardness of the corner portions is disclosed to be achievable only by drawing or hydroforming, and therefore decreases manufacturing feasibility while increasing the mass per unit length of the strengthening member.

U.S. Pat. No. 6,752,451 makes reference to Japanese Unexamined Patent Publication No. H8-337183, which also discloses a strengthening member having concave portions at the four corners of a basic rectangular cross section, resulting in four U-shaped portions forming an angle of 90 degrees with each other. U.S. Pat. No. 6,752,451 states that its thickened concave portions provide improved crush resistance and flexural strength over H8-337183.

It may be desirable, therefore, to provide a variety of tunable strengthening member cross sections configured to achieve strength increases (i.e., load carrying and energy absorption) over basic polygonal designs, while also allowing flexibility in design to meet a range of vehicle applications. It also may be desirable to provide strengthening member configurations which achieve similar if not greater strength increases than members with thickened corners, while minimizing the mass per unit length of a member and maintaining manufacturing feasibility.

It may further be desirable to provide strengthening members that can achieve increased energy absorption and a more stable axial collapse when forces such as front and side impact forces are exerted on the member, while also conserving mass to reduce vehicle weights and meet emission requirements.

SUMMARY OF THE INVENTION

In accordance with certain embodiments, the present teachings provide a strengthening member for an automotive vehicle. The strengthening member comprises an eight-cornered cross section including sides and corners. The sides comprise four straight sides and four curved sides. A length of each straight side ranges from about 10 mm to about 200 mm and a length of each curved side ranges from about 10 mm to about 200 mm.

In accordance with certain additional embodiments, the present teachings provide a strengthening member for an automotive vehicle. The strengthening member comprises a twelve-cornered cross section including sides and corners. The sides comprise eight straight sides and four curved sides. A length of each straight side ranges from about 10 mm to about 200 mm and a length of each curved side ranges from about 10 mm to about 200 mm.

In accordance with certain additional embodiments, the present teachings provide a strengthening member for an automotive vehicle. The strengthening member comprises a fourteen-cornered cross section including sides and corners creating twelve internal angles and two external angles. Each internal angle ranges from about 95 degrees to about 145 degrees, and each external angle ranges from about 5 degrees to about 130 degrees.

In accordance with certain additional embodiments, the present teachings provide a strengthening member for an automotive vehicle. The strengthening member comprises a sixteen-cornered cross section including sides and corners creating twelve internal angles and four external angles. Each internal angle ranges from about 25 degrees to about 145 degrees and each external angle ranges from about 25 degrees to about 150 degrees.

In accordance with certain further embodiments, the present teachings provide a strengthening member for an automotive vehicle. The strengthening member comprises a twenty-cornered cross section including sides and corners creating twelve internal angles and eight external angles. Each internal angle ranges from about 25 degrees to about 145 degrees and each external angle ranges from about 25 degrees to about 150 degrees.

Additional objects and advantages will be set forth in part in the description which follows, and in part will be obvious from the description, or may be learned by practice of the present teachings. The objects and advantages of the teachings will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate exemplary embodiments of the invention and together with the description, serve to explain certain principles of the teachings.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein:

FIG. 3 illustrates strengthening members of varying cross sections having substantially the same thickness, length and perimeter;

FIG. 4 illustrates an exemplary axial collapse of the strengthening members shown in FIG. 3;

FIG. 5 illustrates an exemplary dynamic crush of the strengthening members shown in FIG. 3;

FIG. 11 illustrates an exemplary axial collapse of the strengthening members shown in FIG. 10;

FIG. 12 illustrates an exemplary dynamic crush of the strengthening members shown in FIG. 10;

FIG. 17 illustrates strengthening members of varying cross sections having substantially the same thickness, length and perimeter;

FIG. 31 illustrates strengthening members of varying cross sections having substantially the same thickness, length and perimeter;

FIG. 36 illustrates fourteen-cornered strengthening members of varying cross sections having substantially the same thickness, length and perimeter;

FIG. 37 illustrates an exemplary axial collapse of the strengthening members shown in FIG. 36;

FIG. 38 illustrates an exemplary dynamic crush of the strengthening members shown in FIG. 36;

FIG. 43 illustrates strengthening members of varying cross sections having substantially the same thickness, length and perimeter;

FIG. 48 illustrates sixteen-cornered strengthening members of varying cross sections having substantially the same thickness, length and perimeter;

FIG. 49 illustrates an exemplary axial collapse of the strengthening members shown in FIG. 48;

FIG. 55 illustrates strengthening members of varying cross sections having substantially the same thickness, length and perimeter;

FIG. 60 illustrates sixteen-cornered strengthening members of varying cross sections having substantially the same thickness, length and perimeter;

FIG. 61 illustrates an exemplary axial collapse of the strengthening members shown in FIG. 60;

FIG. 72 illustrates twenty-cornered strengthening members of varying cross sections having substantially the same thickness, length and perimeter;

FIG. 73 illustrates an exemplary axial collapse of the strengthening members shown in FIG. 72;

FIG. 74 illustrates an exemplary dynamic crush of the strengthening members shown in FIG. 72;

FIG. 80 illustrates an exemplary axial collapse of the strengthening members shown in FIG. 79;

FIG. 81 illustrates an exemplary dynamic crush of the strengthening members shown in FIG. 79;

FIG. 84 illustrates twenty-cornered strengthening members of varying cross sections having substantially the same thickness, length and perimeter;

FIG. 85 illustrates an exemplary axial collapse of the strengthening members shown in FIG. 84;

FIG. 86 illustrates an exemplary dynamic crush of the strengthening members shown in FIG. 84;

Figure 1:
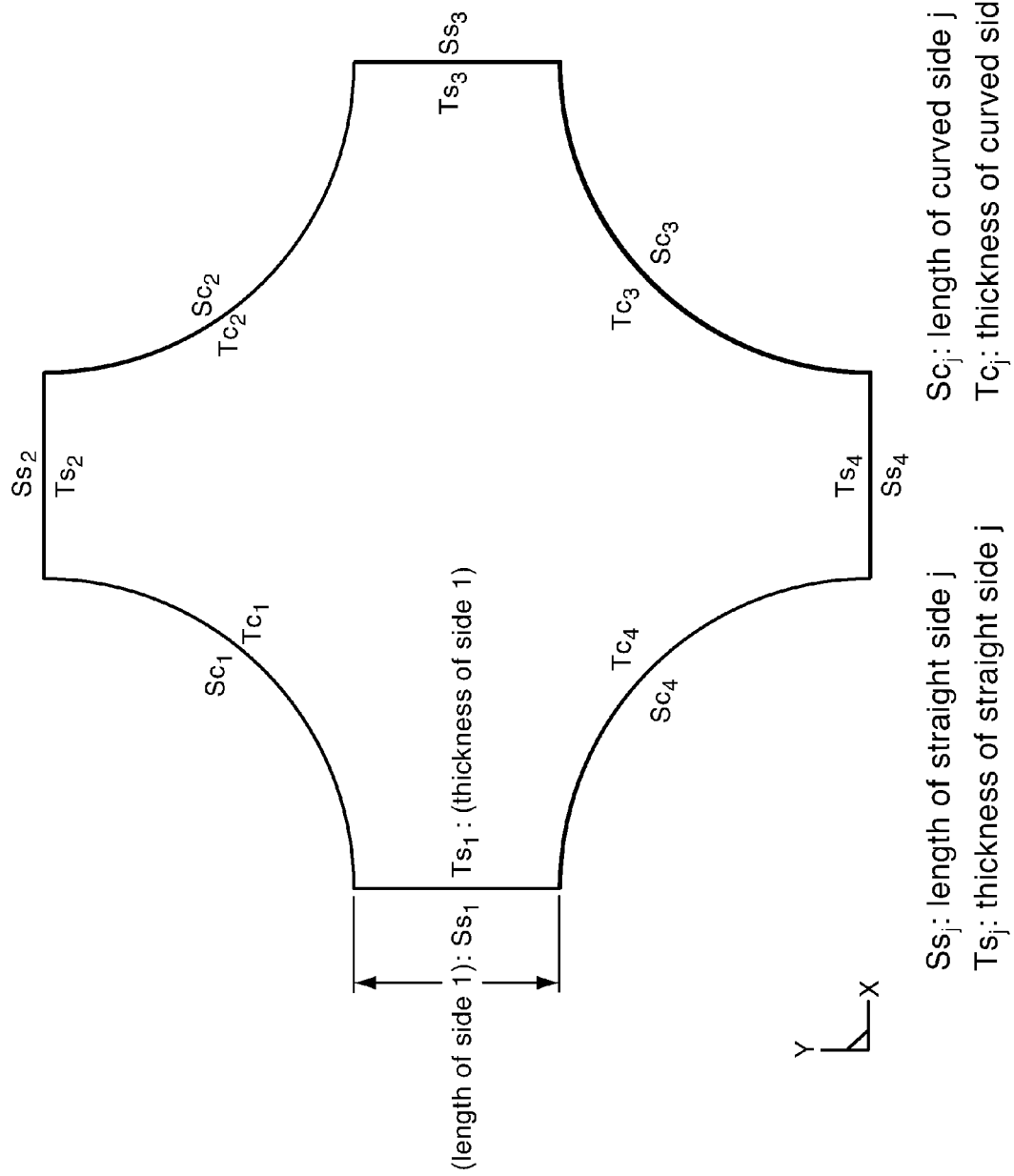
FIG. 1 illustrates an exemplary embodiment of an eight-cornered cross section, with four straight sides and four circular sides, for a strengthening member in accordance with the present teachings.
Figure 2C:
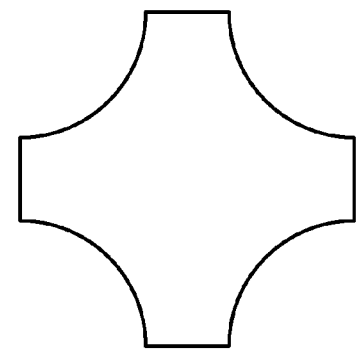
FIGS. 2A-2E illustrate how tunable parameters in accordance with the present teachings can be utilized to modulate the cross section of FIG. 1.
Figure 2B:
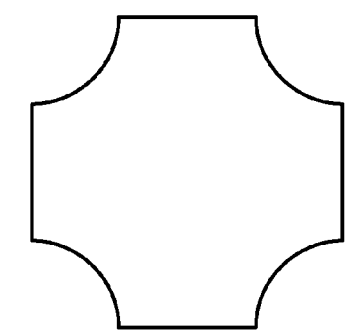
Figure 2E:
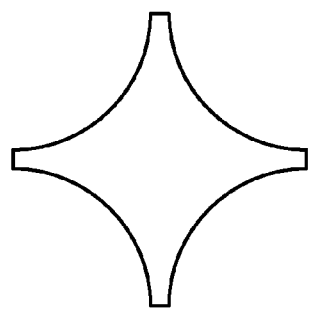
Figure 2D:
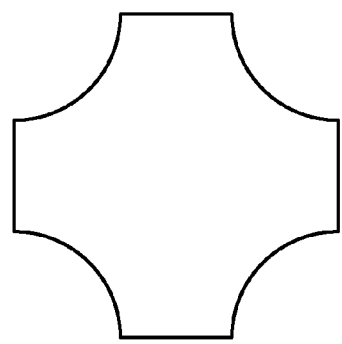
Figure 2A:
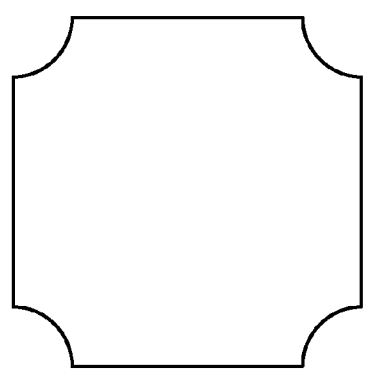

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

The present teachings contemplate providing strengthening members with multi-cornered cross sections having substantially increased stiffness throughout the sides and corners without increasing thickness within the corners. The strengthening members provide, for example, a variety of tunable parameters configured to achieve strength increases (i.e., load carrying and energy absorption) over basic polygonal designs (e.g., polygonal strengthening member cross sections having less or the same number of sides), while also allowing design flexibility to meet a range of vehicle applications. The strengthening members in accordance with the present teachings can achieve increased energy absorption and a more stable axial collapse when forces such as front and side impact forces are exerted on the strengthening member. Furthermore, the side lengths and configurations, and/or degrees of the internal and external angles, of the present teachings can achieve a similar, if not greater, strength increase as thickened corners, while minimizing mass per unit length of the member and maintaining a high manufacturing feasibility because the member can be formed by stamping, press forming, hydro-forming, molding, die casting, and extrusion.

Conventional strengthening members having basic polygonal cross sections, such as, square, rectangular, hexagonal and octagonal, etc., are generally used due to their manufacturing feasibility. Because strengthening members with multi-cornered cross sections in accordance with the present teachings have substantially increased strength and stiffness without requiring thicker corner portions, they also have a higher manufacturing feasibility than previously-contemplated members that have thickened corners. While still providing a desired strength, a strengthening member in accordance with the present teachings can be formed in one or multiple sections by, for example, stamping, pressing, hydro-forming, molding, and extrusion. Thus-formed sections can be joined via welding, adhesive, fastening, or other known joining technologies.

Strengthening members in accordance with the present teachings can comprise, for example, steel, advanced high strength steel (AHSS), ultra high strength steel (UHSS), next generation high strength steel (NGHSS), aluminum, magnesium, fiberglass, nylon, plastic, a composite or any other suitable materials. Those of ordinary skill in the art would understand, for example, that the material used for a strengthening member may be chosen as desired based on intended application, strength/weight considerations, cost, and other design factors.

In various exemplary embodiments of the present teachings, a strengthening member may comprise an eight-cornered cross section having four straight sides and four curved sides. An exemplary embodiment of an eight-cornered cross section for a strengthening member in accordance with the present teachings is illustrated, for example, in FIG. 1. As illustrated, the cross section comprises four straight sides having lengths $Ss_1$-$Ss_4$ and thicknesses $Ts_1$-$Ts_4$, and four circular sides having lengths $Sc_1$-$Sc_4$ and thicknesses $Tc_1$-$Tc_4$. The side lengths and thicknesses can be varied (i.e., tuned) to achieve improved strength and other performance features (e.g., stability of folding pattern) compared to existing octagonal cross sections. This strength improvement further obviates the need for increased corner thickness, which is an unexpected and unpredicted benefit of fine-tuning the design parameters (e.g., side lengths and thicknesses) of a strengthening member having an eight-sided (i.e., eight-cornered) cross section.

As shown in FIGS. 2A-2E, for example, in accordance with various embodiments of the present teachings, the lengths $Ss_1$-$Ss_4$ and $Sc_1$-$Sc_4$ of the sides can be varied, as would be understood by one skilled in the art, for example in accordance with available packaging space within a vehicle. Furthermore, although not shown, in a similar manner, the thicknesses $Ts_1$-$Ts_4$ and $Tc_1$-$Tc_4$ of the sides can be varied. Those of ordinary skill in the art would understand, however, that FIGS. 2A-2E are exemplary only, and are provided merely to illustrate how design parameters can be utilized to modulate the cross section of the exemplary embodiment of FIG. 1. Thus, the present teachings contemplate various eight-cornered cross section configurations having various shapes and dimensions (i.e., corner bend radii, side lengths and/or thicknesses), which can be adjusted based on space requirements and/or to control member collapse modes.

In certain embodiments of the present teachings, for example, a length of each straight side ($Ss_1$-$Ss_4$) can range from about 10 mm to about 200 mm and a length of each circular side ($Sc_1$-$Sc_4$) can range from about 10 mm to about 200 mm. In certain additional embodiments, a thickness of the sides and corners can range from about 0.7 mm to about 6.0 mm; and in certain embodiments, the thickness of the sides is substantially the same as the thickness of the corners. Furthermore, in accordance with certain additional exemplary embodiments, the thickness of the strengthening member may vary, for example, within one side or from side to side to optimize the overall axial crush and bending performance.

To demonstrate the improved strength and performance features of an eight-cornered cross section in accordance with the present teachings, having four straight sides and four circular sides, compared to various existing cross section designs, exemplary strengthening members were modeled and experimental test runs were conducted, as shown and described below with reference to FIGS. 3-7.

Strengthening members of varying shapes (i.e., cross sections) having the same thickness, length and perimeter (e.g., each part having a mass of about 1.22 Kg) were modeled as illustrated in FIG. 3. Tests were then run for each member to simulate an impact with the same rigid mass (e.g. an impactor), impact speed, and initial kinetic energy. As shown in FIG. 4, the eight-cornered cross section in accordance with the present teachings having four straight sides and four circular sides demonstrated the most stable axial collapse and the highest crash energy absorption. Furthermore, as shown in FIG. 5, the eight-cornered cross section in accordance with the present teachings also demonstrated the shortest crush distance and smallest folding length.

Figure 6:
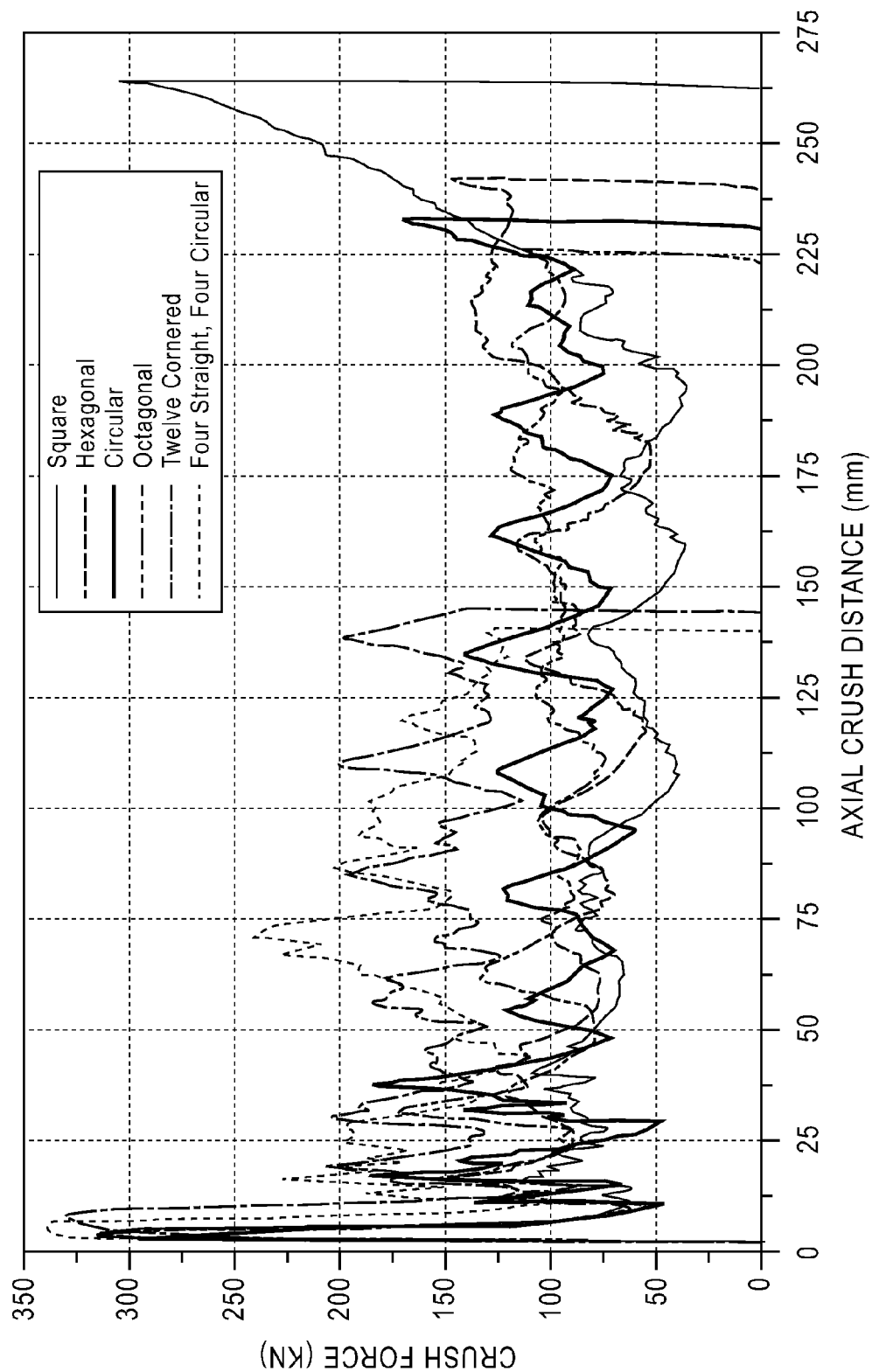
FIG. 6 is a graph of the crush force and associated axial crush distance for exemplary strengthening members having the cross sections shown in FIG. 3.

FIG. 6 illustrates the crush force (in Kn) and associated axial crush distance (in mm) for the simulated impact, exerted axially on the exemplary strengthening members having the cross sections shown in FIG. 3. As shown in FIG. 6, the strengthening member having an eight-cornered cross section with four straight sides and four circular sides could sustain a much higher crushing force for a given resulting crushing distance as compared with the square, hexagonal, circular and octagonal cross sections. In fact, an eight-cornered cross section in accordance with the present teachings achieved about a 40% to about 45% increase in crash energy absorption as compared with a basic octagonal cross section.

Figure 7:
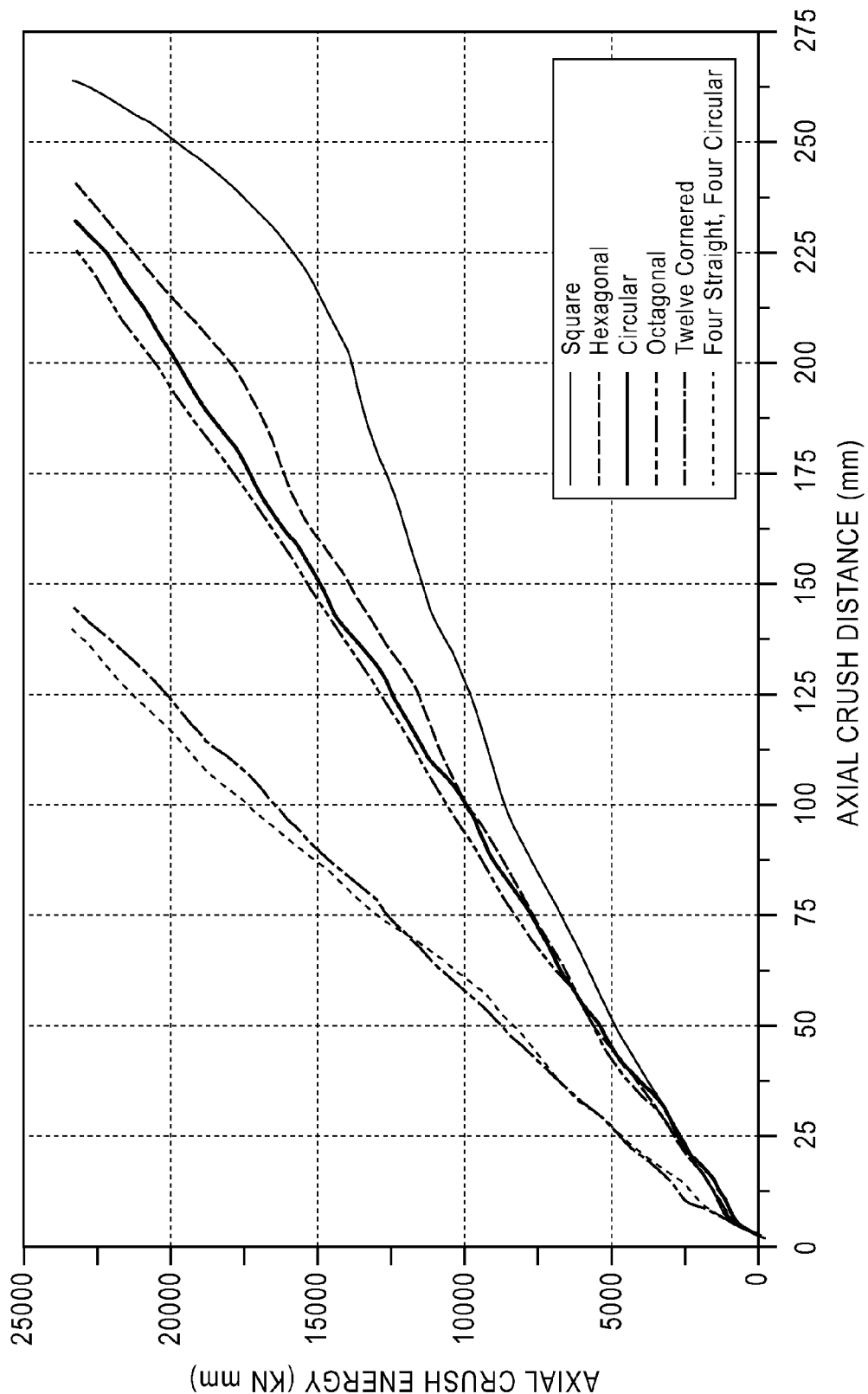
FIG. 7 is a graph of the axial crush energy and associated axial crush distance for exemplary strengthening members having the cross sections shown in FIG. 3.

FIG. 7 illustrates the axial crush energy (in Kn-mm) and associated axial crush distance (in mm) for the exemplary strengthening members having the cross sections shown in FIG. 3. As shown in FIG. 7, the strengthening member having an eight-cornered cross section with four straight sides and four circular sides could absorb the total kinetic energy of the impact (i.e., 22983 Kn-mm) over a much shorter distance as compared with the square, hexagonal, circular and octagonal cross sections. In fact, an eight-cornered cross section in accordance with the present teachings absorbed the full axial crush energy in about 60% of the axial crush distance as the basic octagonal cross section.

Figure 8:
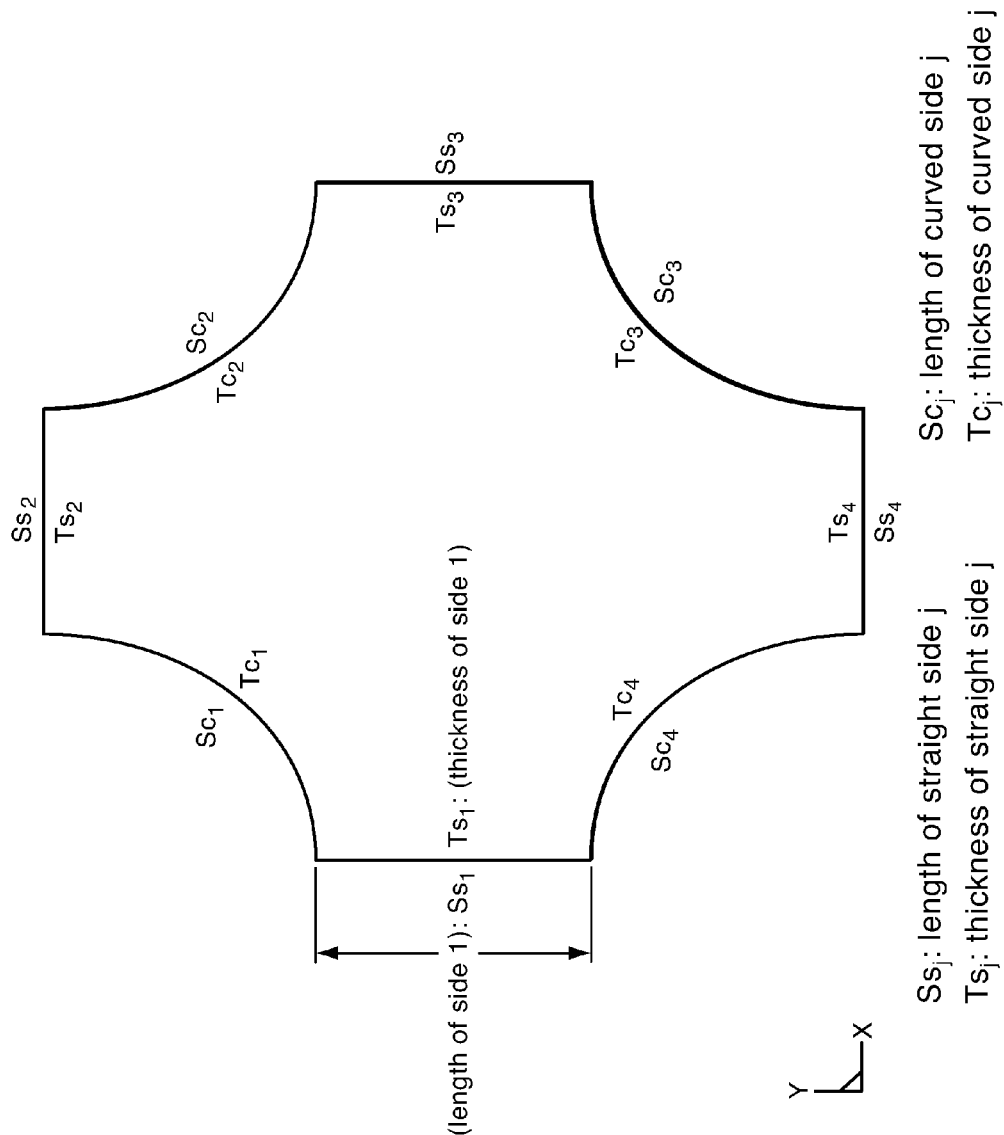
FIG. 8 illustrates an exemplary embodiment of an eight-cornered cross section, with four straight sides and four elliptical sides, for a strengthening member in accordance with the present teachings.

An additional exemplary embodiment of an eight-cornered cross section for a strengthening member in accordance with the present teachings is illustrated in FIG. 8. As illustrated, the cross section comprises four straight sides having lengths $Ss_1$-$Ss_4$ and thicknesses $Ts_1$-$Ts_4$, and four elliptical sides having lengths $Sc_1$-$Sc_4$ and thicknesses $Tc_1$-$Tc_4$. As above, the side lengths and thicknesses can be varied (i.e., tuned) to achieve improved strength and other performance features (e.g., stability of folding pattern) compared to existing octagonal cross sections, and may further obviate the need for increased corner thickness.

Figure 9C:
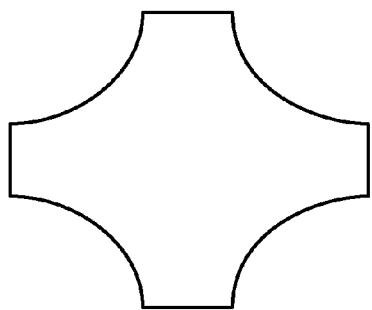
FIGS. 9A-9E illustrate how tunable parameters in accordance with the present teachings can be utilized to modulate the cross section of FIG. 8.
Figure 9E:
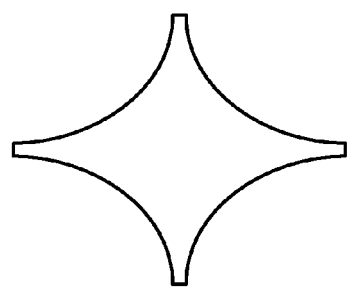
Figure 9B:
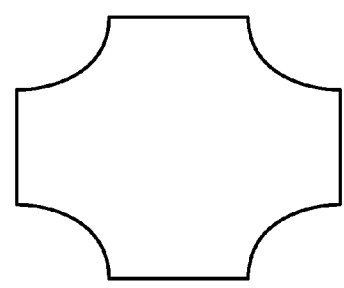
Figure 9D:
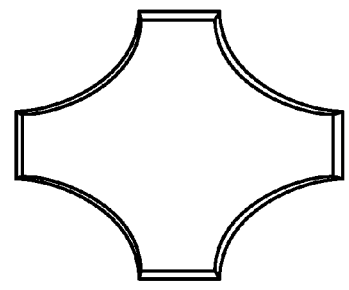
Figure 9A:
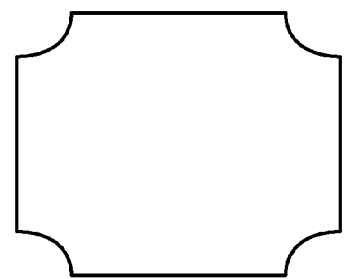

As shown in FIGS. 9A-9E, for example, in accordance with various embodiments of the present teachings, the lengths $Ss_1$-$Ss_4$ and $Sc_1$-$Sc_4$ and thicknesses $Ts_1$-$Ts_4$ and $Tc_1$-$Tc_4$ (see FIG. 9D showing a tapered cross-section) of the sides can be varied, as would be understood by one skilled in the art, for example in accordance with available packaging space within a vehicle. Those of ordinary skill in the art would understand, however, that FIGS. 9A-9E are exemplary only, and are provided merely to illustrate how design parameters can be utilized to modulate the cross section of the exemplary embodiment of FIG. 8. Thus, as above, the present teachings contemplate various eight-cornered cross section configurations having various shapes and dimensions (i.e., corner bend radii, side lengths and/or thicknesses), which can be adjusted based on space requirements and/or to control member collapse modes.

In certain embodiments of the present teachings, for example, a length of each straight side ($Ss_1$-$Ss_4$) can range from about 10 mm to about 200 mm and a length of each circular side ($Sc_1$-$Sc_4$) can range from about 10 mm to about 200 mm. In certain additional embodiments, a thickness of the sides and corners can range from about 0.7 mm to about 6.0 mm; and in certain embodiments, the thickness of the sides is substantially the same as the thickness of the corners. Furthermore, in accordance with certain additional exemplary embodiments, the thickness of the strengthening member may vary, for example, within one side or from side to side to optimize the overall axial crush and bending performance.

To demonstrate the improved strength and performance features of an eight-cornered cross section in accordance with the present teachings, having four straight sides and four elliptical sides, compared to various existing cross section designs, exemplary strengthening members were modeled and experimental test runs were conducted, as shown and described below with reference to FIGS. 10-14.

Figure 10:
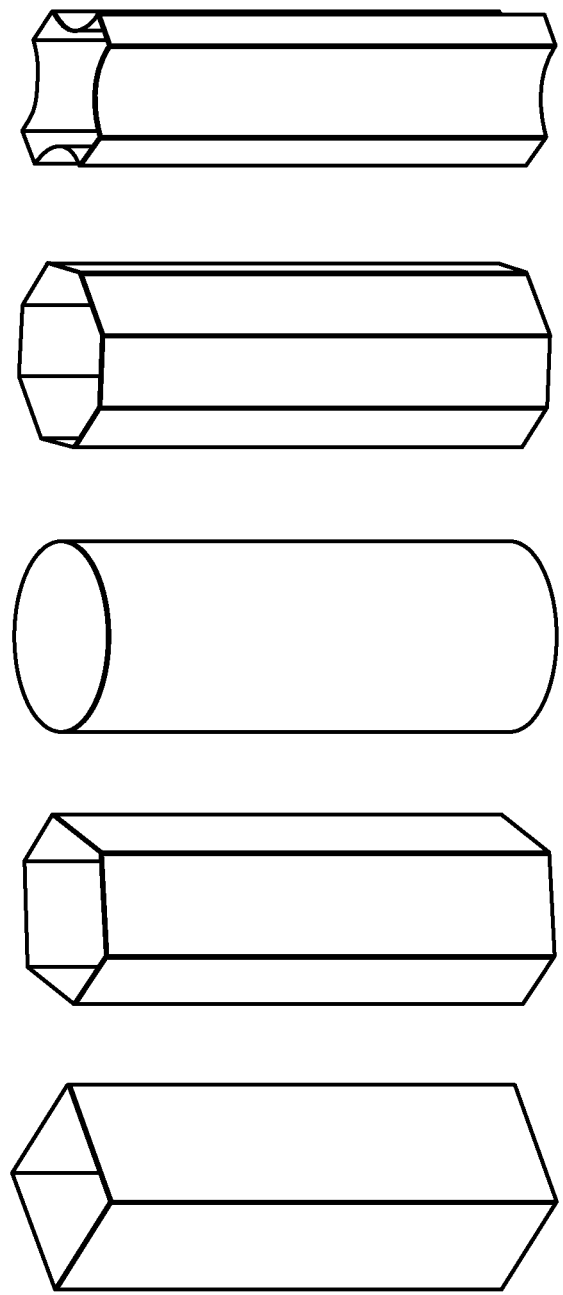
FIG. 10 illustrates strengthening members of varying cross sections having substantially the same thickness, length and perimeter.

As above, strengthening members of varying shapes having the same thickness, length and perimeter (e.g., each part having a mass of about 1.22 Kg) were modeled as illustrated in FIG. 10. Tests were then run for each member to simulate an impact with the same rigid mass (e.g. an impactor), impact speed, and initial kinetic energy. As shown in FIG. 11, the eight-cornered cross section in accordance with the present teachings having four straight sides and four elliptical sides demonstrated the most stable axial collapse and the highest crash energy absorption. Furthermore, as shown in FIG. 12, the eight-cornered cross section in accordance with the present teachings also demonstrated the shortest crush distance and smallest folding length.

Figure 13:
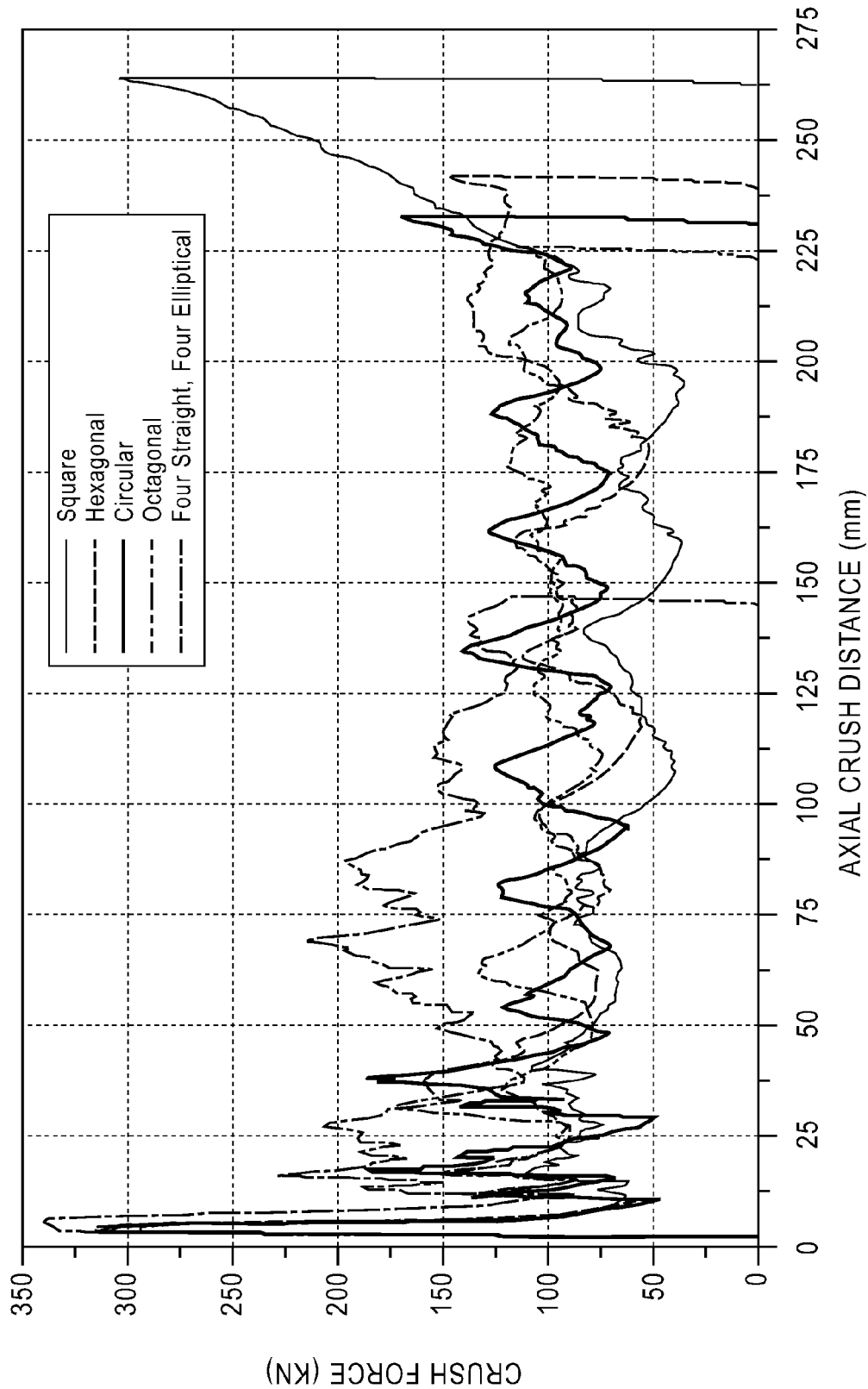
FIG. 13 is a graph of the crush force and associated axial crush distance for exemplary strengthening members having the cross sections shown in FIG. 10.

FIG. 13 illustrates the crush force (in KN) and associated axial crush distance (in mm) for the simulated impact, exerted axially on the exemplary strengthening members having the cross sections shown in FIG. 10. As shown in FIG. 13, the strengthening member having an eight-cornered cross section with four straight sides and four elliptical sides could sustain a much higher crushing force for a given resulting crushing distance as compared with the square, hexagonal, circular and octagonal cross sections. In fact, as above, an eight-cornered cross section in accordance with the present teachings achieved about a 35% to about 40% increase in crash energy absorption as compared with a basic octagonal cross section.

Figure 14:
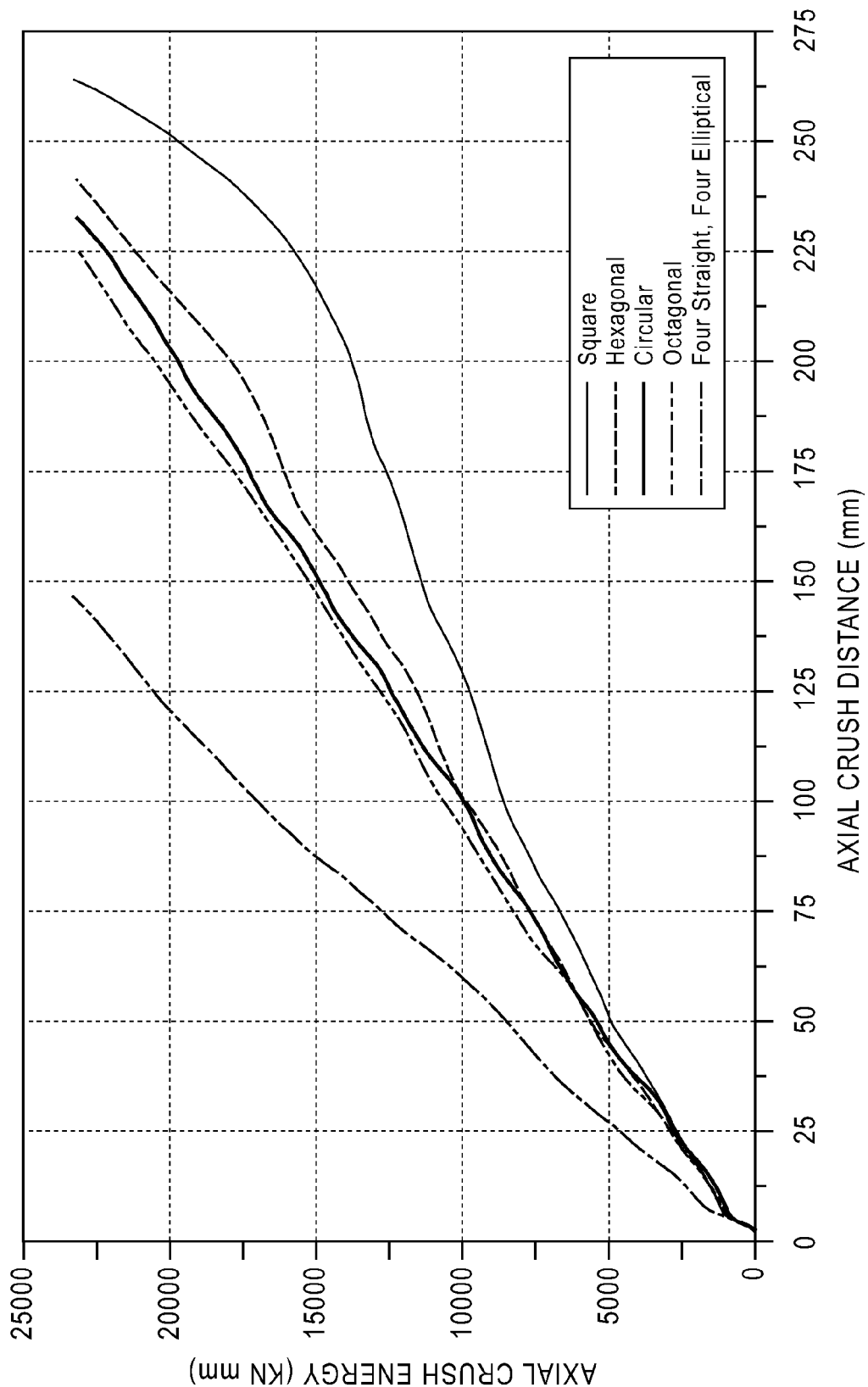
FIG. 14 is a graph of the axial crush energy and associated axial crush distance for exemplary strengthening members having the cross sections shown in FIG. 10.

FIG. 14 illustrates the axial crush energy (in KN-mm) and associated axial crush distance (in mm) for the exemplary strengthening members having the cross sections shown in FIG. 10. As shown in FIG. 14, the strengthening member having an eight-cornered cross section with four straight sides and four elliptical sides could absorb the total kinetic energy of the impact (i.e., 22983 KN-mm) over a much shorter distance as compared with the square, hexagonal, circular and octagonal cross sections. In fact, an eight-cornered cross section in accordance with the present teachings absorbed the full axial crush energy in about 65% of the axial crush distance as the basic octagonal cross section.

Eight cornered cross sections in accordance with the present teachings (having four straight sides and four curved sides) may, therefore, allow improved impact energy management over, for example, basic octagonal strengthening member cross sections, while minimizing mass per unit length.

Figure 15:
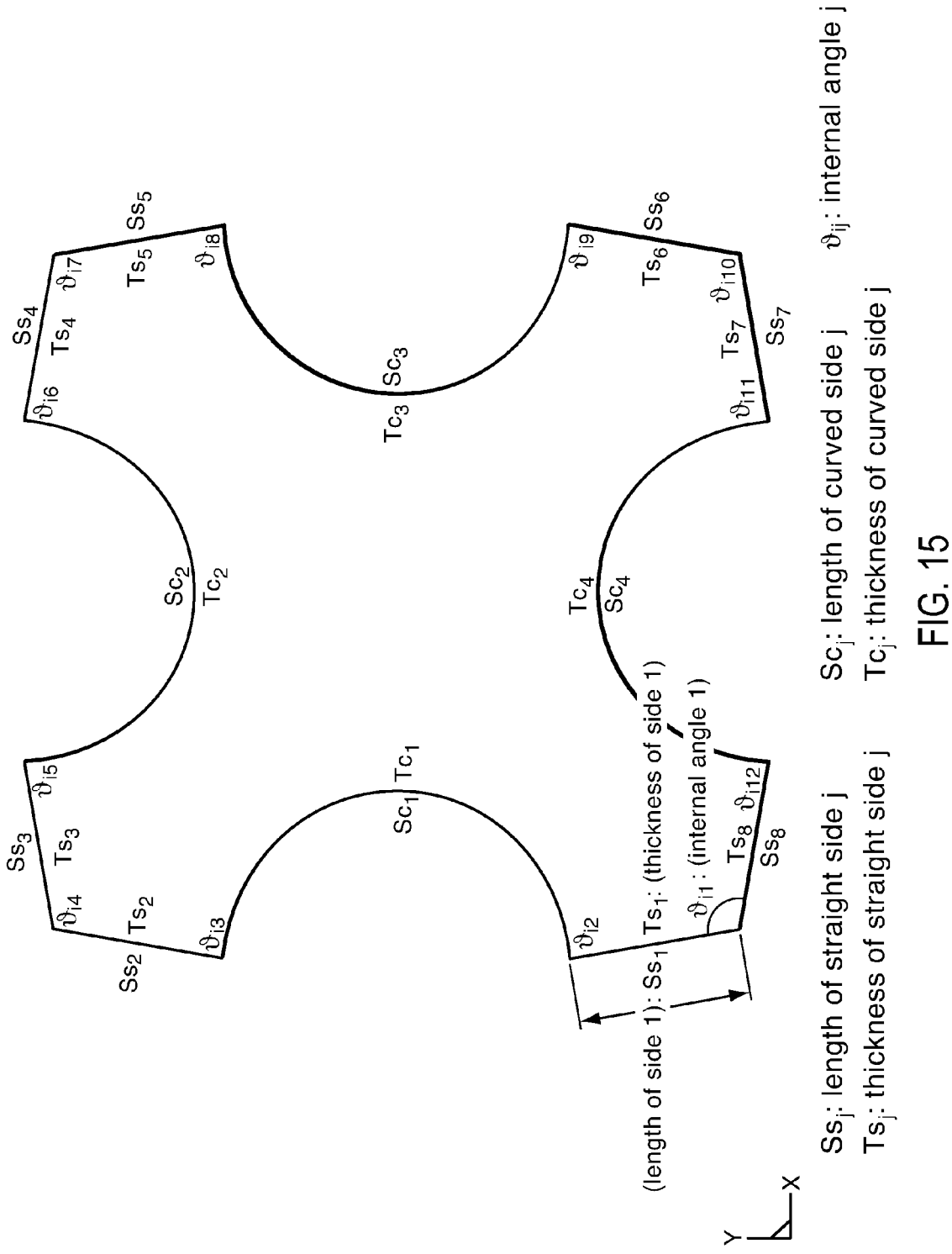
FIG. 15 illustrates an exemplary embodiment of a twelve-cornered cross section, with eight straight sides and four circular sides, for a strengthening member in accordance with the present teachings.
Figure 16C:
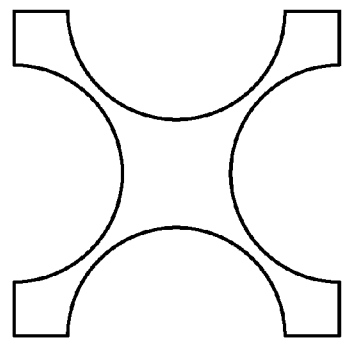
FIGS. 16A-16E illustrate how tunable parameters in accordance with the present teachings can be utilized to modulate the cross section of FIG. 15.
Figure 16E:
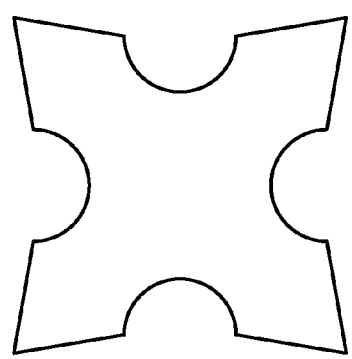
Figure 16B:
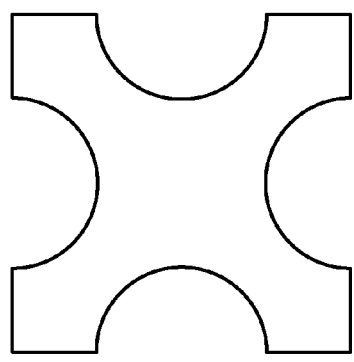
Figure 16D:
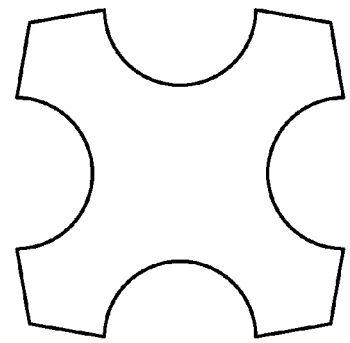
Figure 16A:
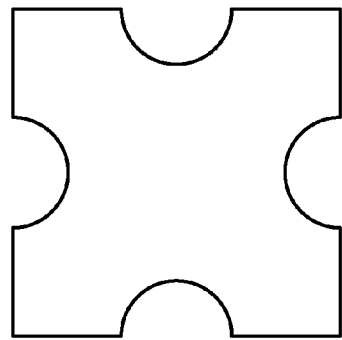

In various additional exemplary embodiments, a strengthening member in accordance with the present teachings may comprise a twelve-cornered cross section having eight straight sides and four curved sides. An exemplary embodiment of a twelve-cornered cross section for a strengthening member in accordance with the present teachings is illustrated in FIG. 15. As illustrated, the cross section comprises eight straight sides having lengths $Ss_1$-$Ss_8$ and thicknesses $Ts_1$-$Ts_8$, four circular sides having lengths $Sc_1$-$Sc_4$ and thicknesses $Tc_1$-$Tc_4$, and twelve internal corners with angles $\vartheta_{i1}$-$\vartheta_{i12}$. The side lengths and thicknesses and internal corner angles can be varied (i.e., tuned) to achieve improved strength and other performance features (e.g., stability of folding pattern) compared to existing twelve-sided cross sections. This strength improvement further obviates the need for increased corner thickness, which is an unexpected and unpredicted benefit of fine-tuning the design parameters (e.g., side lengths, thicknesses, and internal angles) of a strengthening member having an twelve-sided (i.e., twelve-cornered) cross section.

As shown in FIGS. 16A-16E, for example, in accordance with various embodiments of the present teachings, the lengths $Ss_1$-$Ss_8$ and $Sc_1$-$Sc_4$ of the sides (see FIGS. 16A-16C) and the angles $\vartheta_{i1}$-$\vartheta_{i12}$ of the internal angles (see FIGS. 16D and 16E) can be varied, as would be understood by one skilled in the art, for example in accordance with available packaging space within a vehicle. Furthermore, although not shown, in a similar manner, the thicknesses $Ts_1$-$Ts_8$ and $Tc_1$-$Tc_4$ of the sides can be varied. Those of ordinary skill in the art would understand, however, that FIGS. 16A-16E are exemplary only, and are provided merely to illustrate how design parameters can be utilized to modulate the cross section of the exemplary embodiment of FIG. 15. Thus, the present teachings contemplate various twelve-cornered cross section configurations having various shapes and dimensions (i.e., corner bend radii, side lengths, thicknesses and/or internal angles), which can be adjusted based on space requirements and/or to control member collapse modes.

In certain embodiments of the present teachings, for example, a length of each straight side ($Ss_1$-$Ss_8$) can range from about 10 mm to about 200 mm and a length of each circular side ($Sc_1$-$Sc_4$) can range from about 10 mm to about 200 mm. In certain additional embodiments, a thickness of the sides and corners can range from about 0.7 mm to about 6.0 mm; and in certain embodiments, the thickness of the sides is substantially the same as the thickness of the corners. Furthermore, in accordance with certain additional exemplary embodiments, the thickness of the strengthening member may vary, for example, within one side or from side to side to optimize the overall axial crush and bending performance.

In certain embodiments of the present teachings, each internal angle ($\vartheta_{i1}$-$\vartheta_{i12}$) ranges from about 60 degrees to about 145 degrees.

To demonstrate the improved strength and performance features of a twelve-cornered cross section in accordance with the present teachings, having eight straight sides and four circular sides, compared to various existing cross section designs, exemplary strengthening members were modeled and experimental test runs were conducted, as shown and described below with reference to FIGS. 17-21.

Figure 18:
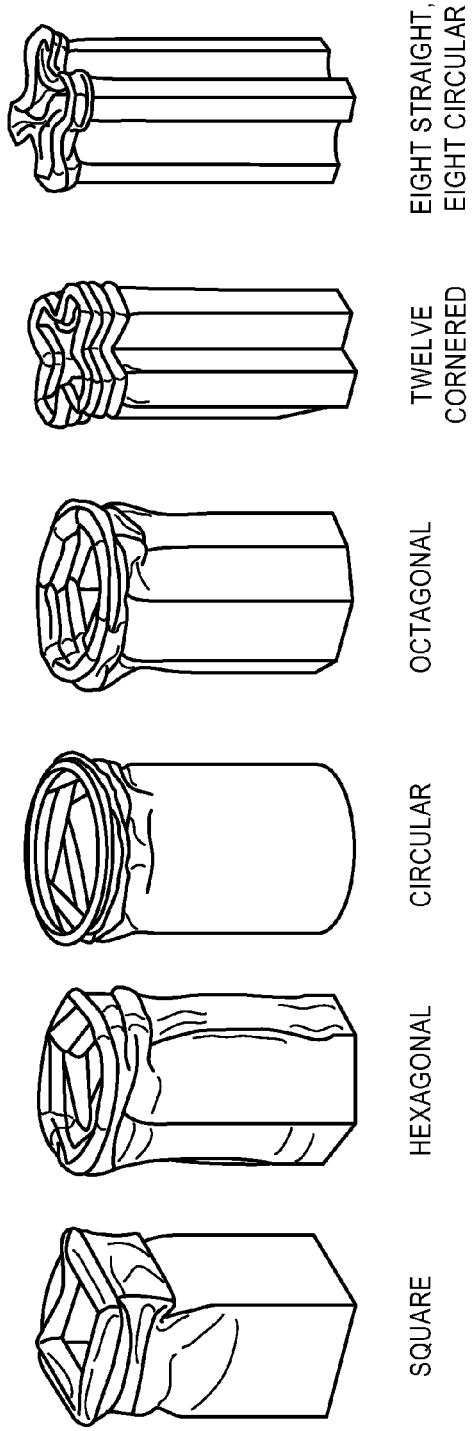
FIG. 18 illustrates an exemplary axial collapse of the strengthening members shown in FIG. 17.
Figure 19:
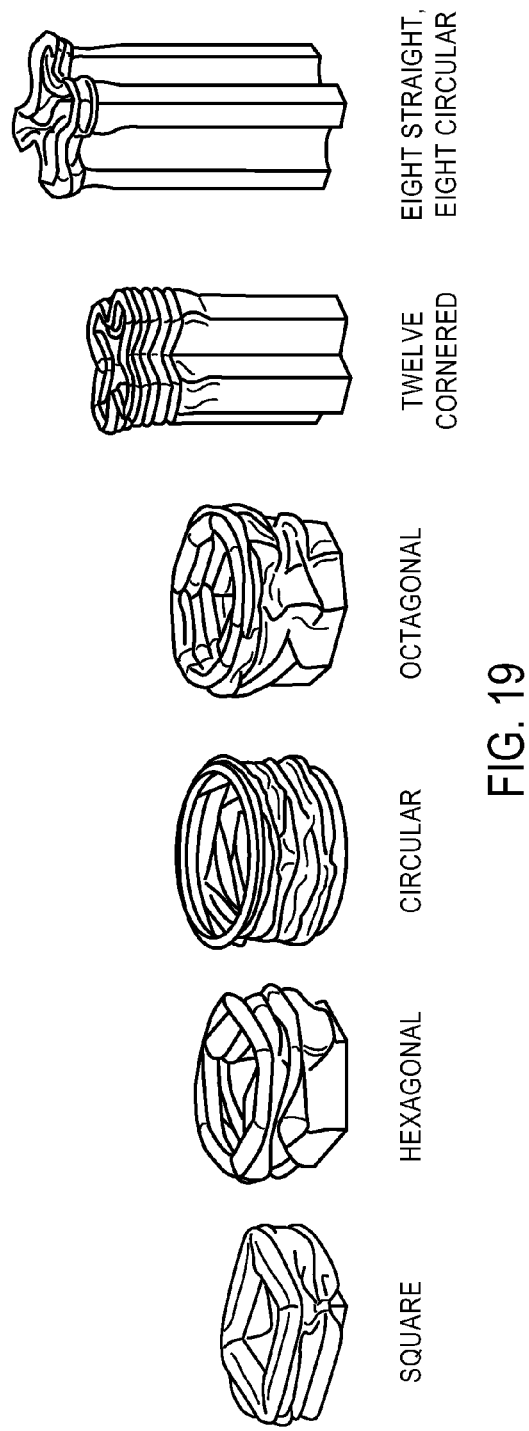
FIG. 19 illustrates an exemplary dynamic crush of the strengthening members shown in FIG. 17.

Strengthening members of varying shapes (i.e., cross sections) having the same thickness, length and perimeter (e.g., each part having a mass of about 1.22 Kg) were modeled as illustrated in FIG. 17. Tests were then run for each member to simulate an impact with the same rigid mass (e.g. an impactor), impact speed, and initial kinetic energy. As shown in FIG. 18, the twelve-cornered cross section in accordance with the present teachings having eight straight sides and four circular sides demonstrated the most stable axial collapse and the highest crash energy absorption. Furthermore, as shown in FIG. 19, the twelve-cornered cross section in accordance with the present teachings also demonstrated the shortest crush distance and smallest folding length.

Figure 20:
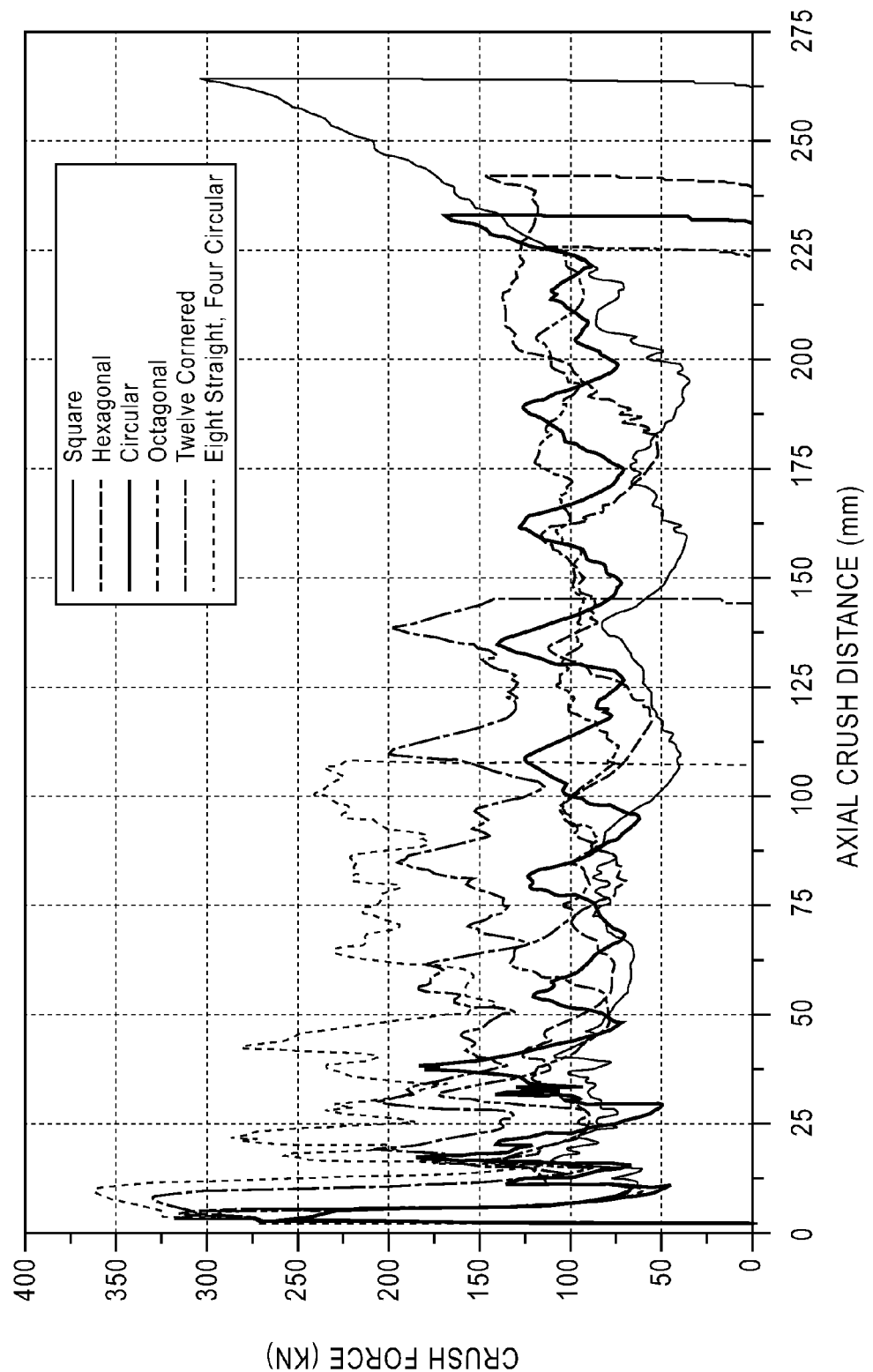
FIG. 20 is a graph of the crush force and associated axial crush distance for exemplary strengthening members having the cross sections shown in FIG. 17.

FIG. 20 illustrates the crush force (in KN) and associated axial crush distance (in mm) for the simulated impact, exerted axially on the exemplary strengthening members having the cross sections shown in FIG. 17. As shown in FIG. 20, the strengthening member having an eight-cornered cross section with eight straight sides and four circular sides could sustain a much higher crushing force for a given resulting crushing distance as compared with the square, hexagonal, circular and octagonal cross sections. In fact, a twelve-cornered cross section in accordance with the present teachings also achieved about a 25% to about 35% increase in crash energy absorption as compared with an existing twelve-sided cross section.

Figure 21:
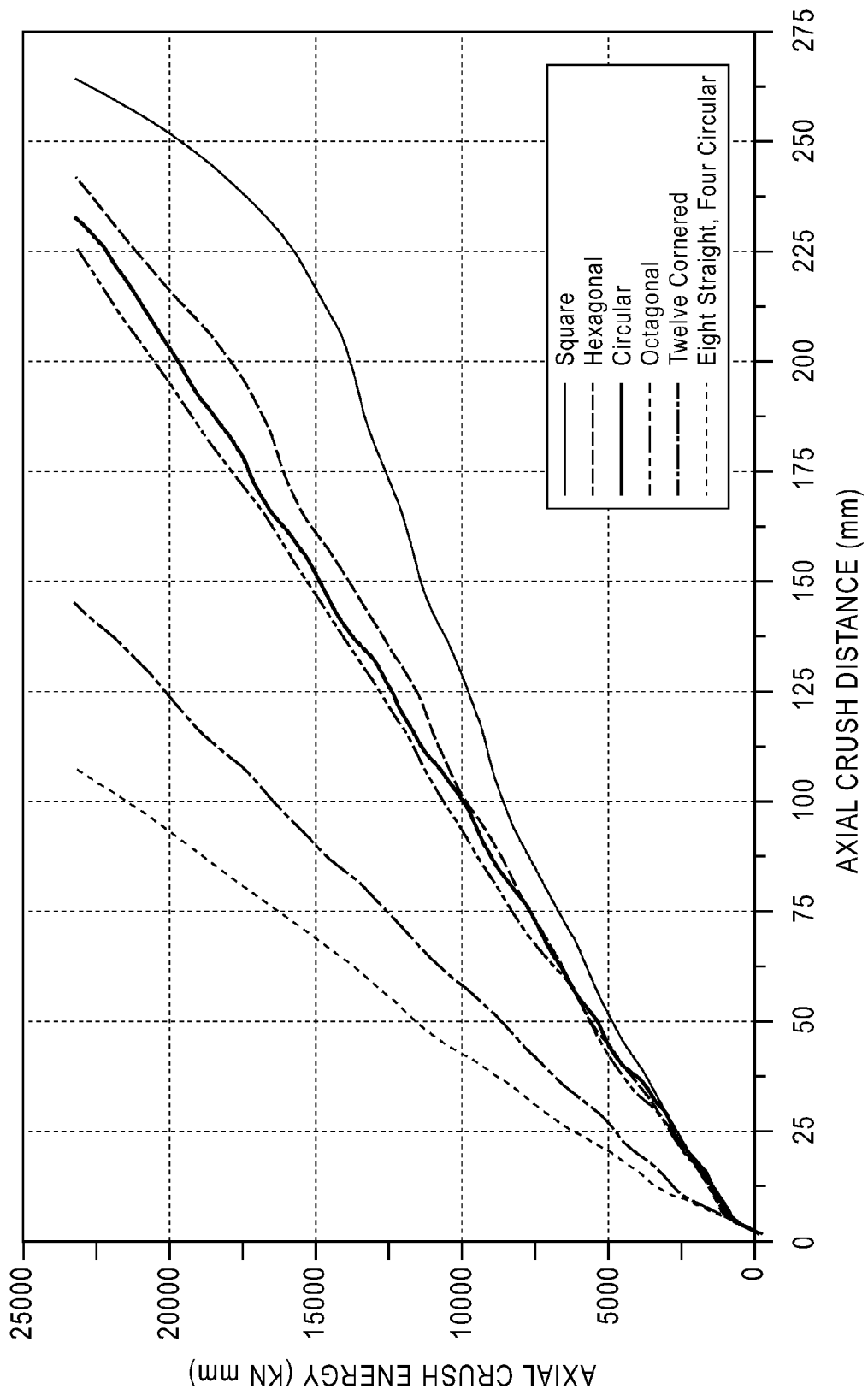
FIG. 21 is a graph of the axial crush energy and associated axial crush distance for exemplary strengthening members having the cross sections shown in FIG. 17.

FIG. 21 illustrates the axial crush energy (in KN-mm) and associated axial crush distance (in mm) for the exemplary strengthening members having the cross sections shown in FIG. 17. As shown in FIG. 21, the strengthening member having a twelve-cornered cross section with eight straight sides and four circular sides could absorb the total kinetic energy of the impact (i.e., 22983 KN-mm) over a much shorter distance as compared with the square, hexagonal, circular and octagonal cross sections. In fact, a twelve-cornered cross section in accordance with the present teachings also absorbed the full axial crush energy in about 75% of the axial crush distance as the existing twelve-sided cross section.

Figure 22:
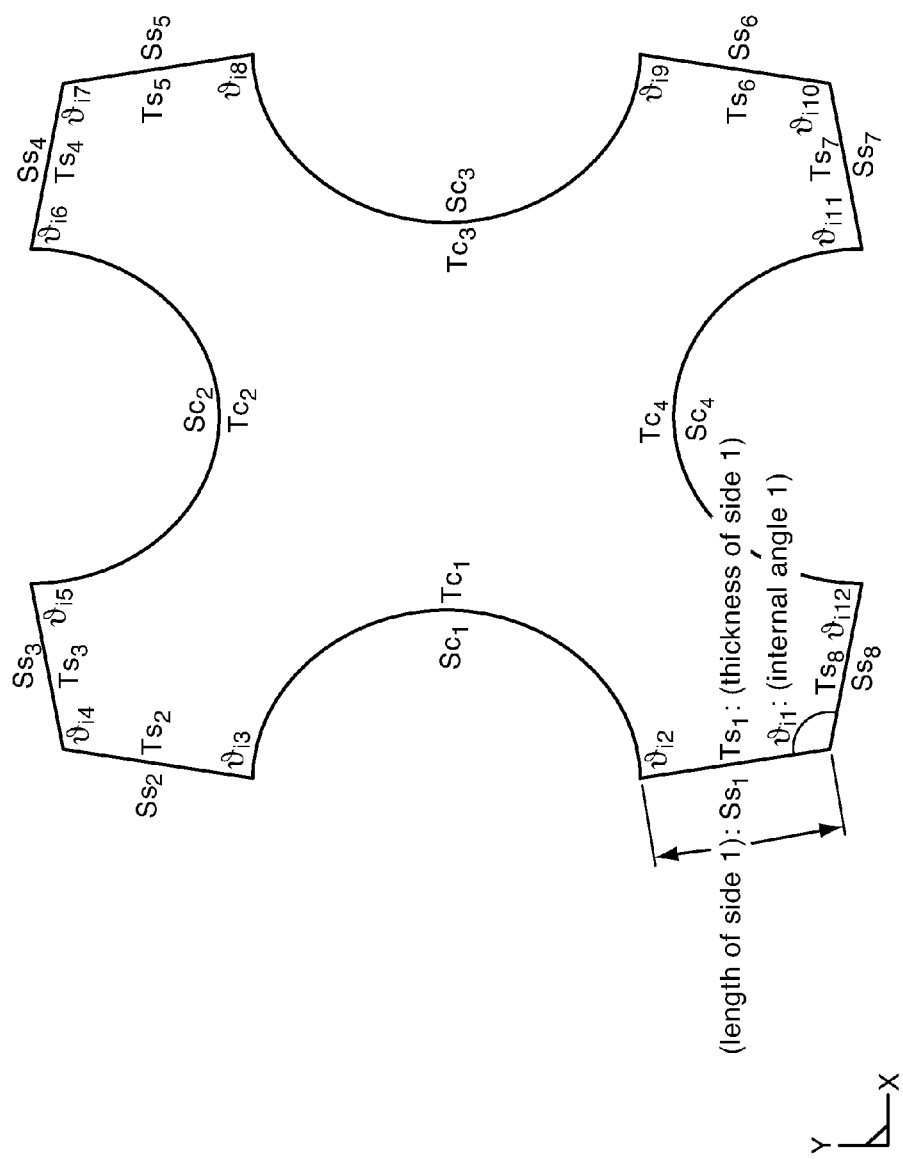
FIG. 22 illustrates an exemplary embodiment of a twelve-cornered cross section, with eight straight sides and four elliptical sides, for a strengthening member in accordance with the present teachings.
Figure 23C:
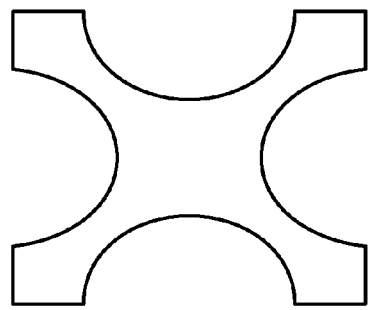
FIGS. 23A-23E illustrate how tunable parameters in accordance with the present teachings can be utilized to modulate the cross section of FIG. 22.
Figure 23E:
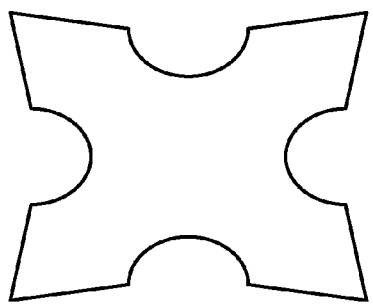
Figure 23B:
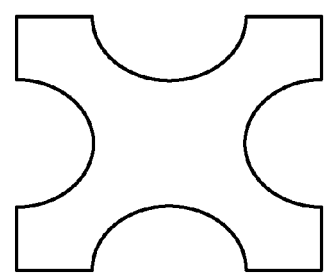
Figure 23D:
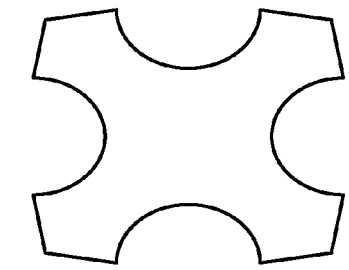
Figure 23A:
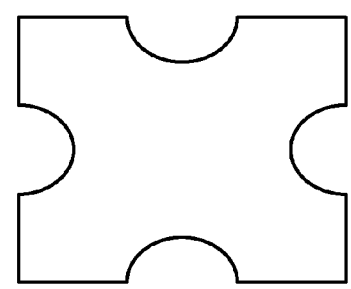

An additional exemplary embodiment of a twelve-cornered cross section for a strengthening member in accordance with the present teachings is illustrated in FIG. 22. As illustrated, the cross section comprises eight straight sides having lengths $Ss_1$-$Ss_8$ and thicknesses $Ts_1$-$Ts_8$, four elliptical sides having lengths $Sc_1$-$Sc_4$ and thicknesses $Tc_1$-$Tc_4$, and twelve internal corners with angles $\vartheta_{i1}$-$\vartheta_{i12}$. As above, the side lengths and thicknesses and internal corner angles can be varied (i.e., tuned) to achieve improved strength and other performance features (e.g., stability of folding pattern) compared to existing twelve-sided cross sections, and may further obviate the need for increased corner thickness.

As shown in FIGS. 23A-23E, for example, in accordance with various embodiments of the present teachings, the lengths $Ss_1$-$Ss_s$ and $Sc_1$-$Sc_4$ of the sides (see FIGS. 23A-23C) and the angles $\vartheta_{i1}$-$\vartheta_{i12}$ of the internal angles (see FIGS. 23D and 23E) can be varied, as would be understood by one skilled in the art, for example in accordance with available packaging space within a vehicle. Furthermore, although not shown, in a similar manner, the thicknesses $Ts_1$-$Ts_8$ and $Tc_1$-$Tc_4$ of the sides can be varied. Those of ordinary skill in the art would understand, however, that FIGS. 23A-23E are exemplary only, and are provided merely to illustrate how design parameters can be utilized to modulate the cross section of the exemplary embodiment of FIG. 22. Thus, as above, the present teachings contemplate various twelve-cornered cross section configurations having various shapes and dimensions (i.e., corner bend radii, side lengths, thicknesses and/or internal angles), which can be adjusted based on space requirements and/or to control member collapse modes.

In certain embodiments of the present teachings, for example, a length of each straight side ($Ss_1$-$Ss_8$) can range from about 10 mm to about 200 mm and a length of each elliptical side ($Sc_1$-$Sc_4$) can range from about 10 mm to about 200 mm. In certain additional embodiments, a thickness of the sides and corners can range from about 0.7 mm to about 6.0 mm; and in certain embodiments, the thickness of the sides is substantially the same as the thickness of the corners. Furthermore, in accordance with certain additional exemplary embodiments, the thickness of the strengthening member may vary, for example, within one side or from side to side to optimize the overall axial crush and bending performance.

In certain embodiments of the present teachings, each internal angle ($\vartheta_{i1}$-$\vartheta_{i12}$) ranges from about 60 degrees to about 145 degrees.

To demonstrate the improved strength and performance features of a twelve-cornered cross section in accordance with the present teachings, having eight straight sides and four elliptical sides, compared to various existing cross section designs, exemplary strengthening members were modeled and experimental test runs were conducted, as shown and described below with reference to FIGS. 24-28.

Figure 24:
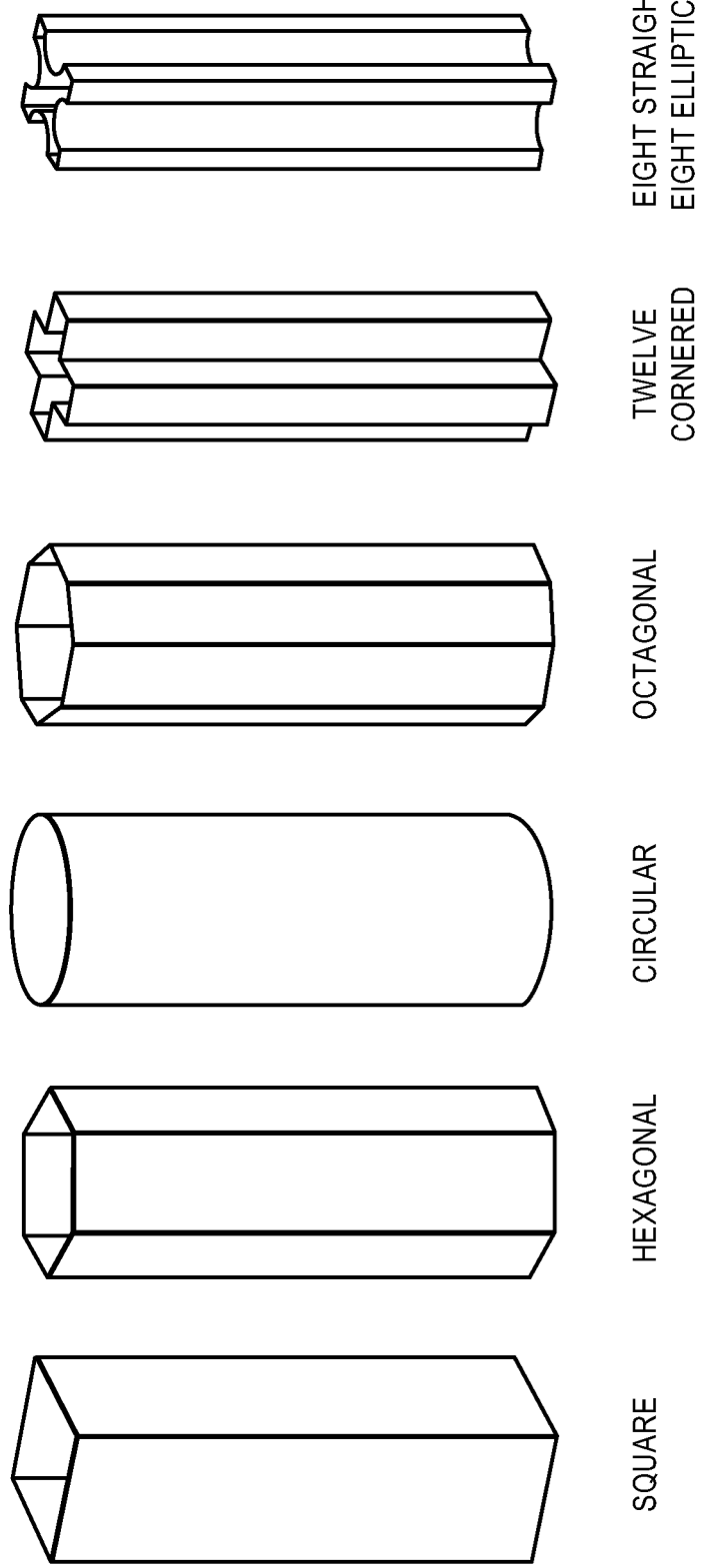
FIG. 24 illustrates strengthening members of varying cross sections having substantially the same thickness, length and perimeter.
Figure 25:
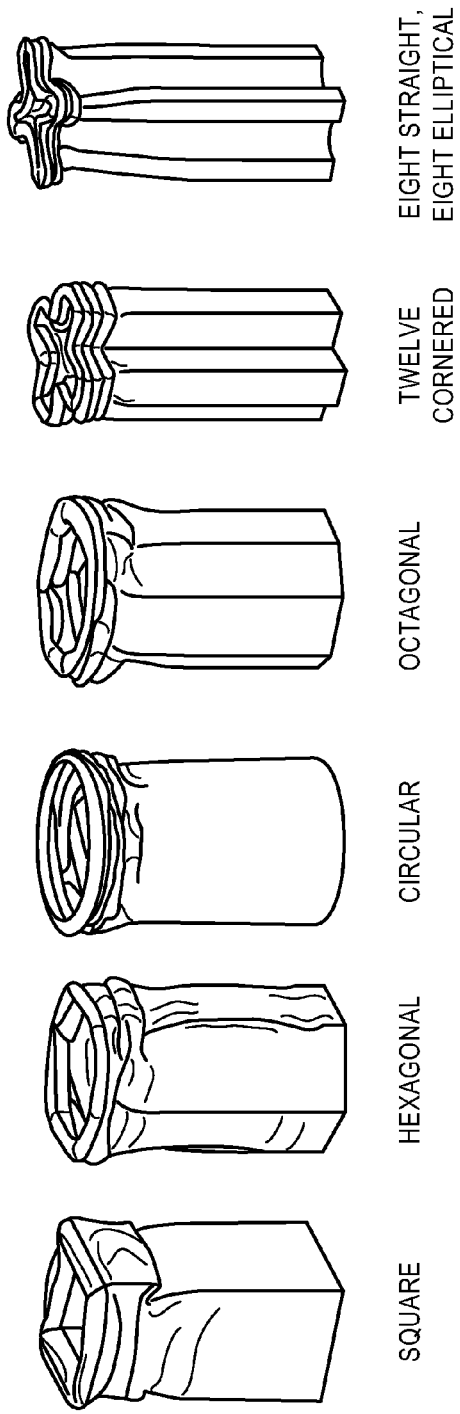
FIG. 25 illustrates an exemplary axial collapse of the strengthening members shown in FIG. 24.
Figure 26:
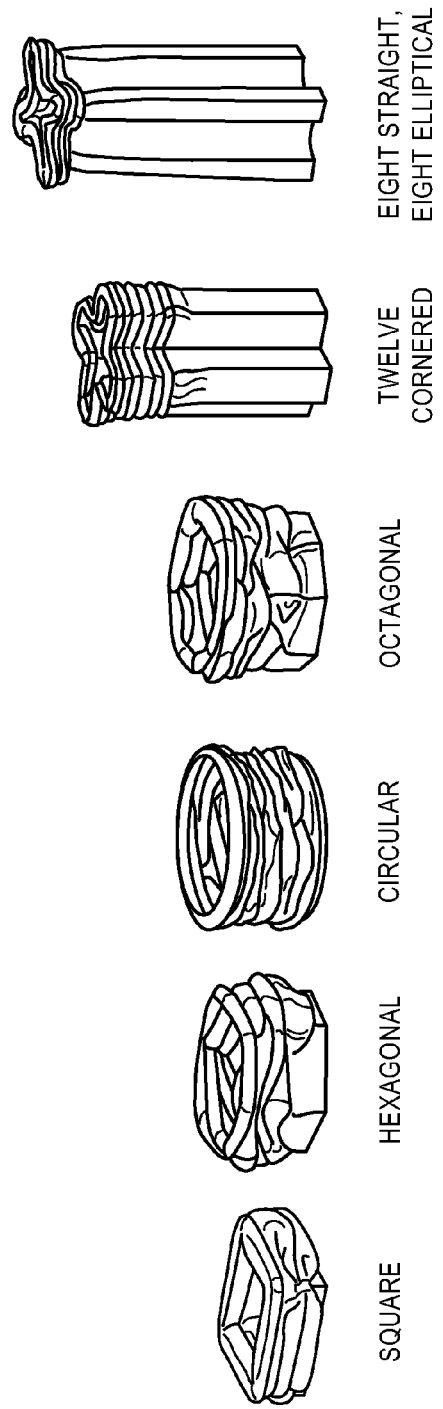
FIG. 26 illustrates an exemplary dynamic crush of the strengthening members shown in FIG. 24.

As above, strengthening members of varying shapes (i.e., cross sections) having the same thickness, length and perimeter (e.g., each part having a mass of about 1.22 Kg) were modeled as illustrated in FIG. 24. Tests were then run for each member to simulate an impact with the same rigid mass (e.g. an impactor), impact speed, and initial kinetic energy. As shown in FIG. 25, the twelve-cornered cross section in accordance with the present teachings having eight straight sides and four elliptical sides demonstrated the most stable axial collapse and the highest crash energy absorption. Furthermore, as shown in FIG. 26, the twelve-cornered cross section in accordance with the present teachings also demonstrated the shortest crush distance and smallest folding length.

Figure 27:
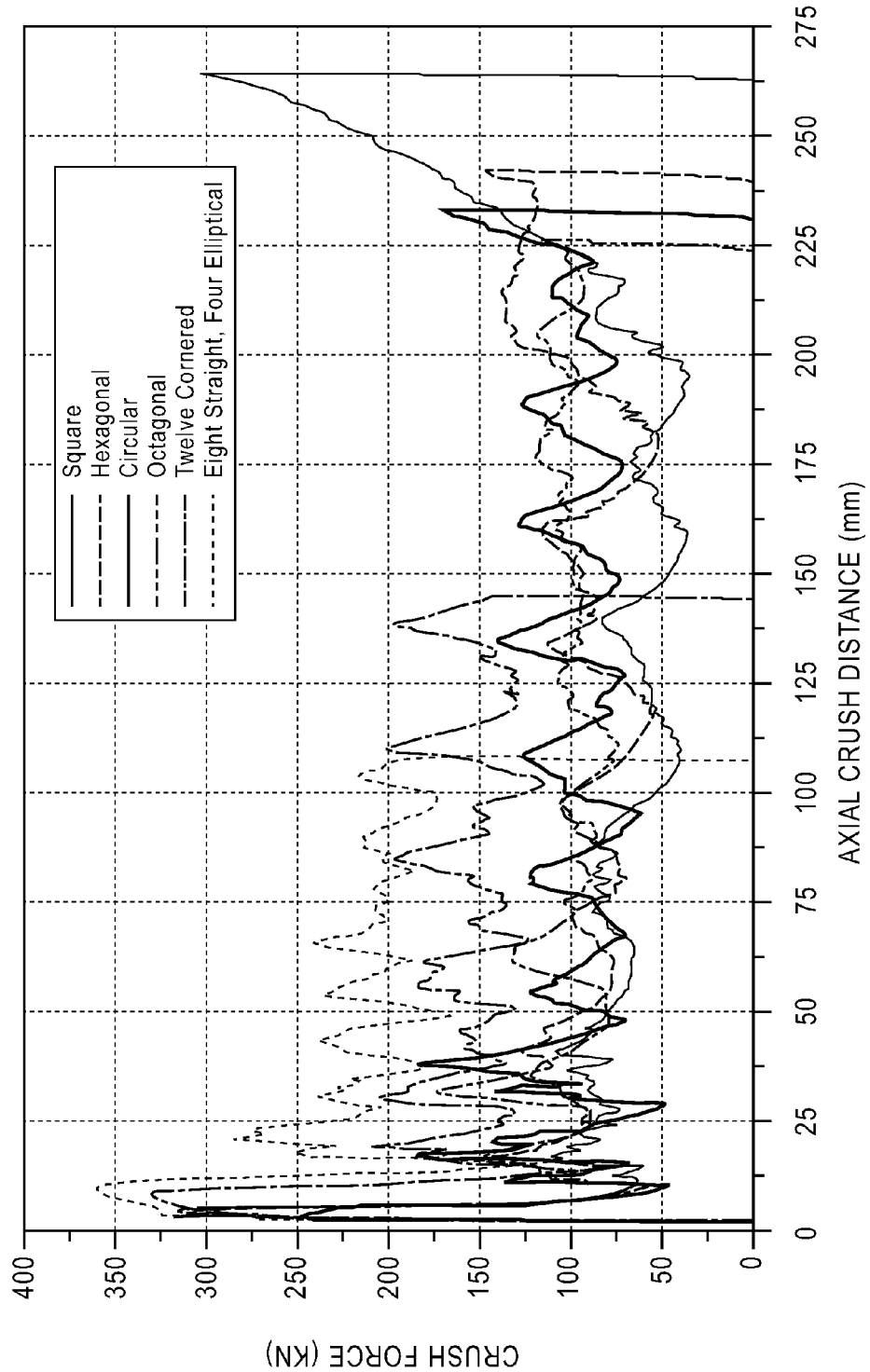
FIG. 27 is a graph of the crush force and associated axial crush distance for exemplary strengthening members having the cross sections shown in FIG. 24.

FIG. 27 illustrates the crush force (in KN) and associated axial crush distance (in mm) for the simulated impact, exerted axially on the exemplary strengthening members having the cross sections shown in FIG. 24. As shown in FIG. 27, the strengthening member having an eight-cornered cross section with eight straight sides and four elliptical sides could sustain a much higher crushing force for a given resulting crushing distance as compared with the square, hexagonal, circular and octagonal cross sections. In fact, once again, the twelve-cornered cross section in accordance with the present teachings achieved about a 25% to about 30% increase in crash energy absorption as compared with the existing twelve-sided cross section.

Figure 28:
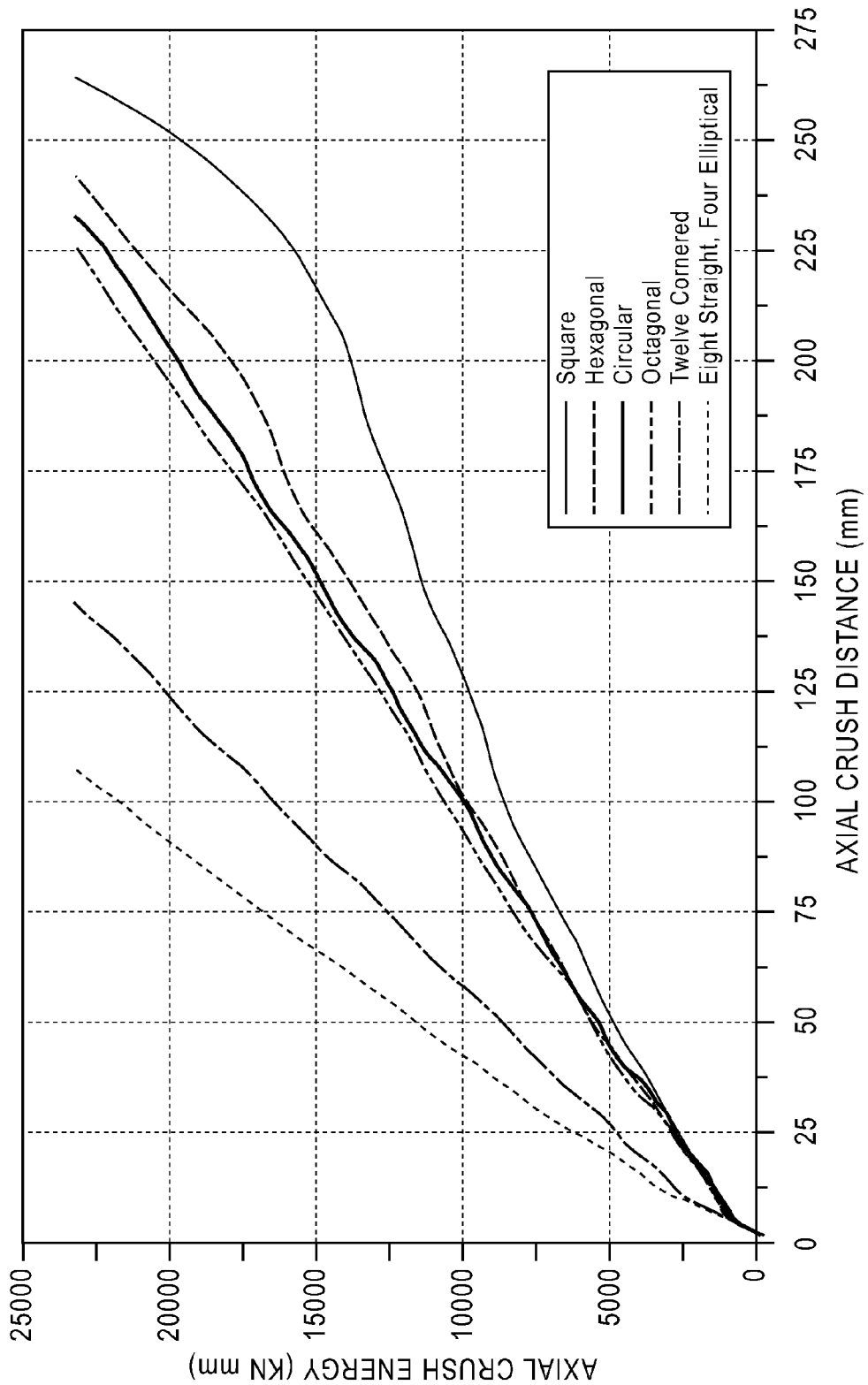
FIG. 28 is a graph of the axial crush energy and associated axial crush distance for exemplary strengthening members having the cross sections shown in FIG. 24.

FIG. 28 illustrates the axial crush energy (in KN-mm) and associated axial crush distance (in mm) for the exemplary strengthening members having the cross sections shown in FIG. 24. As shown in FIG. 28, the strengthening member having a twelve-cornered cross section with eight straight sides and four elliptical sides could absorb the total kinetic energy of the impact (i.e., 22983 KN-mm) over a much shorter distance as compared with the square, hexagonal, circular and octagonal cross sections. And, once again, the twelve-cornered cross section in accordance with the present teachings absorbed the full axial crush energy in about 75% of the axial crush distance as the existing twelve-sided cross section.

Twelve-cornered cross sections in accordance with the present teachings (having eight straight sides and four curved sides) may, therefore, allow improved impact energy management over, for example, basic polygonal strengthening member cross sections and an existing twelve-sided cross-section, while minimizing mass per unit length.

Figure 29:
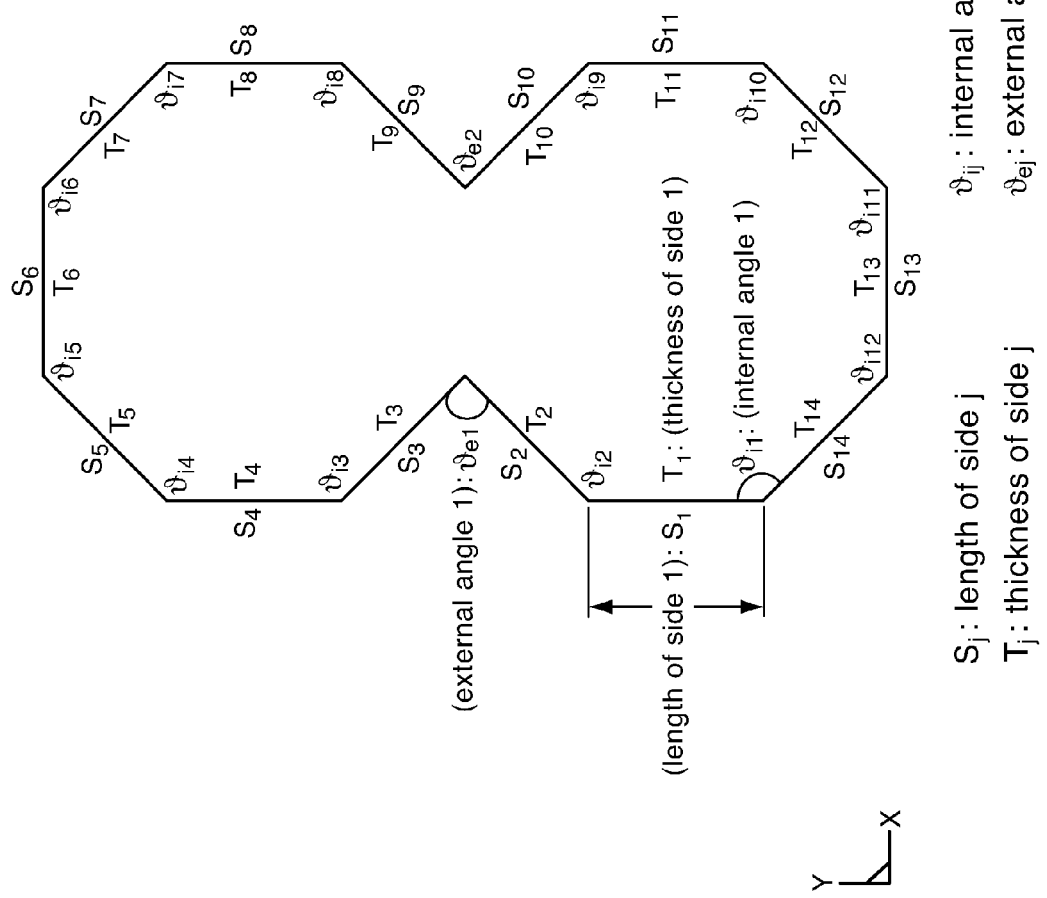
FIG. 29 illustrates an exemplary embodiment of a fourteen-cornered cross section for a strengthening member in accordance with the present teachings.

In various additional exemplary embodiments, a strengthening member in accordance with the present teachings may comprise a fourteen-cornered cross section. An exemplary embodiment of a fourteen-cornered cross section for a strengthening member in accordance with the present teachings is illustrated in FIG. 29. As illustrated, the cross section comprises fourteen sides having lengths $S_1$-$S_{14}$ and thicknesses $T_1$-$T_{14}$, twelve internal corners with angles $\vartheta_{i1}$-$\vartheta_{i12}$, and two external corners with angles $\vartheta_{e1}$ and $\vartheta_{e2}$. The side lengths and thicknesses and internal and external corner angles can be varied (i.e., tuned) to achieve improved strength and other performance features (e.g., stability of folding pattern) compared to existing strengthening member cross sections. This strength improvement further obviates the need for increased corner thickness, which is an unexpected and unpredicted benefit of fine-tuning the design parameters (e.g., side lengths, thicknesses, internal angles, and external angles) of a strengthening member having a fourteen-sided (i.e., fourteen-cornered) cross section.

Figure 30A:
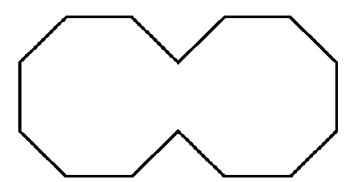
FIGS. 30A-30E illustrate how tunable parameters in accordance with the present teachings can be utilized to modulate the cross section of FIG. 29.
Figure 30B:
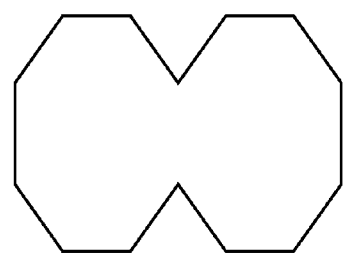
Figure 30C:
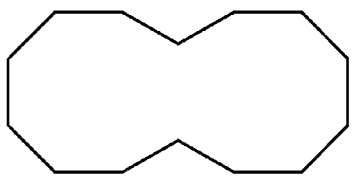
Figure 30D:
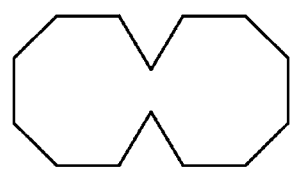
Figure 30E:
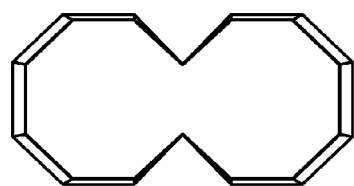

As shown in FIGS. 30A-30E, for example, in accordance with various embodiments of the present teachings, the lengths $S_1$-$S_{14}$ (see FIG. 30B) and thicknesses $T_1$-$T_{14}$ (see FIG. 30E showing tapered sides) of the sides and the angles $\vartheta_{e1}$ and $\vartheta_{e3}$ of the external angles (see FIGS. 30C and 30D) can be varied, as would be understood by one skilled in the art, for example in accordance with available packaging space within a vehicle. Furthermore, although not shown, in a similar manner, the angles $\vartheta_{i1}$-$\vartheta_{i12}$ of the internal angles can be varied. Those of ordinary skill in the art would understand, however, that FIGS. 30A-30E are exemplary only, and are provided merely to illustrate how design parameters can be utilized to modulate the cross section of the exemplary embodiment of FIG. 29. Thus, the present teachings contemplate various fourteen-cornered cross section configurations having various shapes and dimensions (i.e., corner bend radii, side lengths, thicknesses, internal angles and/or external angles), which can be adjusted based on space requirements and/or to control member collapse modes.

In certain embodiments of the present teachings, for example, a length of each side ($S_1$-$S_{14}$) can range from about 10 mm to about 200 mm. In certain additional embodiments, a thickness of the sides and corners can range from about 0.7 mm to about 6.0 mm; and in certain embodiments, the thickness of the sides is substantially the same as the thickness of the corners. Furthermore, in accordance with certain additional exemplary embodiments, the thickness of the strengthening member may vary, for example, within one side or from side to side to optimize the overall axial crush and bending performance.

In certain embodiments of the present teachings, each internal angle ($\vartheta_{i1}$-$\vartheta_{i12}$) ranges from about 95 degrees to about 145 degrees, and each external angle ($\vartheta_{e1}$ and $\vartheta_{e2}$) ranges from about 5 degrees to about 130 degrees.

To demonstrate the improved strength and performance features of a fourteen-cornered cross section in accordance with the present teachings compared to various existing cross section designs, exemplary strengthening members were modeled and experimental test runs were conducted, as shown and described below with reference to FIGS. 31-35.

Figure 32:
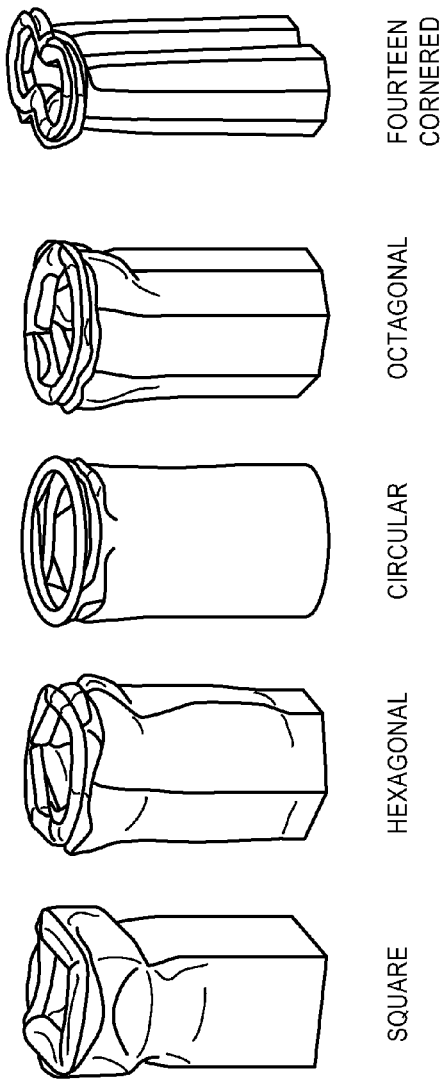
FIG. 32 illustrates an exemplary axial collapse of the strengthening members shown in FIG. 31.
Figure 33:
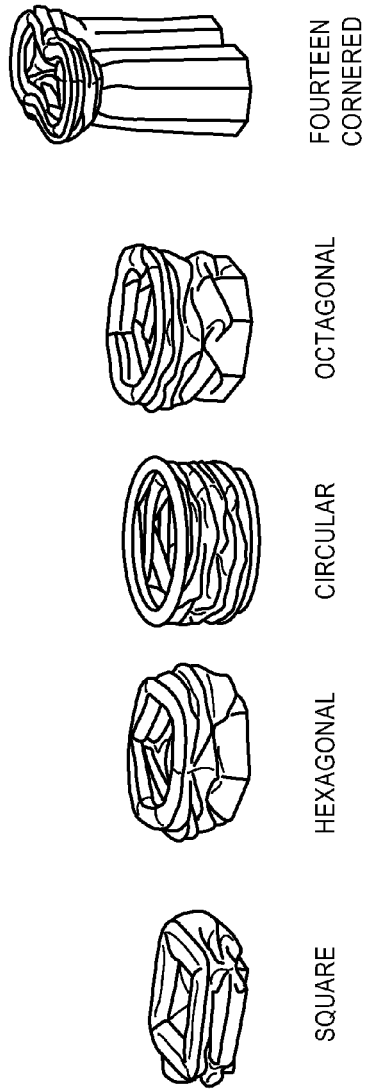
FIG. 33 illustrates an exemplary dynamic crush of the strengthening members shown in FIG. 31.

Strengthening members of varying shapes (i.e., cross sections) having the same thickness, length and perimeter (e.g., each part having a mass of about 1.22 Kg) were modeled as illustrated in FIG. 31. Tests were then run for each member to simulate an impact with the same rigid mass (e.g. an impactor), impact speed, and initial kinetic energy. As shown in FIG. 32, the fourteen-cornered cross section in accordance with the present teachings demonstrated the most stable axial collapse and the highest crash energy absorption. Furthermore, as shown in FIG. 33, the fourteen-cornered cross section in accordance with the present teachings also demonstrated the shortest crush distance and smallest folding length.

Figure 34:
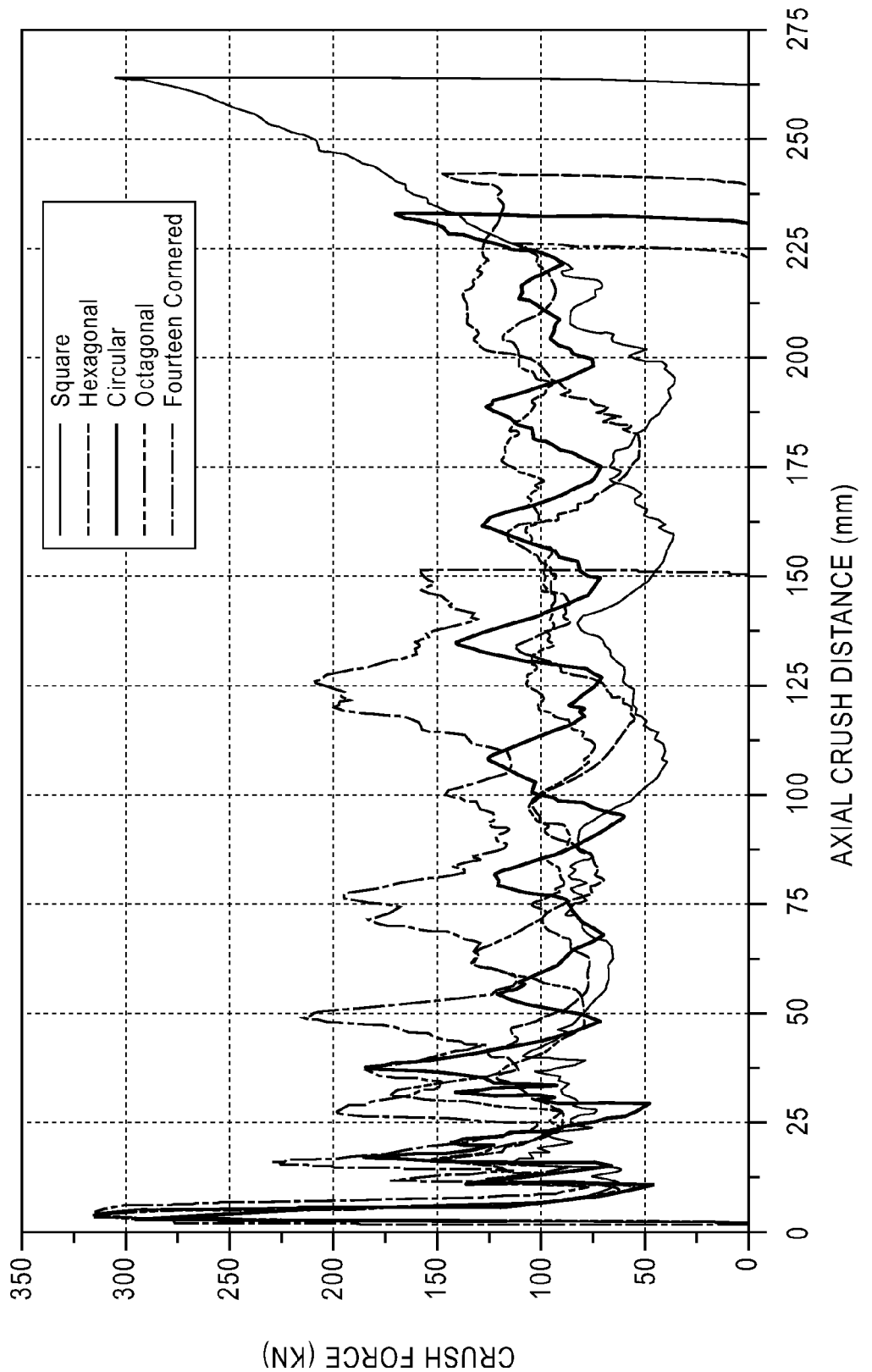
FIG. 34 is a graph of the crush force and associated axial crush distance for exemplary strengthening members having the cross sections shown in FIG. 31.

FIG. 34 illustrates the crush force (in KN) and associated axial crush distance (in mm) for the simulated impact, exerted axially on the exemplary strengthening members having the cross sections shown in FIG. 31. As shown in FIG. 34, the strengthening member having a fourteen-cornered cross section could sustain a much higher crushing force for a given resulting crushing distance as compared with the square, hexagonal, circular and octagonal cross sections.

Figure 35:
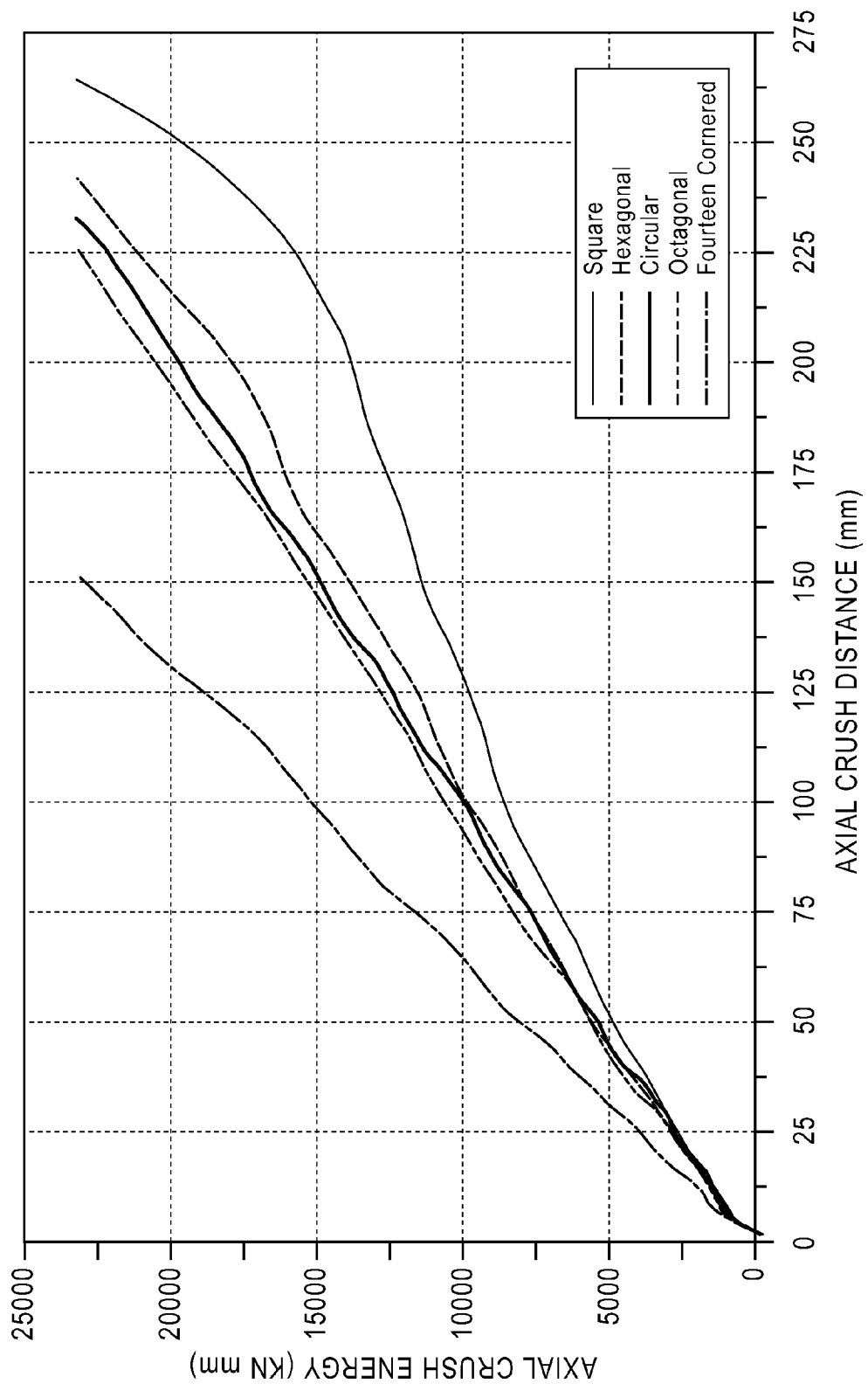
FIG. 35 is a graph of the axial crush energy and associated axial crush distance for exemplary strengthening members having the cross sections shown in FIG. 31.

FIG. 35 illustrates the axial crush energy (in KN-mm) and associated axial crush distance (in mm) for the exemplary strengthening members having the cross sections shown in FIG. 31. As shown in FIG. 35, the strengthening member having a fourteen-cornered cross section could absorb the total kinetic energy of the impact (i.e., 22983 KN-mm) over a much shorter distance as compared with the square, hexagonal, circular and octagonal cross sections.

To further demonstrate the improved strength and performance features of a fourteen-cornered cross section in accordance with the present teachings compared to basic fourteen-sided cross section designs, as above, exemplary strengthening members were modeled and experimental test runs were conducted, as shown and described below with reference to FIGS. 36-40.

Strengthening members of varying shapes (i.e., fourteen-sided cross sections) having the same thickness, length and perimeter (e.g., each part having a mass of about 1.22 Kg) were modeled as illustrated in FIG. 36. As above, tests were then run for each member to simulate an impact with the same rigid mass (e.g. an impactor), impact speed, and initial kinetic energy. As shown in FIG. 37, the fourteen-cornered cross section in accordance with the present teachings demonstrated the most stable axial collapse and the highest crash energy absorption. Furthermore, as shown in FIG. 38, the fourteen-cornered cross section in accordance with the present teachings also demonstrated the shortest crush distance and smallest folding length.

Figure 39:
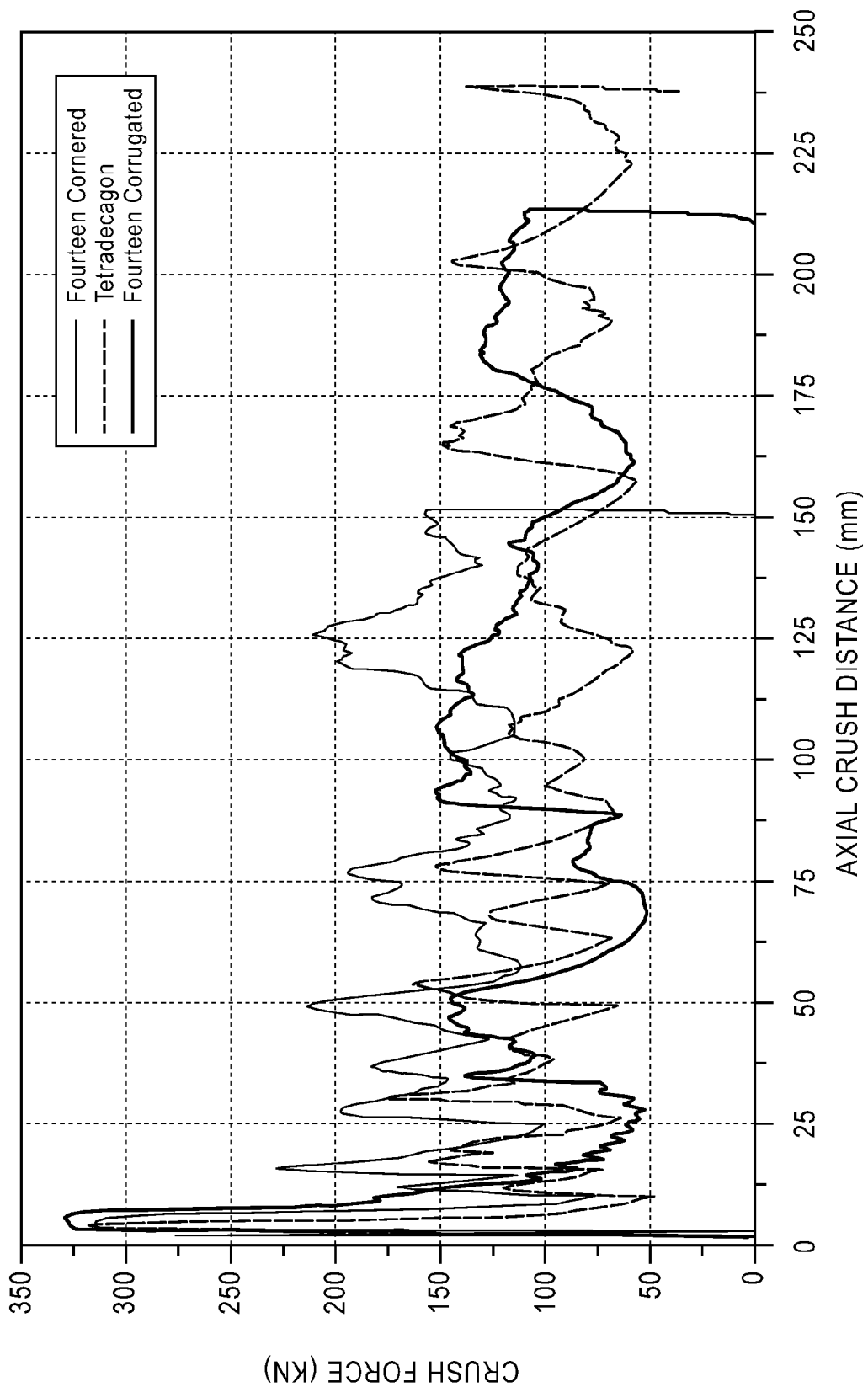
FIG. 39 is a graph of the crush force and associated axial crush distance for exemplary strengthening members having the cross sections shown in FIG. 36.

FIG. 39 illustrates the crush force (in KN) and associated axial crush distance (in mm) for the simulated impact, exerted axially on the exemplary strengthening members having the cross sections shown in FIG. 36. As shown in FIG. 34, the strengthening member having a fourteen-cornered cross section in accordance with the present teachings could sustain a much higher crushing force for a given resulting crushing distance as compared with the other fourteen-sided cross sections (i.e., a basic fourteen-sided polygon (tetradecagon) and a fourteen-sided corrugated polygon). In fact, the fourteen-cornered cross section in accordance with the present teachings achieved about a 35% to about 45% increase in crash energy absorption as compared with the tetradecagon.

Figure 40:
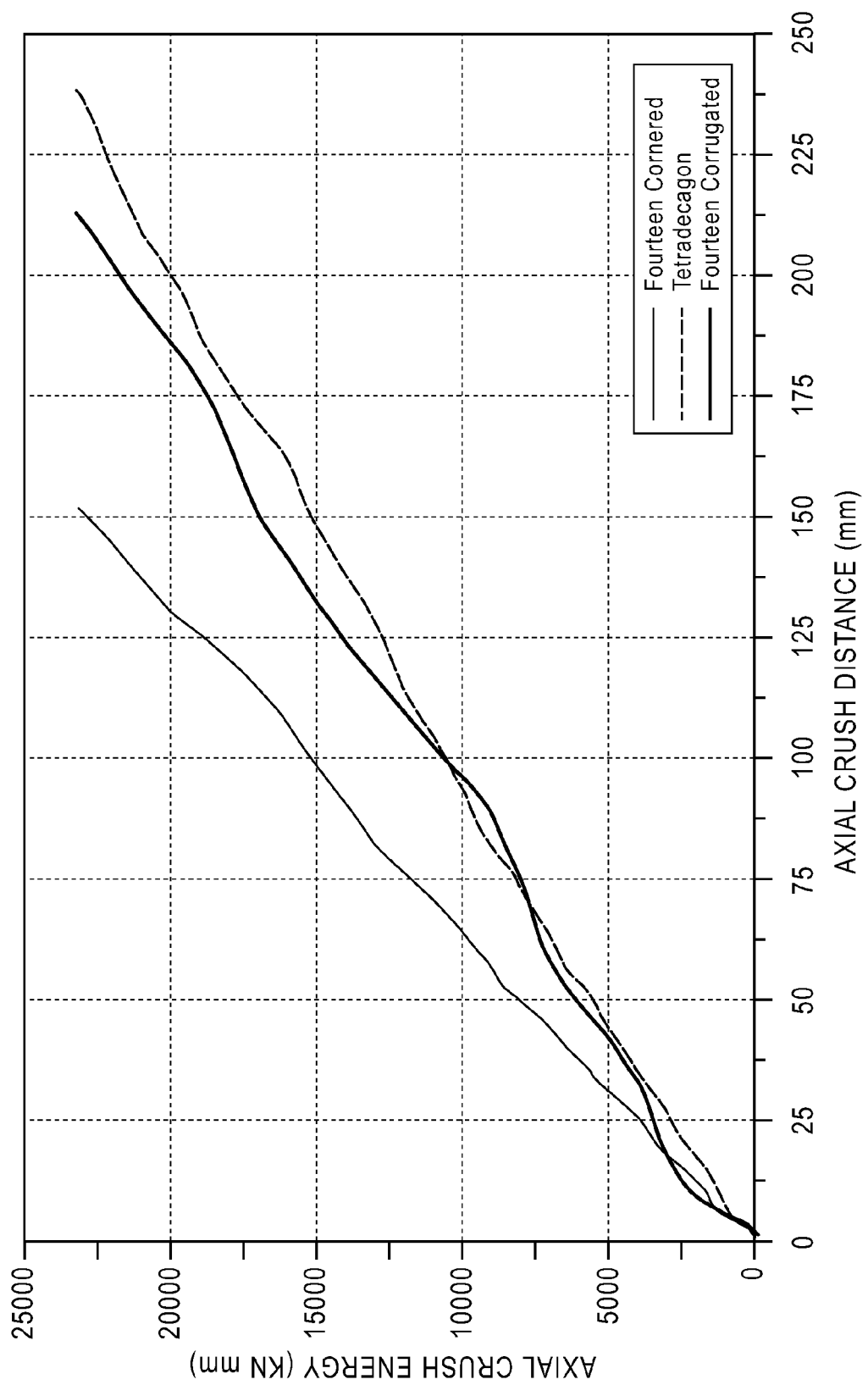
FIG. 40 is a graph of the axial crush energy and associated axial crush distance for exemplary strengthening members having the cross sections shown in FIG. 36.

FIG. 40 illustrates the axial crush energy (in KN-mm) and associated axial crush distance (in mm) for the exemplary strengthening members having the cross sections shown in FIG. 36. As shown in FIG. 40, the strengthening member having a fourteen-cornered cross section in accordance with the present teachings could absorb the total kinetic energy of the impact (i.e., 22983 KN-mm) over a much shorter distance as compared with the other fourteen-sided cross sections. In fact, the fourteen-cornered cross section in accordance with the present teachings absorbed the full axial crush energy in about 65% of the axial crush distance as the tetradecagon.

Fourteen-cornered cross sections in accordance with the present teachings may, therefore, allow improved impact energy management over, for example, basic polygonal strengthening member cross sections, including basic fourteen-sided polygonal cross sections, while minimizing mass per unit length.

Figure 41:
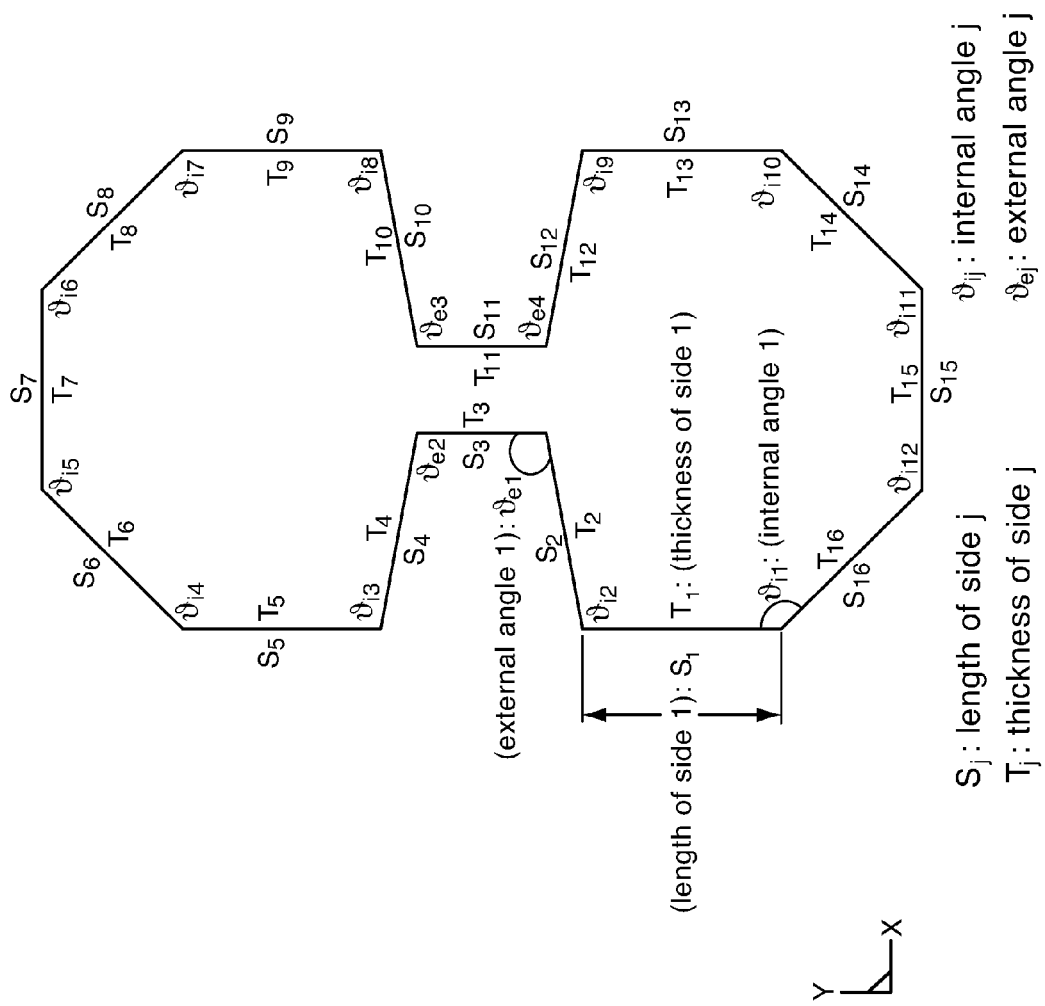
FIG. 41 illustrates an exemplary embodiment of a sixteen-cornered cross section for a strengthening member in accordance with the present teachings.

In various additional exemplary embodiments, a strengthening member in accordance with the present teachings may comprise a sixteen-cornered cross section. An exemplary embodiment of a sixteen-cornered cross section for a strengthening member in accordance with the present teachings is illustrated in FIG. 41. As illustrated, the cross section comprises sixteen sides having lengths $S_1$-$S_{16}$ and thicknesses $T_1$-$T_{16}$, twelve internal corners with angles $\vartheta_{i1}$-$\vartheta_{i12}$, and four external corners with angles $\vartheta_{e1}$-$\vartheta_{e4}$. The side lengths and thicknesses and internal and external corner angles can be varied (i.e., tuned) to achieve improved strength and other performance features (e.g., stability of folding pattern) compared to existing strengthening member cross sections. This strength improvement further obviates the need for increased corner thickness, which is an unexpected and unpredicted benefit of fine-tuning the design parameters (e.g., side lengths, thicknesses, internal angles, and external angles) of a strengthening member having a sixteen-sided (i.e., sixteen-cornered) cross section.

Figure 42C:
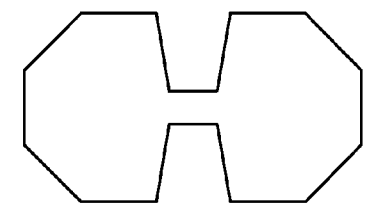
FIGS. 42A-42E illustrate how tunable parameters in accordance with the present teachings can be utilized to modulate the cross section of FIG. 41.
Figure 42E:
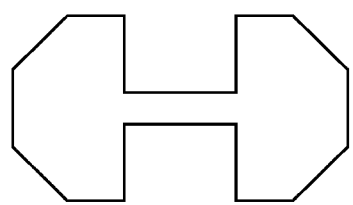
Figure 42B:
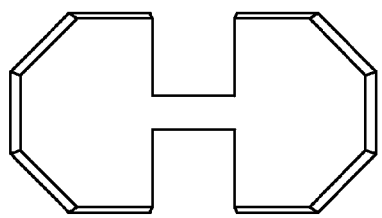
Figure 42D:
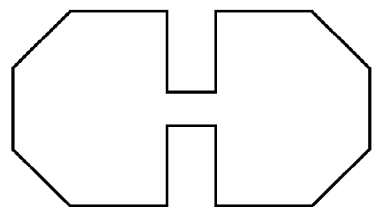
Figure 42A:
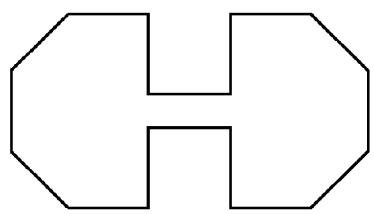

As shown in FIGS. 42A-42E, for example, in accordance with various embodiments of the present teachings, the lengths $S_1$-$S_{16}$ (see FIGS. 42D and 42E) and thicknesses $T_1$-$T_{16}$ (see FIG. 42B showing tapered sides) of the sides and the angles $\vartheta_{i1}$-$\vartheta_{i12}$ of the internal angles and the angles $\vartheta_{e1}$-$\vartheta_{e4}$ of the external angles (see FIG. 42C) can be varied, as would be understood by one skilled in the art, for example in accordance with available packaging space within a vehicle. Those of ordinary skill in the art would understand, however, that FIGS. 42A-42E are exemplary only, and are provided merely to illustrate how design parameters can be utilized to modulate the cross section of the exemplary embodiment of FIG. 41. Thus, the present teachings contemplate various sixteen-cornered cross section configurations having various shapes and dimensions (i.e., corner bend radii, side lengths, thicknesses, internal angles and/or external angles), which can be adjusted based on space requirements and/or to control member collapse modes.

In certain embodiments of the present teachings, for example, a length of each side ($S_1$-$S_{16}$) can range from about 10 mm to about 200 mm. In certain additional embodiments, a thickness of the sides and corners can range from about 0.7 mm to about 6.0 mm; and in certain embodiments, the thickness of the sides is substantially the same as the thickness of the corners. Furthermore, in accordance with certain additional exemplary embodiments, the thickness of the strengthening member may vary, for example, within one side or from side to side to optimize the overall axial crush and bending performance.

In certain embodiments of the present teachings, each internal angle ($\vartheta_{i1}$-$\vartheta_{i12}$) ranges from about 25 degrees to about 145 degrees, and each external angle ($\vartheta_{e1}$-$\vartheta_{e4}$) ranges from about 25 degrees to about 150 degrees.

To demonstrate the improved strength and performance features of a sixteen-cornered cross section in accordance with the present teachings compared to various existing cross section designs, exemplary strengthening members were modeled and experimental test runs were conducted, as shown and described below with reference to FIGS. 43-47.

Figure 44:
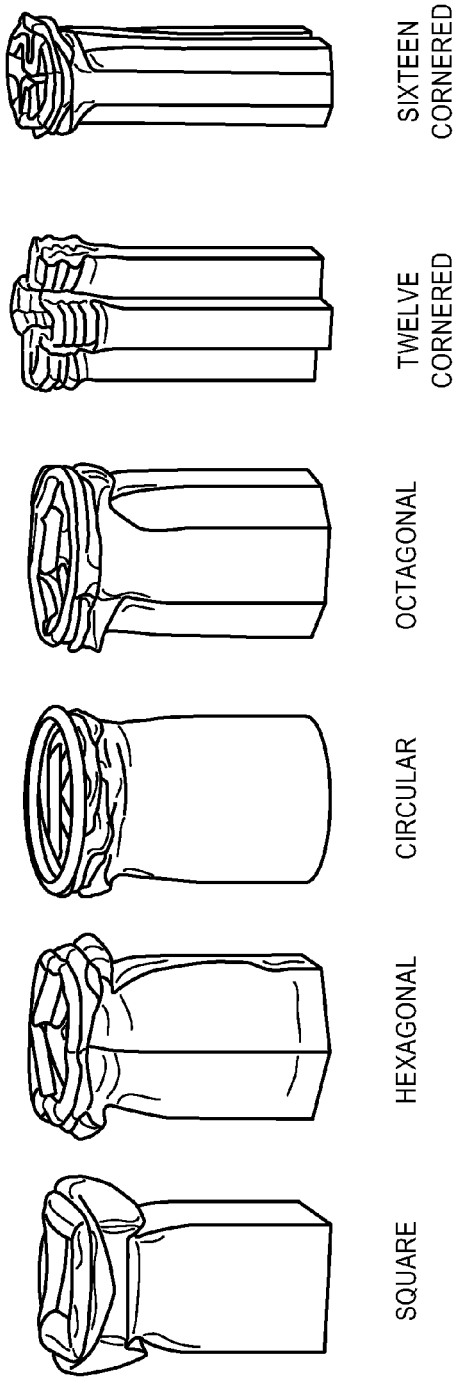
FIG. 44 illustrates an exemplary axial collapse of the strengthening members shown in FIG. 43.
Figure 45:
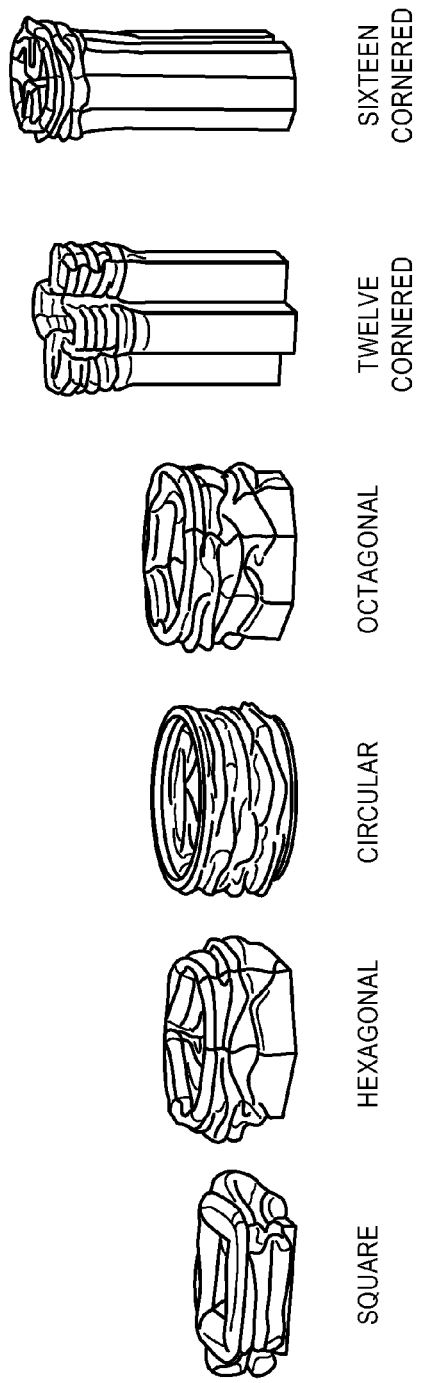
FIG. 45 illustrates an exemplary dynamic crush of the strengthening members shown in FIG. 43.

Strengthening members of varying shapes (i.e., cross sections) having the same thickness, length and perimeter (e.g., each part having a mass of about 1.22 Kg) were modeled as illustrated in FIG. 43. Tests were then run for each member to simulate an impact with the same rigid mass (e.g. an impactor), impact speed, and initial kinetic energy. As shown in FIG. 44, the sixteen-cornered cross section in accordance with the present teachings demonstrated the most stable axial collapse and the highest crash energy absorption. Furthermore, as shown in FIG. 45, the sixteen-cornered cross section in accordance with the present teachings also demonstrated the shortest crush distance and smallest folding length.

Figure 46:
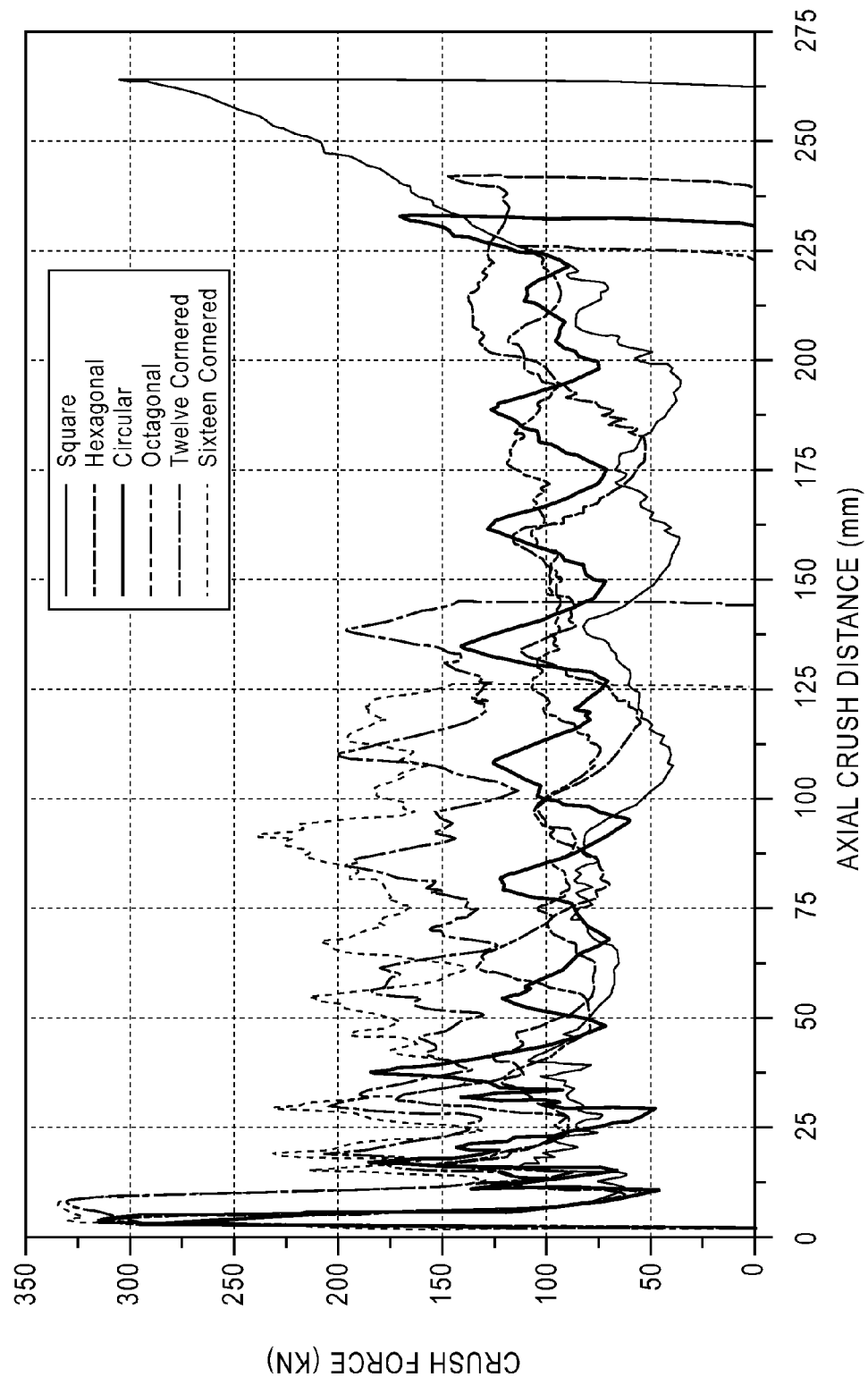
FIG. 46 is a graph of the crush force and associated axial crush distance for exemplary strengthening members having the cross sections shown in FIG. 43.

FIG. 46 illustrates the crush force (in KN) and associated axial crush distance (in mm) for the simulated impact, exerted axially on the exemplary strengthening members having the cross sections shown in FIG. 43. As shown in FIG. 46, the strengthening member having a sixteen-cornered cross section could sustain a much higher crushing force for a given resulting crushing distance as compared with the square, hexagonal, circular and octagonal cross sections.

Figure 47:
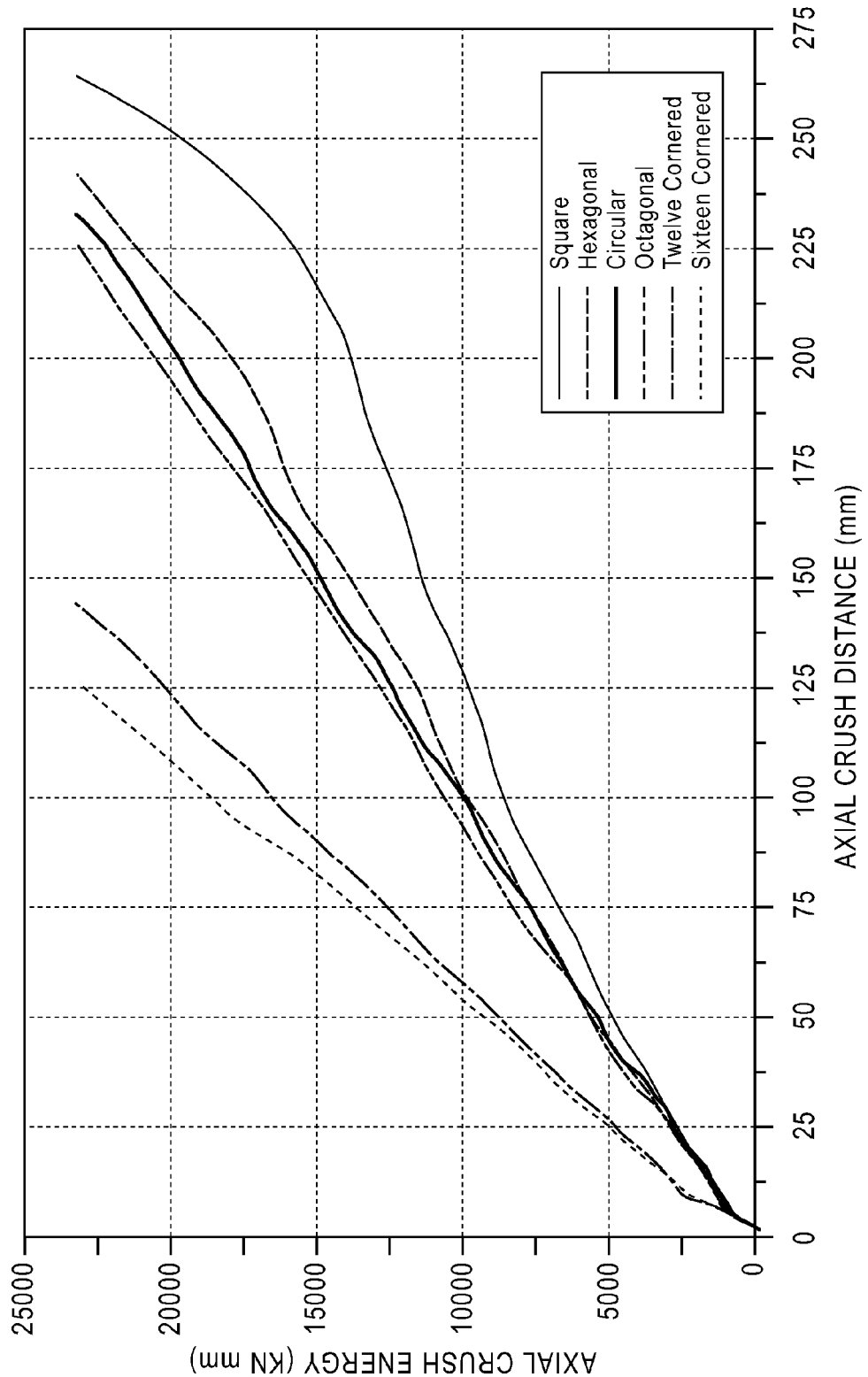
FIG. 47 is a graph of the axial crush energy and associated axial crush distance for exemplary strengthening members having the cross sections shown in FIG. 43.

FIG. 47 illustrates the axial crush energy (in KN-mm) and associated axial crush distance (in mm) for the exemplary strengthening members having the cross sections shown in FIG. 43. As shown in FIG. 47, the strengthening member having a sixteen-cornered cross section could absorb the total kinetic energy of the impact (i.e., 22983 Kn-mm) over a much shorter distance as compared with the square, hexagonal, circular and octagonal cross sections.

To further demonstrate the improved strength and performance features of a sixteen-cornered cross section in accordance with the present teachings compared to basic sixteen-sided cross section designs, as above, exemplary strengthening members were modeled and experimental test runs were conducted, as shown and described below with reference to FIGS. 48-52.

Figure 50:
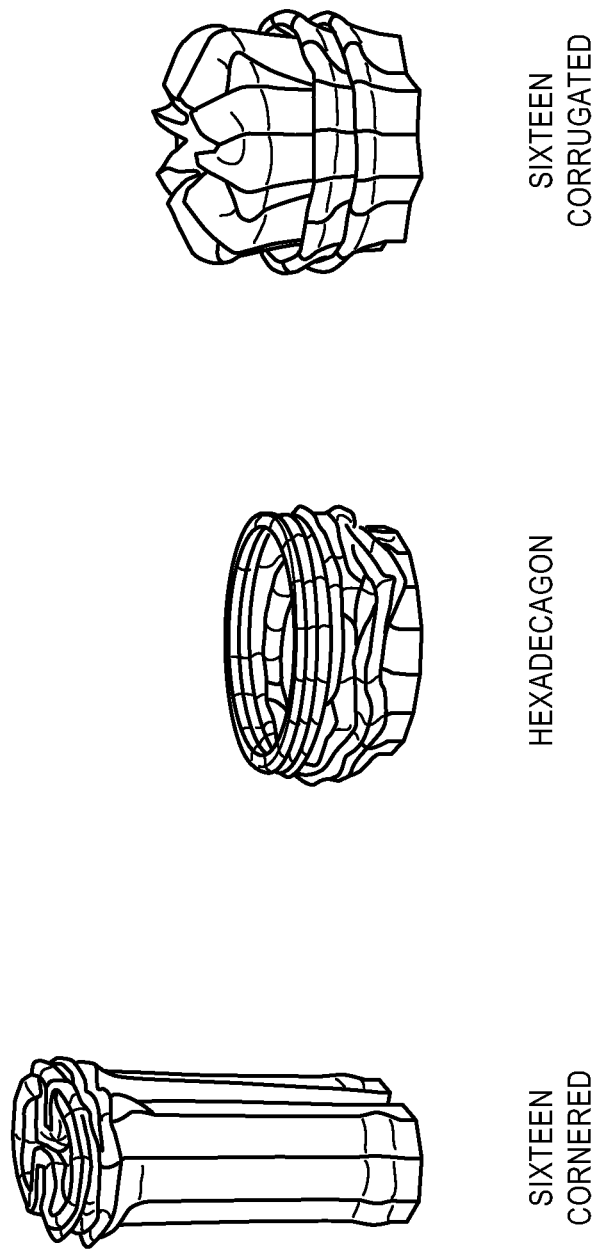
FIG. 50 illustrates an exemplary dynamic crush of the strengthening members shown in FIG. 48.

Strengthening members of varying shapes (i.e., sixteen-sided cross sections) having the same thickness, length and perimeter (e.g., each part having a mass of about 1.22 Kg) were modeled as illustrated in FIG. 48. As above, tests were then run for each member to simulate an impact with the same rigid mass (e.g. an impactor), impact speed, and initial kinetic energy. As shown in FIG. 49, the sixteen-cornered cross section in accordance with the present teachings demonstrated the most stable axial collapse and the highest crash energy absorption. Furthermore, as shown in FIG. 50, the sixteen-cornered cross section in accordance with the present teachings also demonstrated the shortest crush distance and smallest folding length.

Figure 51:
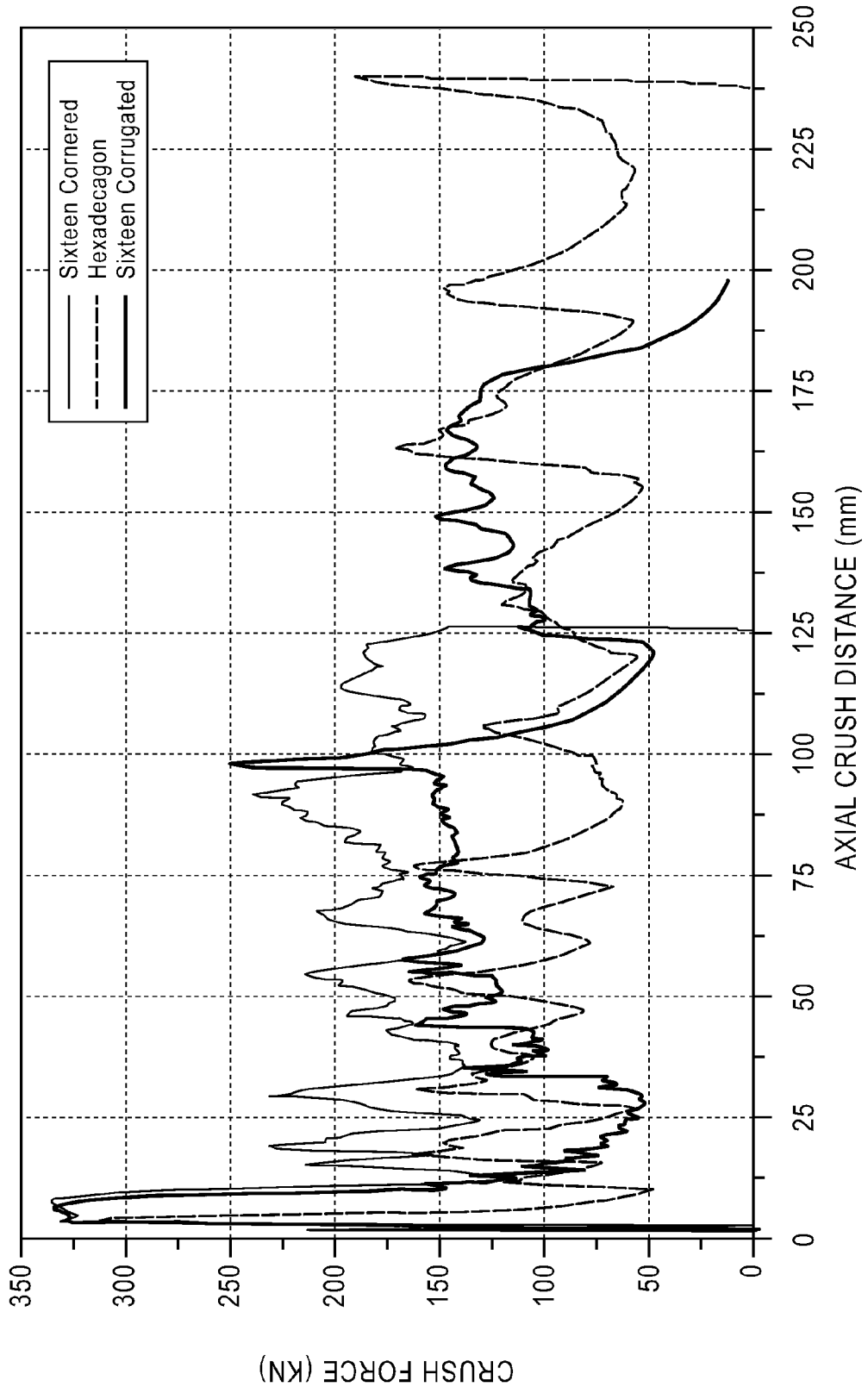
FIG. 51 is a graph of the crush force and associated axial crush distance for exemplary strengthening members having the cross sections shown in FIG. 48.

FIG. 51 illustrates the crush force (in KN) and associated axial crush distance (in mm) for the simulated impact, exerted axially on the exemplary strengthening members having the cross sections shown in FIG. 48. As shown in FIG. 51, the strengthening member having a sixteen-cornered cross section in accordance with the present teachings could sustain a much higher crushing force for a given resulting crushing distance as compared with the other sixteen-sided cross sections (i.e., a basic sixteen-sided polygon (hexadecagon) and a sixteen-sided corrugated polygon). In fact, the sixteen-cornered cross section in accordance with the present teachings achieved about a 50% to about 55% increase in crash energy absorption as compared with the hexadecagon.

Figure 52:
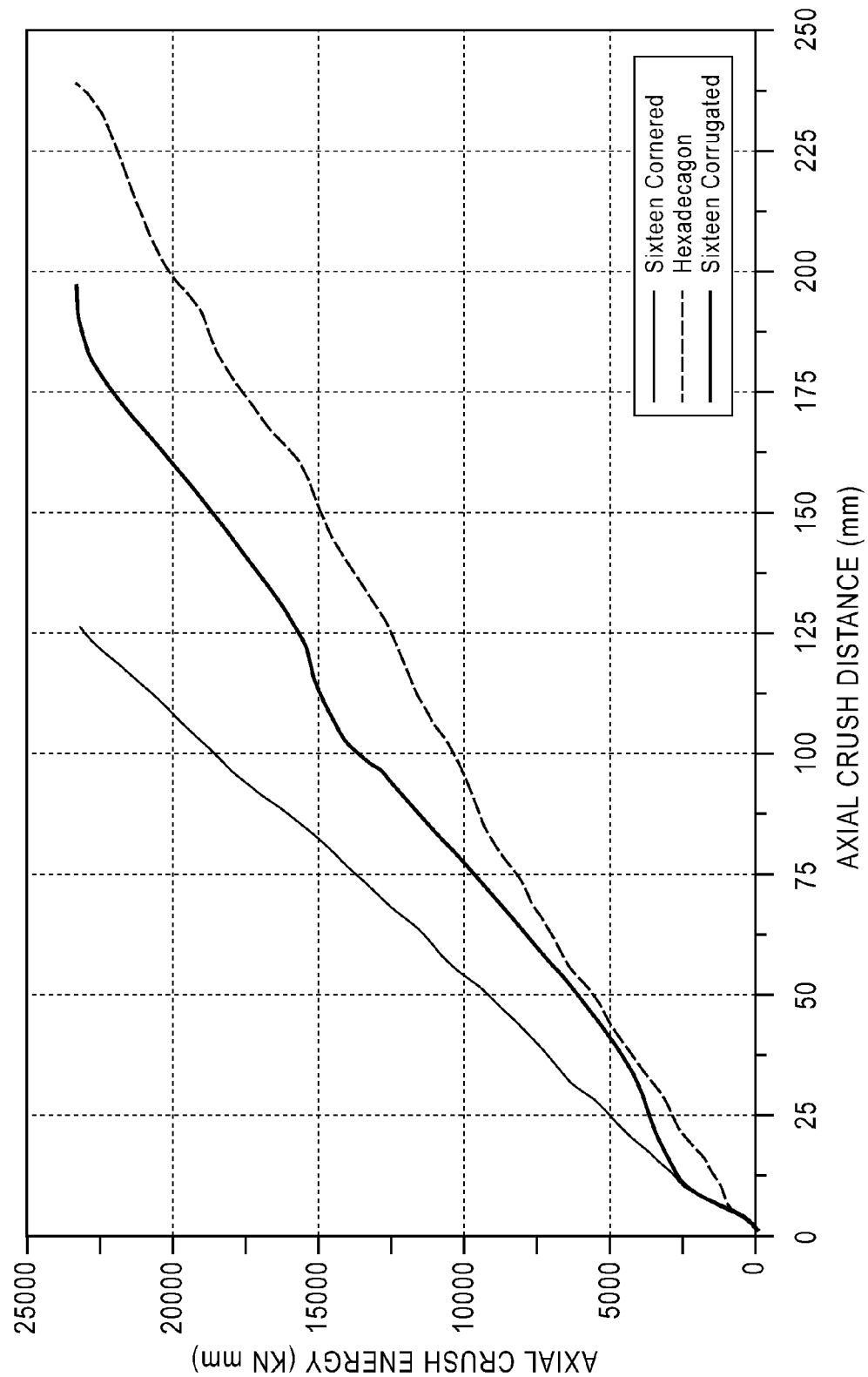
FIG. 52 is a graph of the axial crush energy and associated axial crush distance for exemplary strengthening members having the cross sections shown in FIG. 48.

FIG. 52 illustrates the axial crush energy (in KN-mm) and associated axial crush distance (in mm) for the exemplary strengthening members having the cross sections shown in FIG. 48. As shown in FIG. 52, the strengthening member having a sixteen-cornered cross section in accordance with the present teachings could absorb the total kinetic energy of the impact (i.e., 22983 KN-mm) over a much shorter distance as compared with the other sixteen-sided cross sections. In fact, the sixteen-cornered cross section in accordance with the present teachings absorbed the full axial crush energy in about 55% of the axial crush distance as the hexadecagon.

Figure 53:
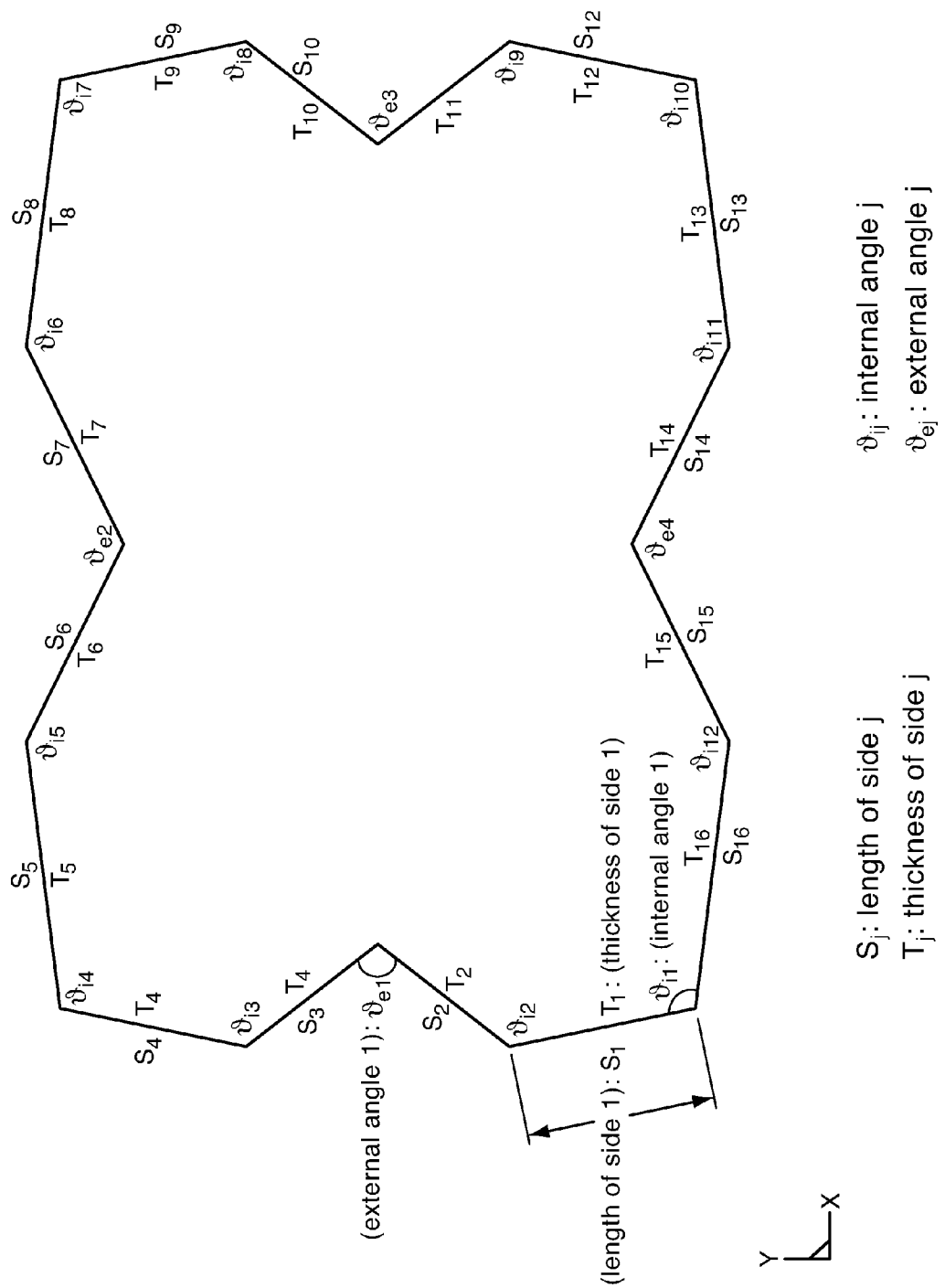
FIG. 53 illustrates an exemplary embodiment of another sixteen-cornered cross section for a strengthening member in accordance with the present teachings.

An additional exemplary embodiment of a sixteen-cornered cross section for a strengthening member in accordance with the present teachings is illustrated in FIG. 53. As illustrated, the cross section comprises sixteen sides having lengths $S_1$-$S_{16}$ and thicknesses $T_1$-$T_{16}$, twelve internal corners with angles $\vartheta_{i1}$-$\vartheta_{i12}$, and four external corners with angles $\vartheta_{e1}$-$\vartheta_{e4}$. As above, the side lengths and thicknesses and internal and external corner angles can be varied (i.e., tuned) to achieve improved strength and other performance features (e.g., stability of folding pattern) compared to existing strengthening member cross sections, and may further obviate the need for increased corner thickness.

Figure 54C:
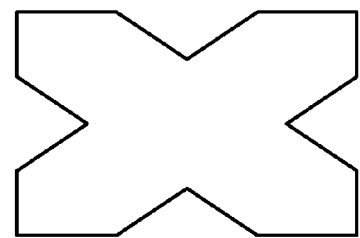
FIGS. 54A-54E illustrate how tunable parameters in accordance with the present teachings can be utilized to modulate the cross section of FIG. 53.
Figure 54B:
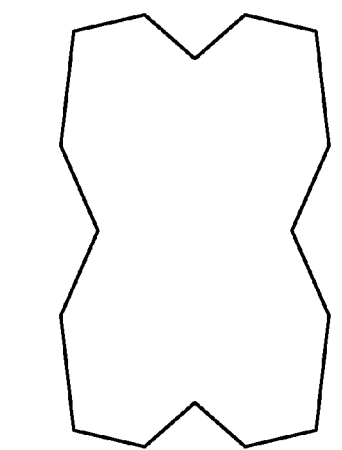
Figure 54A:
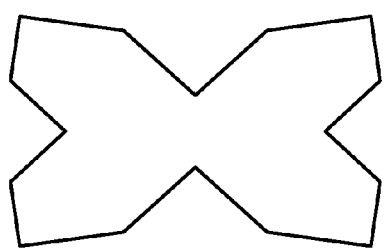
Figure 54E:
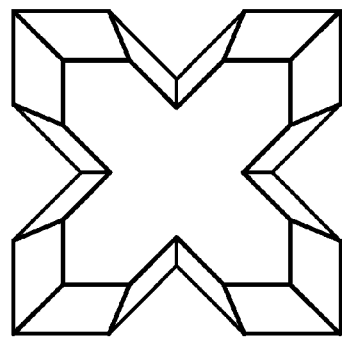
Figure 54D:
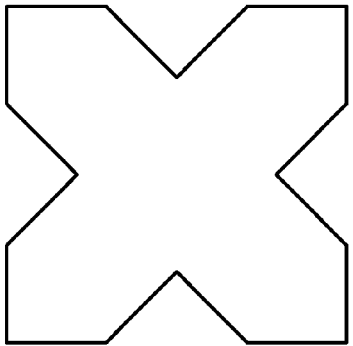

As shown in FIGS. 54A-54E, for example, in accordance with various embodiments of the present teachings, the lengths $S_1$-$S_{16}$ (see FIGS. 54A-54D) and thicknesses $T_1$-$T_{16}$ (see FIG. 54E showing tapered sides) of the sides and the angles $\vartheta_{i1}$-$\vartheta_{i12}$ of the internal angles and the angles $\vartheta_{e1}$-$\vartheta_{e4}$ of the external angles (see FIGS. 54A-54D) can be varied, as would be understood by one skilled in the art, for example in accordance with available packaging space within a vehicle. Those of ordinary skill in the art would understand, however, that FIGS. 54A-54E are exemplary only, and are provided merely to illustrate how design parameters can be utilized to modulate the cross section of the exemplary embodiment of FIG. 53. Thus, as above, the present teachings contemplate various sixteen-cornered cross section configurations having various shapes and dimensions (i.e., corner bend radii, side lengths, thicknesses, internal angles and/or external angles), which can be adjusted based on space requirements and/or to control member collapse modes.

In certain embodiments of the present teachings, for example, a length of each side ($S_1$-$S_{16}$) can range from about 10 mm to about 200 mm. In certain additional embodiments, a thickness of the sides and corners can range from about 0.7 mm to about 6.0 mm; and in certain embodiments, the thickness of the sides is substantially the same as the thickness of the corners. Furthermore, in accordance with certain additional exemplary embodiments, the thickness of the strengthening member may vary, for example, within one side or from side to side to optimize the overall axial crush and bending performance.

In certain embodiments of the present teachings, each internal angle ($\vartheta_{i1}$-$\vartheta_{i12}$) ranges from about 25 degrees to about 145 degrees, and each external angle ($\vartheta_{e1}$-$\vartheta_{e4}$) ranges from about 25 degrees to about 150 degrees.

As above, to demonstrate the improved strength and performance features of a sixteen-cornered cross section in accordance with the present teachings compared to various existing cross section designs, exemplary strengthening members were modeled and experimental test runs were conducted, as shown and described below with reference to FIGS. 55-59.

Figure 56:
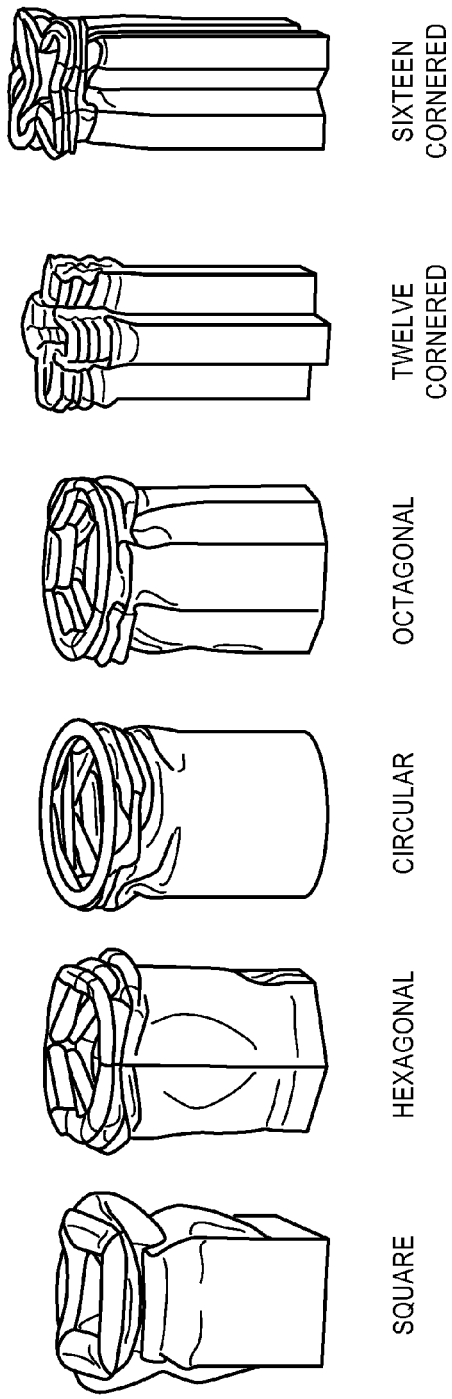
FIG. 56 illustrates an exemplary axial collapse of the strengthening members shown in FIG. 55.
Figure 57:
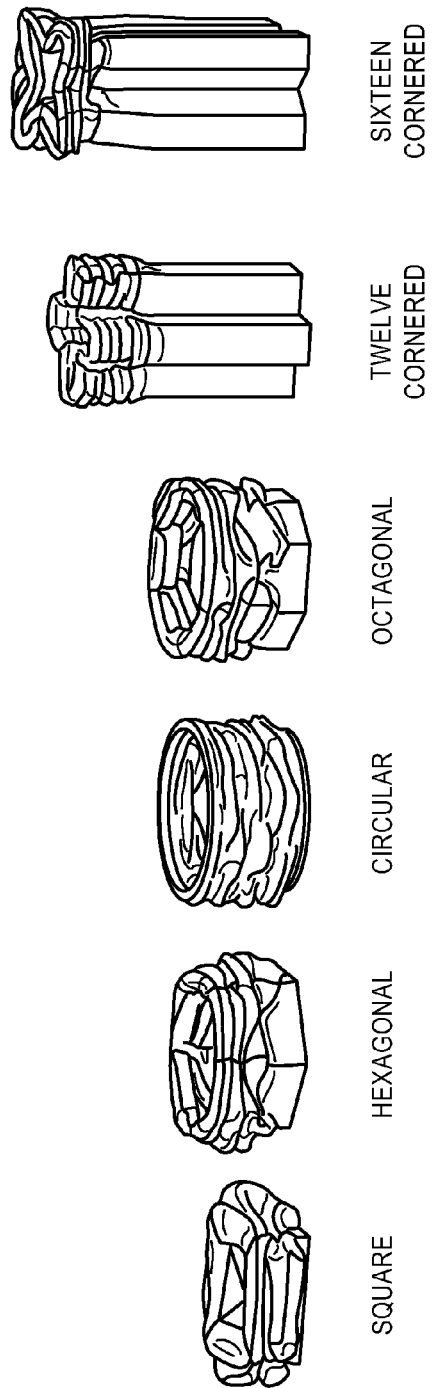
FIG. 57 illustrates an exemplary dynamic crush of the strengthening members shown in FIG. 55.

Strengthening members of varying shapes (i.e., cross sections) having the same thickness, length and perimeter (e.g., each part having a mass of about 1.22 Kg) were modeled as illustrated in FIG. 55. Tests were then run for each member to simulate an impact with the same rigid mass (e.g. an impactor), impact speed, and initial kinetic energy. As shown in FIG. 56, the sixteen-cornered cross section in accordance with the present teachings demonstrated the most stable axial collapse and the highest crash energy absorption. Furthermore, as shown in FIG. 57, the sixteen-cornered cross section in accordance with the present teachings also demonstrated the shortest crush distance and smallest folding length.

Figure 58:
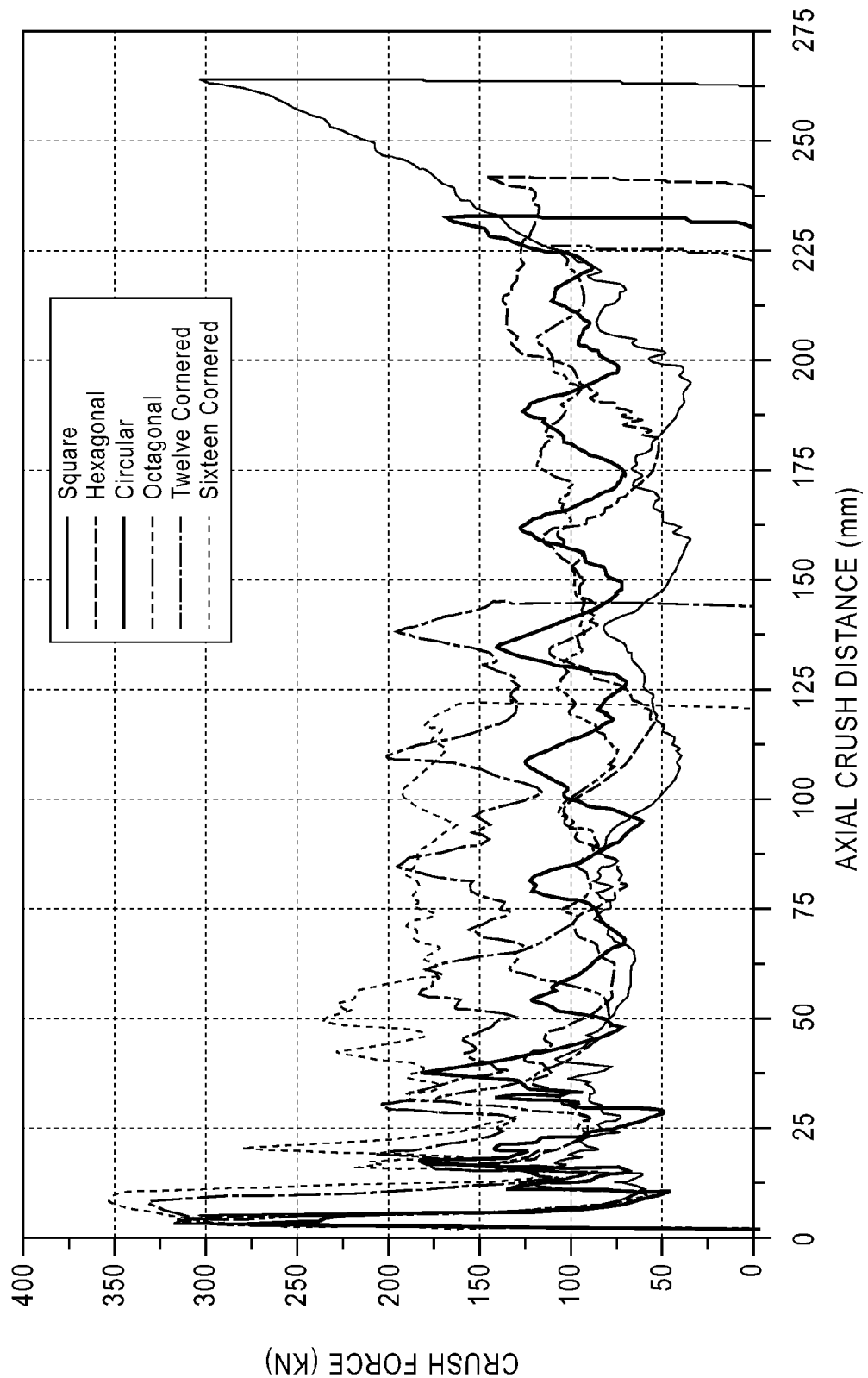
FIG. 58 is a graph of the crush force and associated axial crush distance for exemplary strengthening members having the cross sections shown in FIG. 55.

FIG. 58 illustrates the crush force (in KN) and associated axial crush distance (in mm) for the simulated impact, exerted axially on the exemplary strengthening members having the cross sections shown in FIG. 55. As shown in FIG. 58, the strengthening member having a sixteen-cornered cross section could sustain a much higher crushing force for a given resulting crushing distance as compared with the square, hexagonal, circular and octagonal cross sections.

Figure 59:
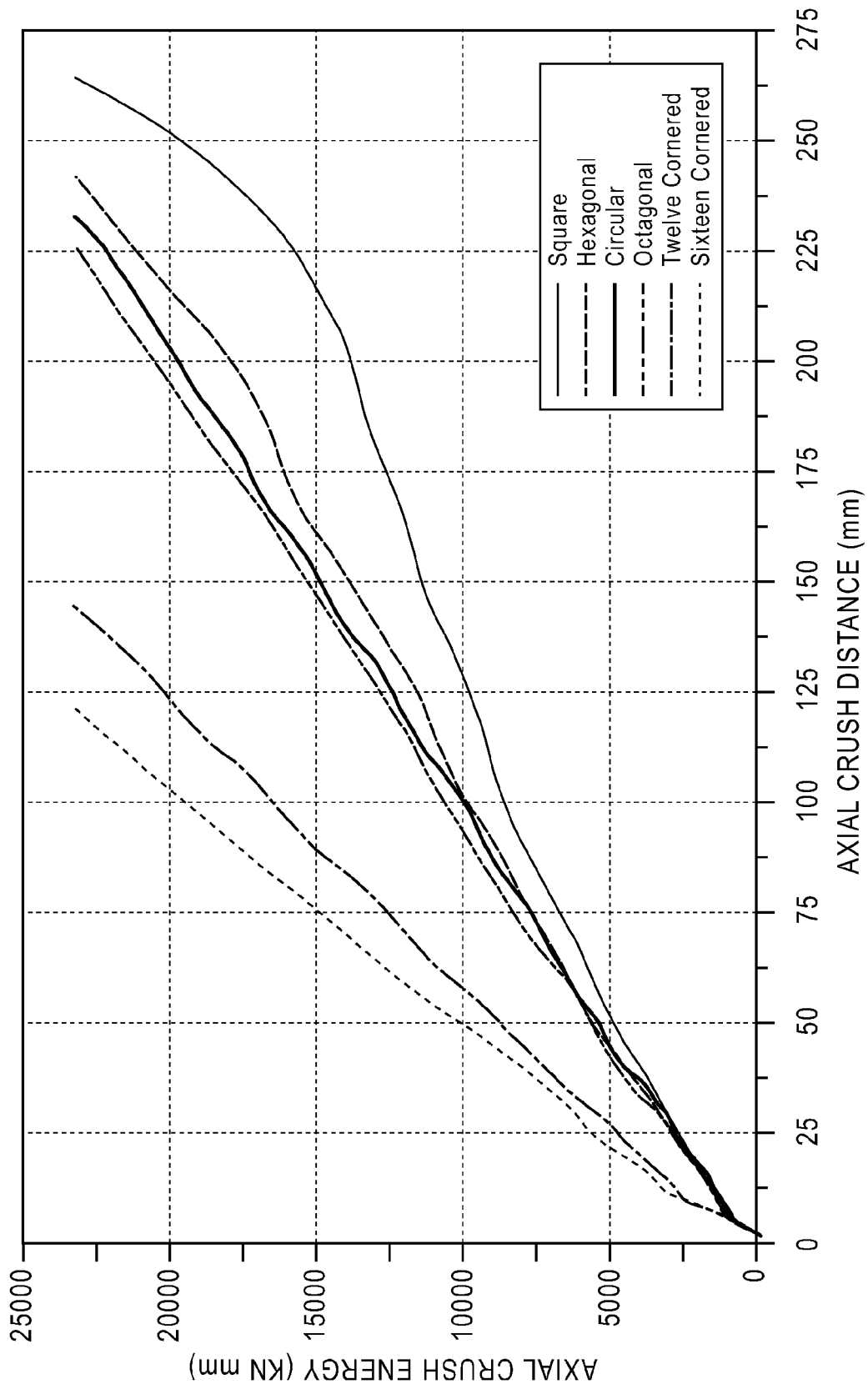
FIG. 59 is a graph of the axial crush energy and associated axial crush distance for exemplary strengthening members having the cross sections shown in FIG. 55.

FIG. 59 illustrates the axial crush energy (in KN-mm) and associated axial crush distance (in mm) for the exemplary strengthening members having the cross sections shown in FIG. 55. As shown in FIG. 59, the strengthening member having a sixteen-cornered cross section could absorb the total kinetic energy of the impact (i.e., 22983 Kn-mm) over a much shorter distance as compared with the square, hexagonal, circular and octagonal cross sections.

As above, to further demonstrate the improved strength and performance features of a sixteen-cornered cross section in accordance with the present teachings compared to basic sixteen-sided cross section designs, exemplary strengthening members were modeled and experimental test runs were conducted, as shown and described below with reference to FIGS. 60-64.

Figure 62:
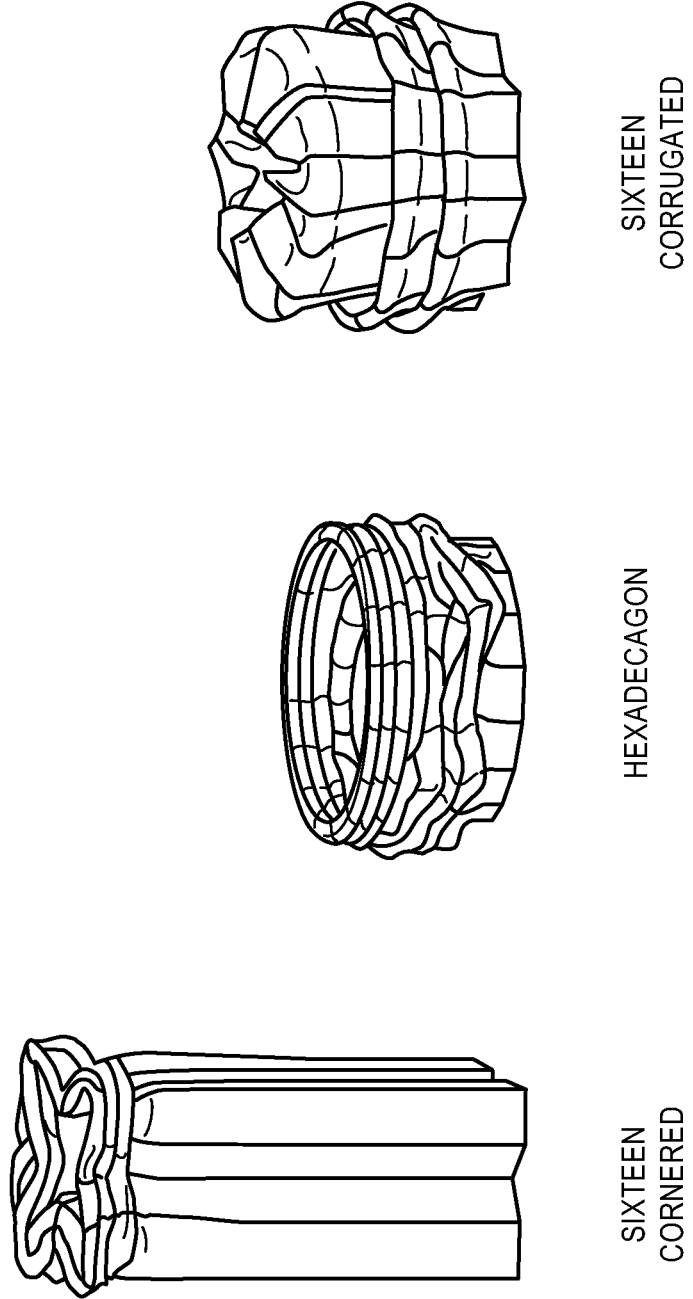
FIG. 62 illustrates an exemplary dynamic crush of the strengthening members shown in FIG. 60.

Strengthening members of varying shapes (i.e., sixteen-sided cross sections) having the same thickness, length and perimeter (e.g., each part having a mass of about 1.22 Kg) were modeled as illustrated in FIG. 60. As above, tests were then run for each member to simulate an impact with the same rigid mass (e.g. an impactor), impact speed, and initial kinetic energy. As shown in FIG. 61, the sixteen-cornered cross section in accordance with the present teachings demonstrated the most stable axial collapse and the highest crash energy absorption. Furthermore, as shown in FIG. 62, the sixteen-cornered cross section in accordance with the present teachings also demonstrated the shortest crush distance and smallest folding length.

Figure 63:
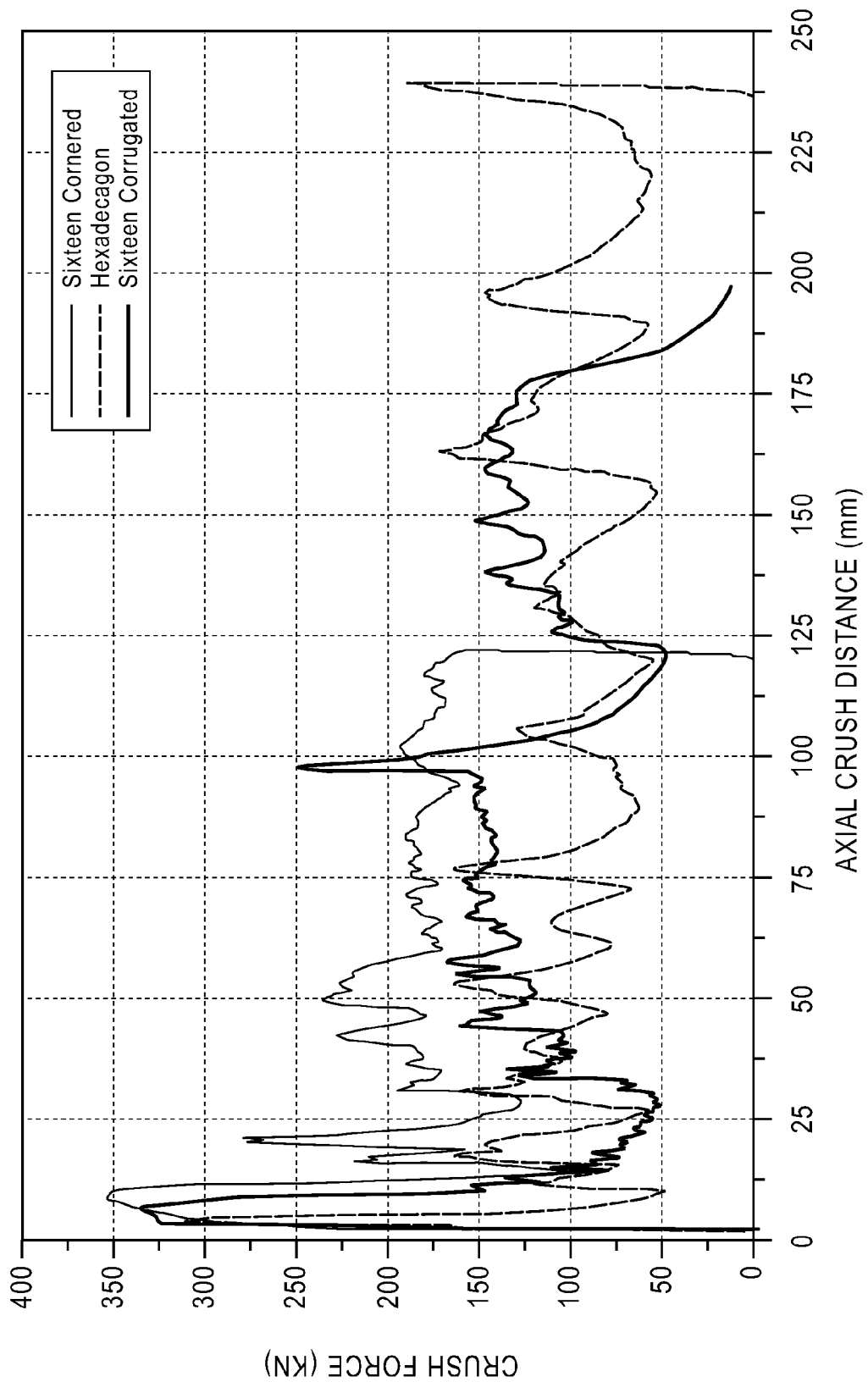
FIG. 63 is a graph of the crush force and associated axial crush distance for exemplary strengthening members having the cross sections shown in FIG. 60.

FIG. 63 illustrates the crush force (in KN) and associated axial crush distance (in mm) for the simulated impact, exerted axially on the exemplary strengthening members having the cross sections shown in FIG. 60. As shown in FIG. 63, once again, the strengthening member having a sixteen-cornered cross section in accordance with the present teachings could sustain a much higher crushing force for a given resulting crushing distance as compared with the other sixteen-sided cross sections (i.e., the basic sixteen-sided polygon (hexadecagon) and sixteen-sided corrugated polygon). In fact, the sixteen-cornered cross section in accordance with the present teachings achieved about a 50% to about 60% increase in crash energy absorption as compared with the hexadecagon.

Figure 64:
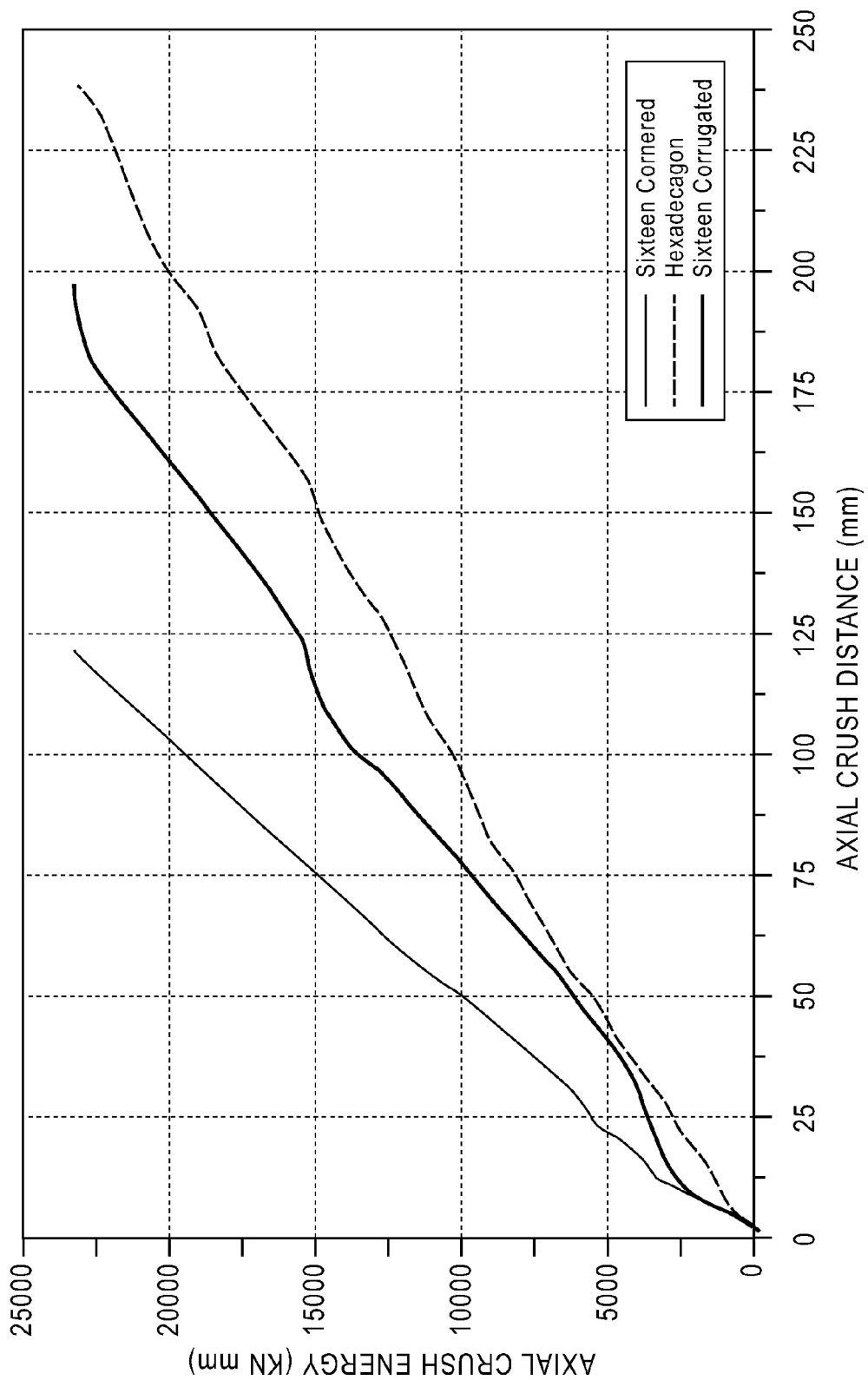
FIG. 64 is a graph of the axial crush energy and associated axial crush distance for exemplary strengthening members having the cross sections shown in FIG. 60.

FIG. 64 illustrates the axial crush energy (in KN-mm) and associated axial crush distance (in mm) for the exemplary strengthening members having the cross sections shown in FIG. 60. As shown in FIG. 64, once again, the strengthening member having a sixteen-cornered cross section in accordance with the present teachings could absorb the total kinetic energy of the impact (i.e., 22983 KN-mm) over a much shorter distance as compared with the other sixteen-sided cross sections. In fact, the sixteen-cornered cross section in accordance with the present teachings absorbed the full axial crush energy in about 50% of the axial crush distance as the hexadecagon.

Sixteen-cornered cross sections in accordance with the present teachings may, therefore, allow improved impact energy management over, for example, basic polygonal strengthening member cross sections, including basic sixteen-sided polygonal cross sections, while minimizing mass per unit length.

Figure 65:
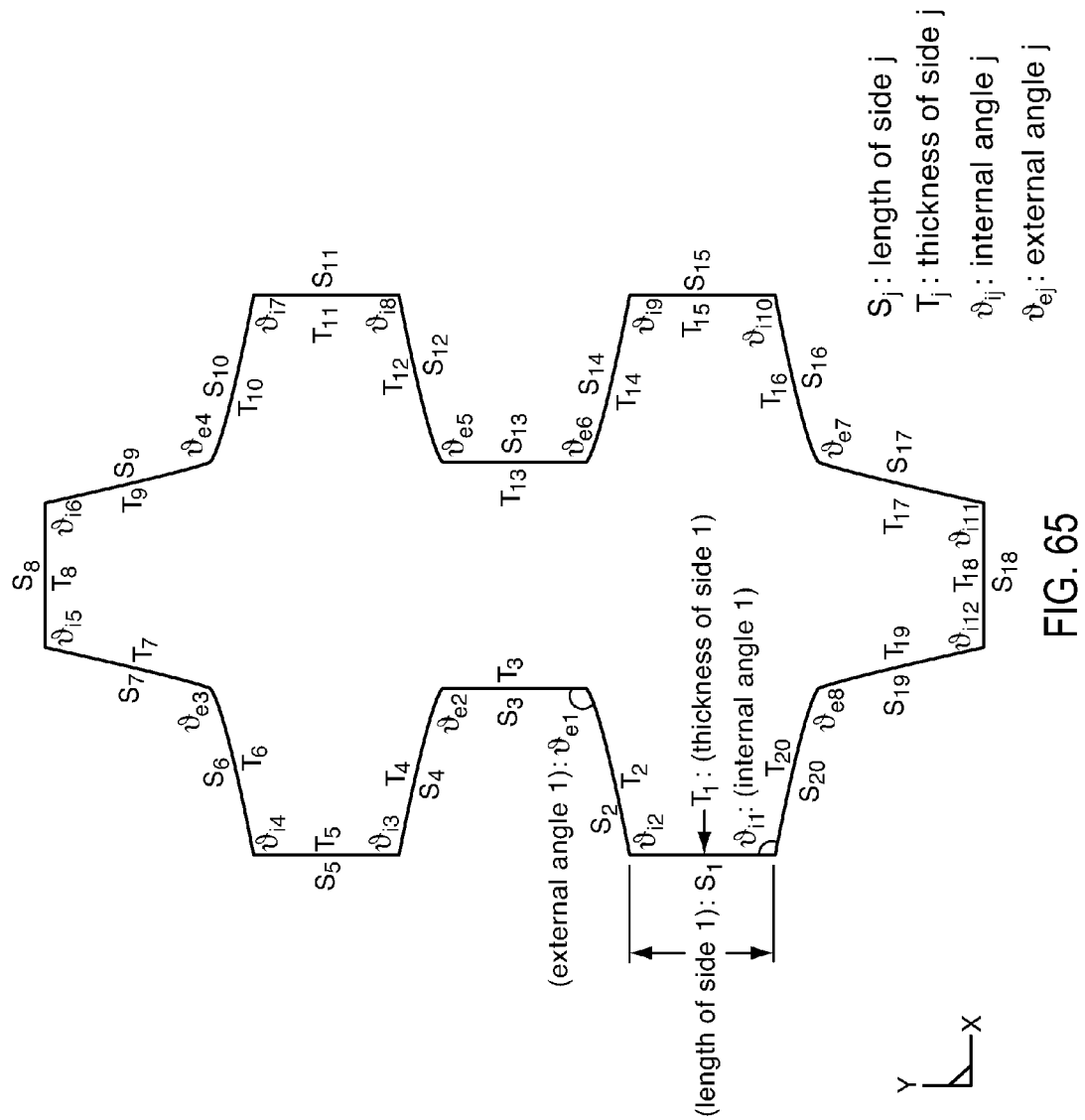
FIG. 65 illustrates an exemplary embodiment of a twenty-cornered cross section for a strengthening member in accordance with the present teachings.

In various additional exemplary embodiments, a strengthening member in accordance with the present teachings may comprise a twenty-cornered cross section. An exemplary embodiment of a twenty-cornered cross section for a strengthening member in accordance with the present teachings is illustrated in FIG. 65. As illustrated, the cross section comprises twenty sides having lengths $S_1$-$S_{20}$ and thicknesses $T_1$-$T_{20}$, twelve internal corners with angles $\vartheta_{i1}$-$\vartheta_{i12}$, and eight external corners with angles $\vartheta_{e1}$-$\vartheta_{e8}$. The side lengths and thicknesses and internal and external corner angles can be varied (i.e., tuned) to achieve improved strength and other performance features (e.g., stability of folding pattern) compared to existing strengthening member cross sections. This strength improvement further obviates the need for increased corner thickness, which is an unexpected and unpredicted benefit of fine-tuning the design parameters (e.g., side lengths, thicknesses, internal angles, and external angles) of a strengthening member having a sixteen-sided (i.e., twenty-cornered) cross section.

Figure 66C:
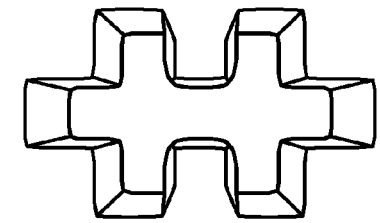
FIGS. 66A-66E illustrate how tunable parameters in accordance with the present teachings can be utilized to modulate the cross section of FIG. 65.
Figure 66E:
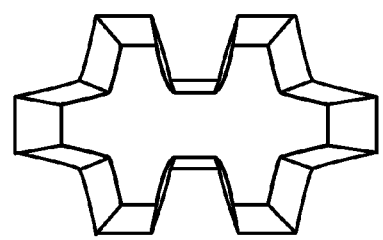
Figure 66B:
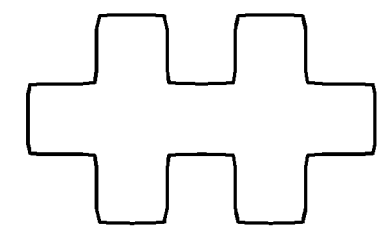
Figure 66D:
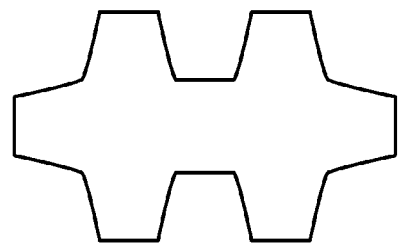
Figure 66A:
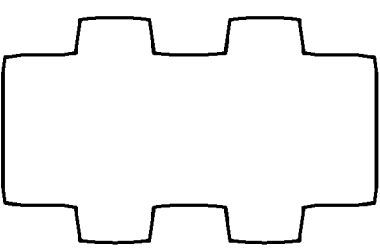

As shown in FIGS. 66A-66E, for example, in accordance with various embodiments of the present teachings, the lengths $S_1$-$S_{20}$ (see FIG. 66A) and thicknesses $T_1$-$T_{20}$ (see FIGS. 66B and 66E showing tapered sides) of the sides and the angles $\vartheta_{i1}$-$\vartheta_{i12}$ of the internal angles and the angles $\vartheta_{e1}$-$\vartheta_{e8}$ of the external angles (see FIGS. 66B and 66D) can be varied, as would be understood by one skilled in the art, for example in accordance with available packaging space within a vehicle. Those of ordinary skill in the art would understand, however, that FIGS. 66A-66E are exemplary only, and are provided merely to illustrate how design parameters can be utilized to modulate the cross section of the exemplary embodiment of FIG. 65. Thus, the present teachings contemplate various twenty-cornered cross section configurations having various shapes and dimensions (i.e., corner bend radii, side lengths, thicknesses, internal angles and/or external angles), which can be adjusted based on space requirements and/or to control member collapse modes.

In certain embodiments of the present teachings, for example, a length of each side ($S_1$-$S_{20}$) can range from about 10 mm to about 200 mm. In certain additional embodiments, a thickness of the sides and corners can range from about 0.7 mm to about 6.0 mm; and in certain embodiments, the thickness of the sides is substantially the same as the thickness of the corners. Furthermore, in accordance with certain additional exemplary embodiments, the thickness of the strengthening member may vary, for example, within one side or from side to side to optimize the overall axial crush and bending performance.

In certain embodiments of the present teachings, each internal angle ($\vartheta_{i1}$-$\vartheta_{i12}$) ranges from about 25 degrees to about 145 degrees, and each external angle ($\vartheta_{e1}$-$\vartheta_{e8}$) ranges from about 25 degrees to about 150 degrees.

To demonstrate the improved strength and performance features of a twenty-cornered cross section in accordance with the present teachings compared to various existing cross section designs, exemplary strengthening members were modeled and experimental test runs were conducted, as shown and described below with reference to FIGS. 67-71.

Figure 67:
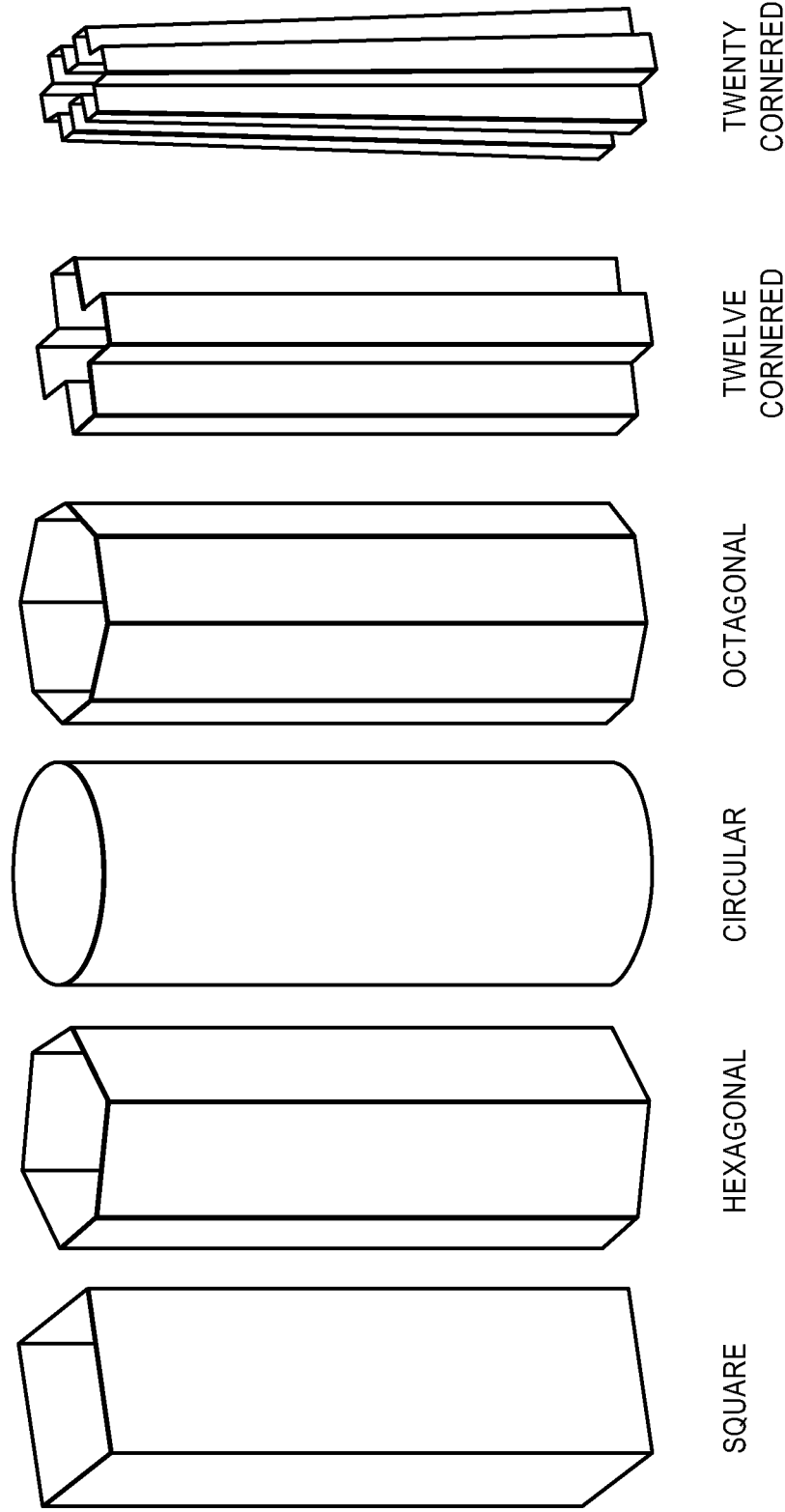
FIG. 67 illustrates strengthening members of varying cross sections having substantially the same thickness, length and perimeter.
Figure 68:
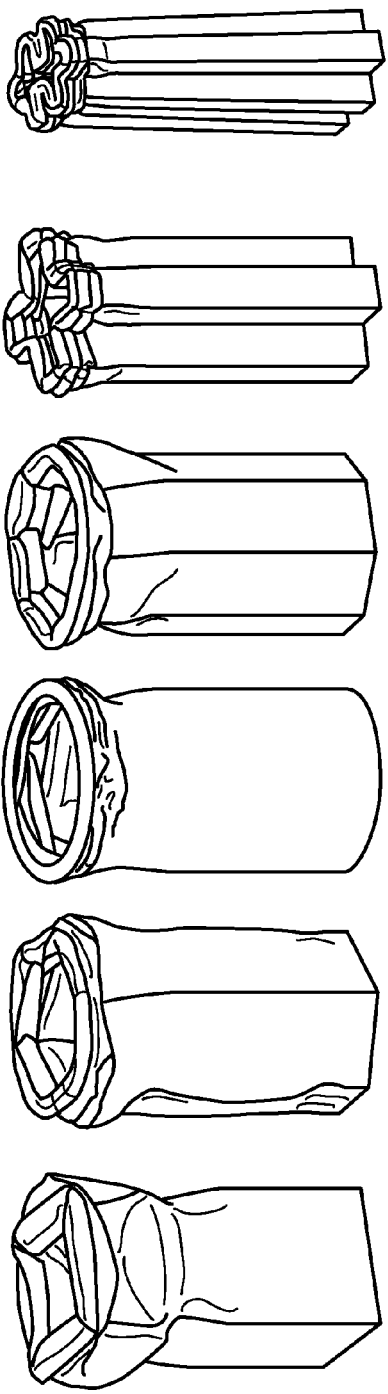
FIG. 68 illustrates an exemplary axial collapse of the strengthening members shown in FIG. 67.
Figure 69:
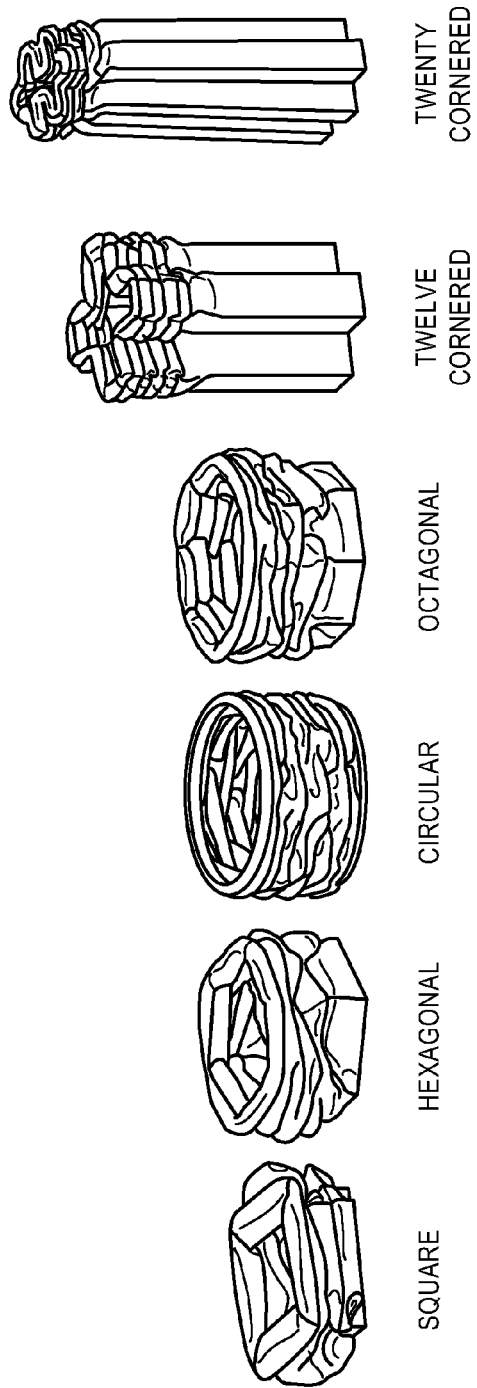
FIG. 69 illustrates an exemplary dynamic crush of the strengthening members shown in FIG. 67.

Strengthening members of varying shapes (i.e., cross sections) having the same thickness, length and perimeter (e.g., each part having a mass of about 1.22 Kg) were modeled as illustrated in FIG. 67. Tests were then run for each member to simulate an impact with the same rigid mass (e.g. an impactor), impact speed, and initial kinetic energy. As shown in FIG. 68, the twenty-cornered cross section in accordance with the present teachings demonstrated the most stable axial collapse and the highest crash energy absorption. Furthermore, as shown in FIG. 69, the twenty-cornered cross section in accordance with the present teachings also demonstrated the shortest crush distance and smallest folding length.

Figure 70:
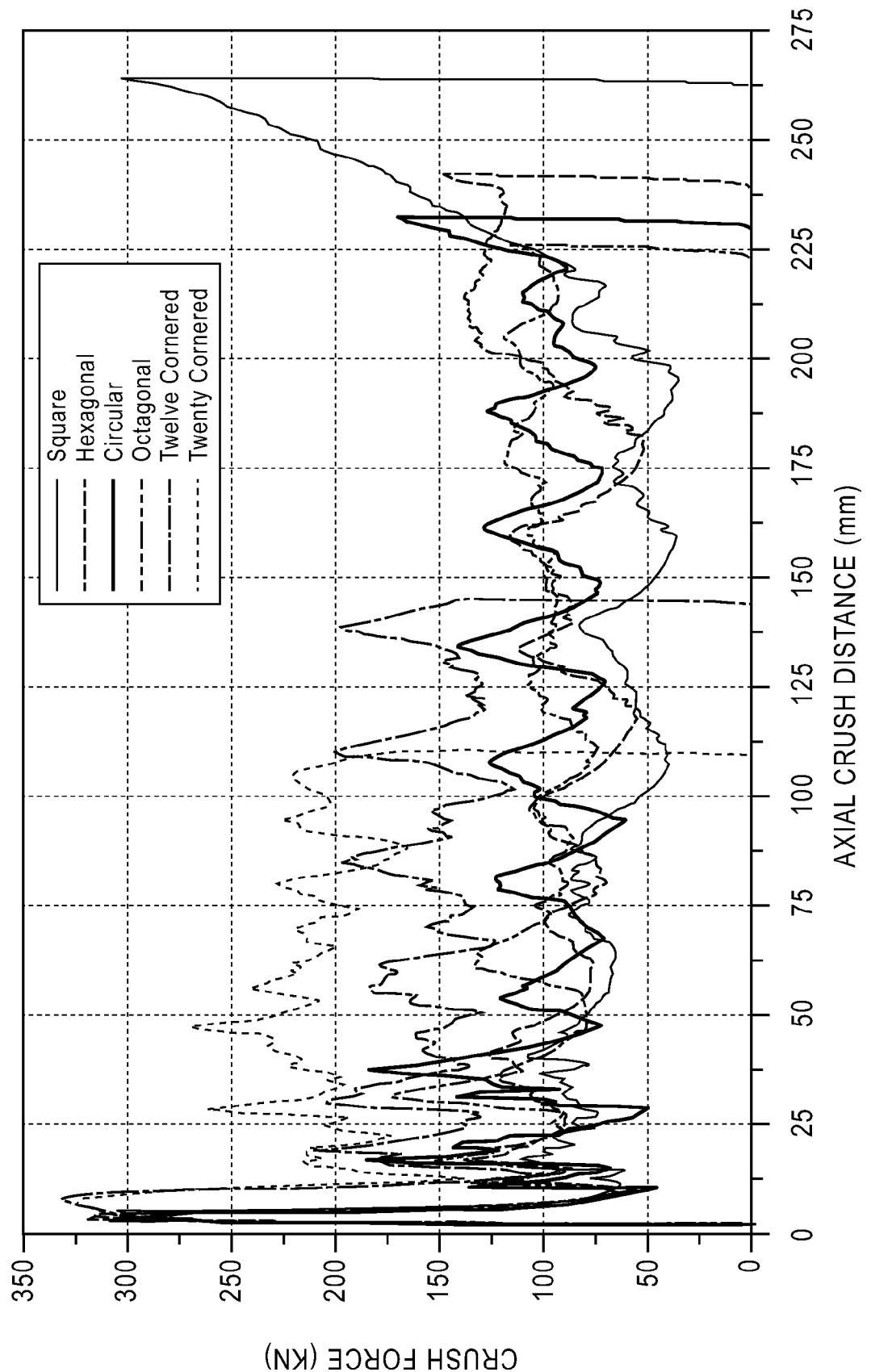
FIG. 70 is a graph of the crush force and associated axial crush distance for exemplary strengthening members having the cross sections shown in FIG. 67.

FIG. 70 illustrates the crush force (in KN) and associated axial crush distance (in mm) for the simulated impact, exerted axially on the exemplary strengthening members having the cross sections shown in FIG. 67. As shown in FIG. 70, the strengthening member having a twenty-cornered cross section could sustain a much higher crushing force for a given resulting crushing distance as compared with the square, hexagonal, circular, octagonal, and existing twelve-cornered cross sections.

Figure 71:
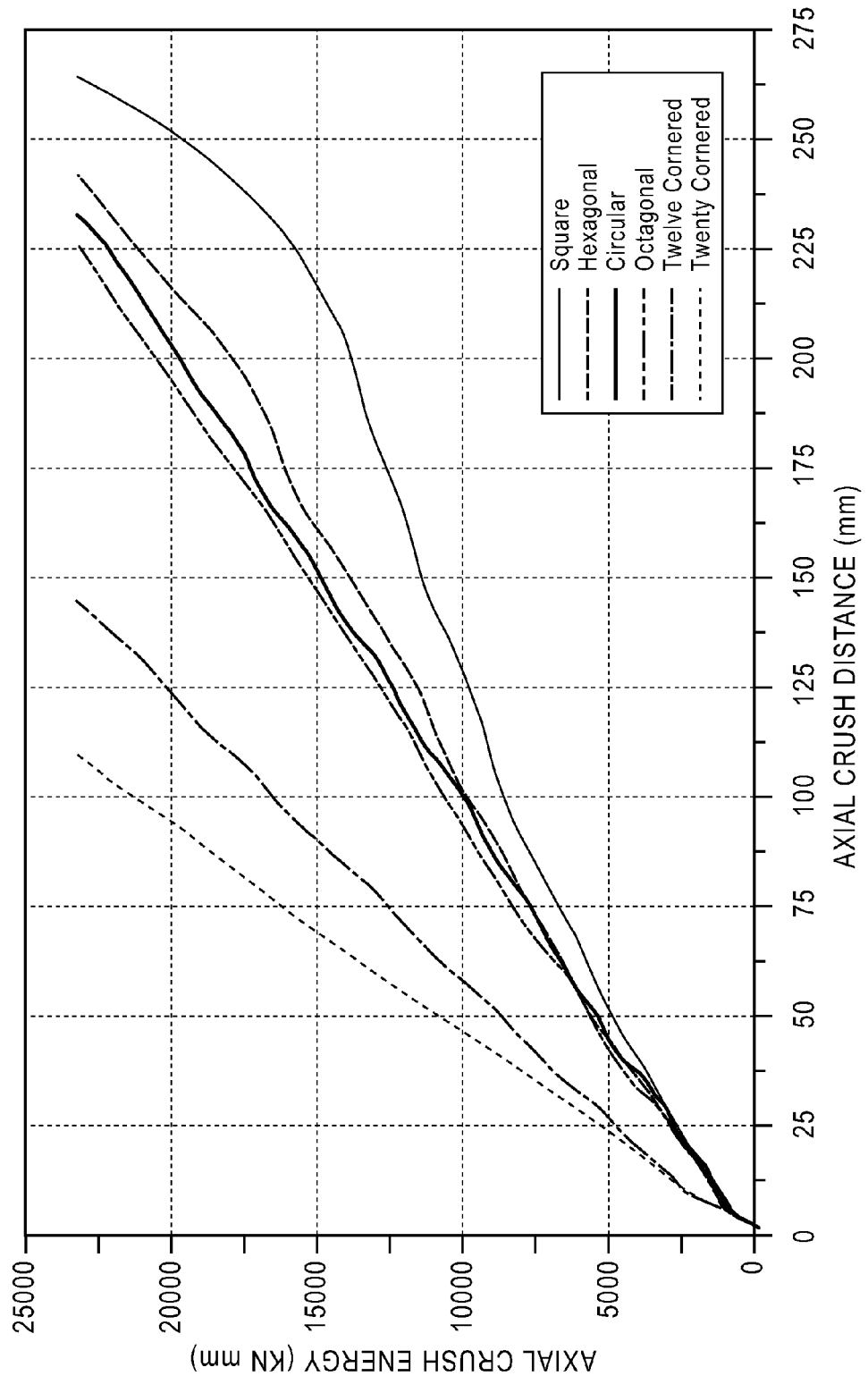
FIG. 71 is a graph of the axial crush energy and associated axial crush distance for exemplary strengthening members having the cross sections shown in FIG. 67.

FIG. 71 illustrates the axial crush energy (in KN-mm) and associated axial crush distance (in mm) for the exemplary strengthening members having the cross sections shown in FIG. 67. As shown in FIG. 71, the strengthening member having a twenty-cornered cross section could absorb the total kinetic energy of the impact (i.e., 22983 Kn-mm) over a much shorter distance as compared with the square, hexagonal, circular, octagonal, and existing twelve-cornered cross sections.

To further demonstrate the improved strength and performance features of a twenty-cornered cross section in accordance with the present teachings compared to basic twenty-sided cross section designs, as above, exemplary strengthening members were modeled and experimental test runs were conducted, as shown and described below with reference to FIGS. 72-76.

Strengthening members of varying shapes (i.e., twenty-sided cross sections) having the same thickness, length and perimeter (e.g., each part having a mass of about 1.22 Kg) were modeled as illustrated in FIG. 72. As above, tests were then run for each member to simulate an impact with the same rigid mass (e.g. an impactor), impact speed, and initial kinetic energy. As shown in FIG. 73, the twenty-cornered cross section in accordance with the present teachings demonstrated the most stable axial collapse and the highest crash energy absorption. Furthermore, as shown in FIG. 74, the twenty-cornered cross section in accordance with the present teachings also demonstrated the shortest crush distance and smallest folding length.

Figure 75:
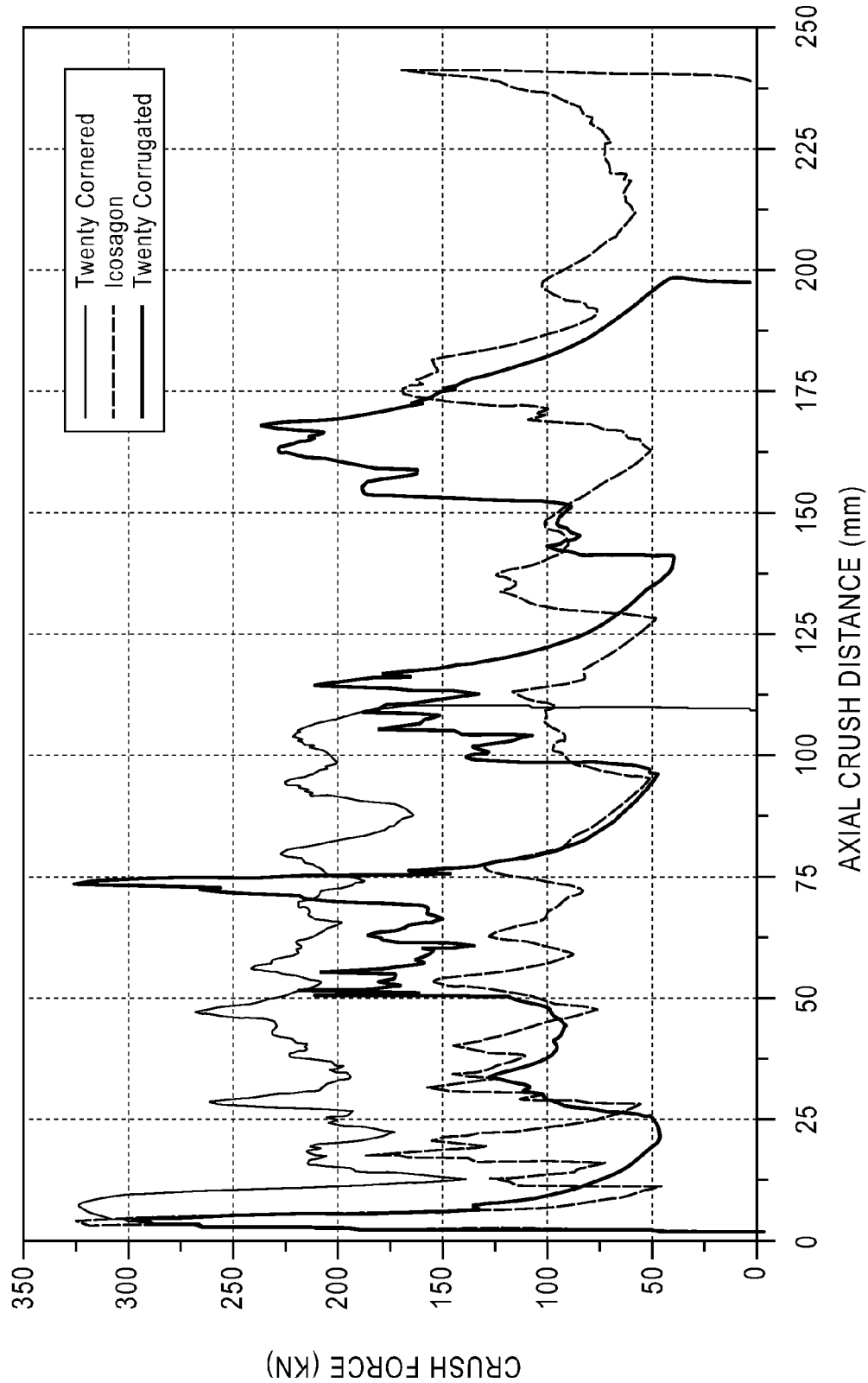
FIG. 75 is a graph of the crush force and associated axial crush distance for exemplary strengthening members having the cross sections shown in FIG. 72.

FIG. 75 illustrates the crush force (in KN) and associated axial crush distance (in mm) for the simulated impact, exerted axially on the exemplary strengthening members having the cross sections shown in FIG. 72. As shown in FIG. 75, the strengthening member having a twenty-cornered cross section in accordance with the present teachings could sustain a much higher crushing force for a given resulting crushing distance as compared with the other twenty-sided cross sections (i.e., a basic twenty-sided polygon (icosagon) and a twenty-sided corrugated polygon). In fact, the twenty-cornered cross section in accordance with the present teachings achieved about a 55% to about 65% increase in crash energy absorption as compared with the icosagon.

Figure 76:
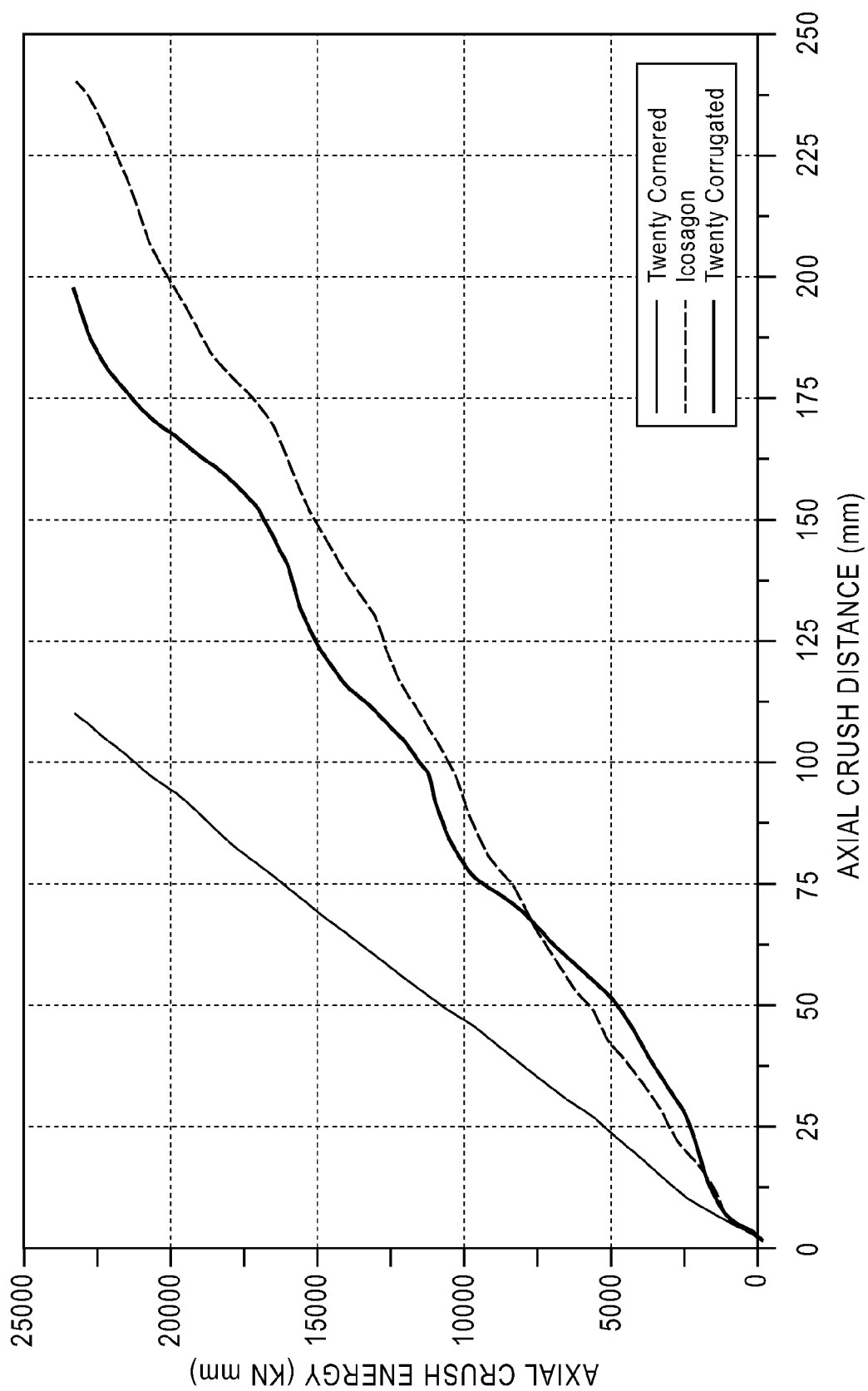
FIG. 76 is a graph of the axial crush energy and associated axial crush distance for exemplary strengthening members having the cross sections shown in FIG. 72.

FIG. 76 illustrates the axial crush energy (in KN-mm) and associated axial crush distance (in mm) for the exemplary strengthening members having the cross sections shown in FIG. 72. As shown in FIG. 76, the strengthening member having a twenty-cornered cross section in accordance with the present teachings could absorb the total kinetic energy of the impact (i.e., 22983 KN-mm) over a much shorter distance as compared with the other twenty-sided cross sections. In fact, the twenty-cornered cross section in accordance with the present teachings absorbed the full axial crush energy in about 45% of the axial crush distance as the icosagon.

Figure 77:
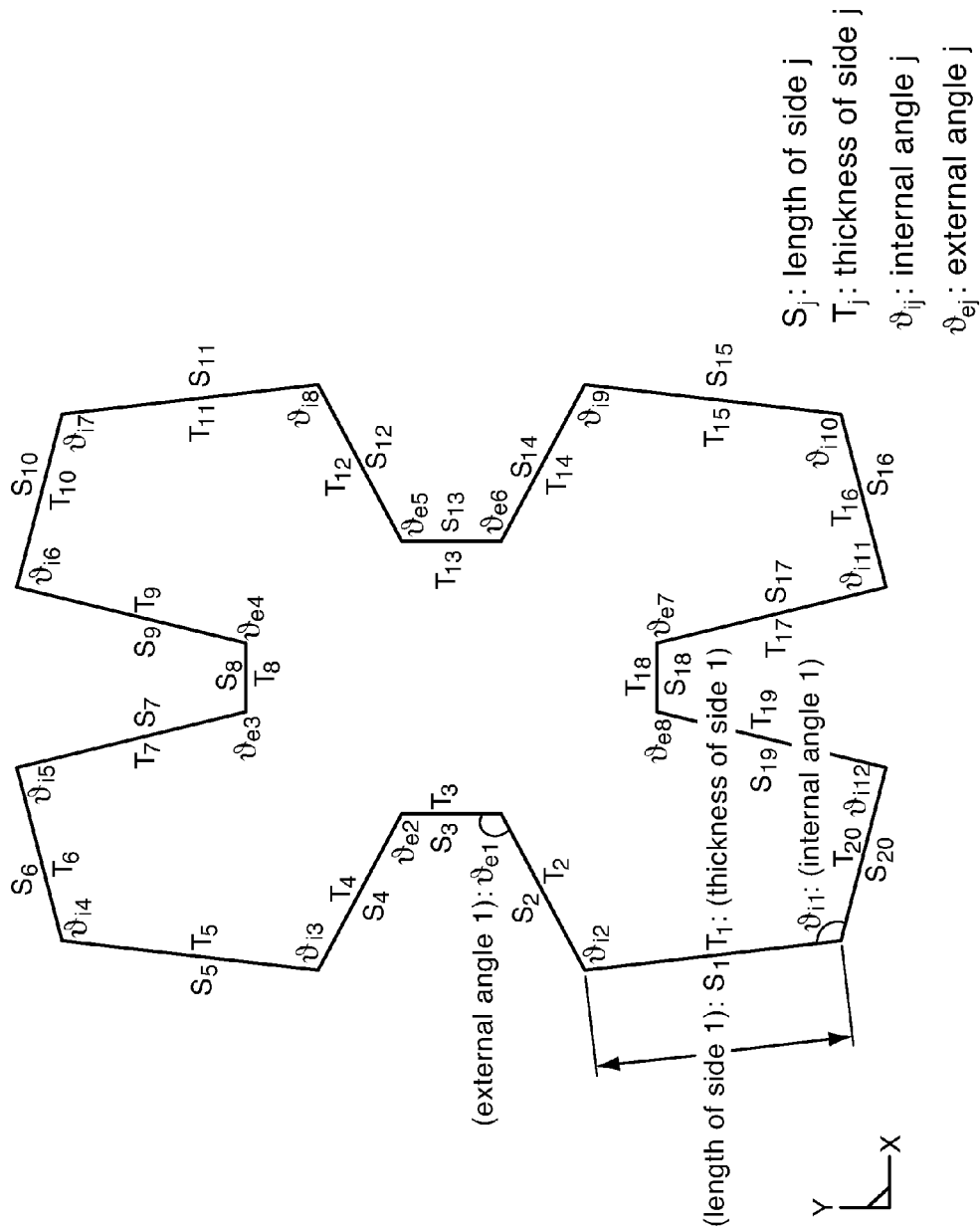
FIG. 77 illustrates an exemplary embodiment of another twenty-cornered cross section for a strengthening member in accordance with the present teachings.

An additional exemplary embodiment of a twenty-cornered cross section for a strengthening member in accordance with the present teachings is illustrated in FIG. 77. As illustrated, the cross section comprises twenty sides having lengths $S_1$-$S_{20}$ and thicknesses $T_1$-$T_{20}$, twelve internal corners with angles $\vartheta_{i1}$-$\vartheta_{i12}$, and eight external corners with angles $\vartheta_{e1}$-$\vartheta_{e8}$. As above, the side lengths and thicknesses and internal and external corner angles can be varied (i.e., tuned) to achieve improved strength and other performance features (e.g., stability of folding pattern) compared to existing strengthening member cross sections, and may further obviate the need for increased corner thickness.

Figure 78A:
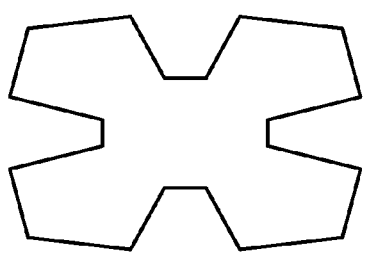
FIGS. 78A-78E illustrate how tunable parameters in accordance with the present teachings can be utilized to modulate the cross section of FIG. 77.
Figure 78B:
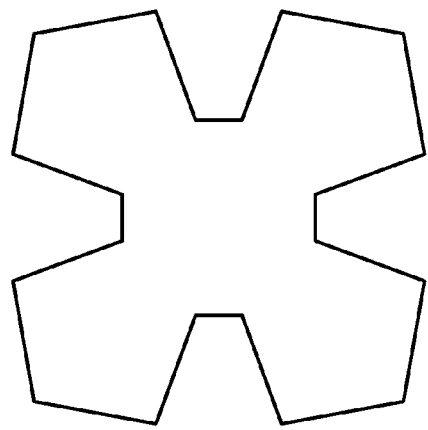
Figure 78C:
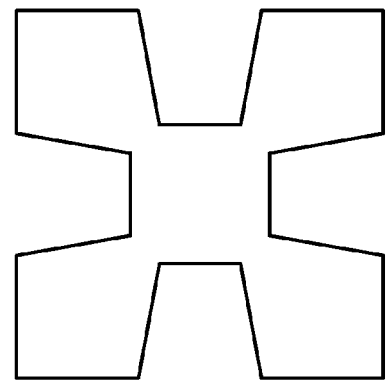
Figure 78D:
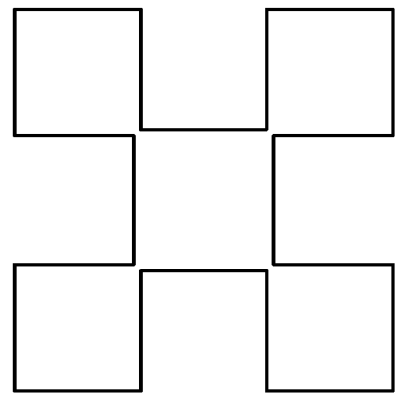
Figure 78E:
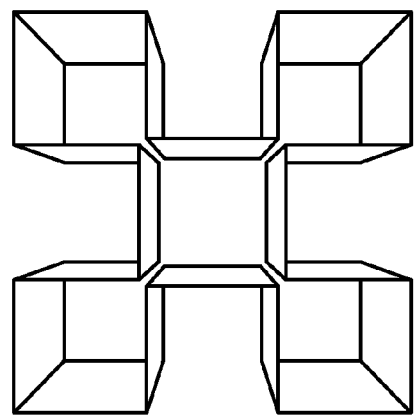

As shown in FIGS. 78A-78E, for example, in accordance with various embodiments of the present teachings, the lengths $S_1$-$S_{20}$ (see FIGS. 78A-78D) and thicknesses $T_1$-$T_{20}$ (see FIG. 78E showing tapered sides) of the sides and the angles $\vartheta_{i1}$-$\vartheta_{i12}$ of the internal angles and the angles $\vartheta_{e1}$-$\vartheta_{e8}$ of the external angles (see FIGS. 78A-78D) can be varied, as would be understood by one skilled in the art, for example in accordance with available packaging space within a vehicle. Those of ordinary skill in the art would understand, however, that FIGS. 78A-78E are exemplary only, and are provided merely to illustrate how design parameters can be utilized to modulate the cross section of the exemplary embodiment of FIG. 77. Thus, as above, the present teachings contemplate various twenty-cornered cross section configurations having various shapes and dimensions (i.e., corner bend radii, side lengths, thicknesses, internal angles and/or external angles), which can be adjusted based on space requirements and/or to control member collapse modes.

In certain embodiments of the present teachings, for example, a length of each side ($S_1$-$S_{20}$) can range from about 10 mm to about 200 mm. In certain additional embodiments, a thickness of the sides and corners can range from about 0.7 mm to about 6.0 mm; and in certain embodiments, the thickness of the sides is substantially the same as the thickness of the corners. Furthermore, in accordance with certain additional exemplary embodiments, the thickness of the strengthening member may vary, for example, within one side or from side to side to optimize the overall axial crush and bending performance.

In certain embodiments of the present teachings, each internal angle ($\vartheta_{i1}$-$\vartheta_{i12}$) ranges from about 25 degrees to about 145 degrees, and each external angle ($\vartheta_{e1}$-$\vartheta_{e8}$) ranges from about 25 degrees to about 150 degrees.

As above, to demonstrate the improved strength and performance features of a twenty-cornered cross section in accordance with the present teachings compared to various existing cross section designs, exemplary strengthening members were modeled and experimental test runs were conducted, as shown and described below with reference to FIGS. 79-83.

Figure 79:
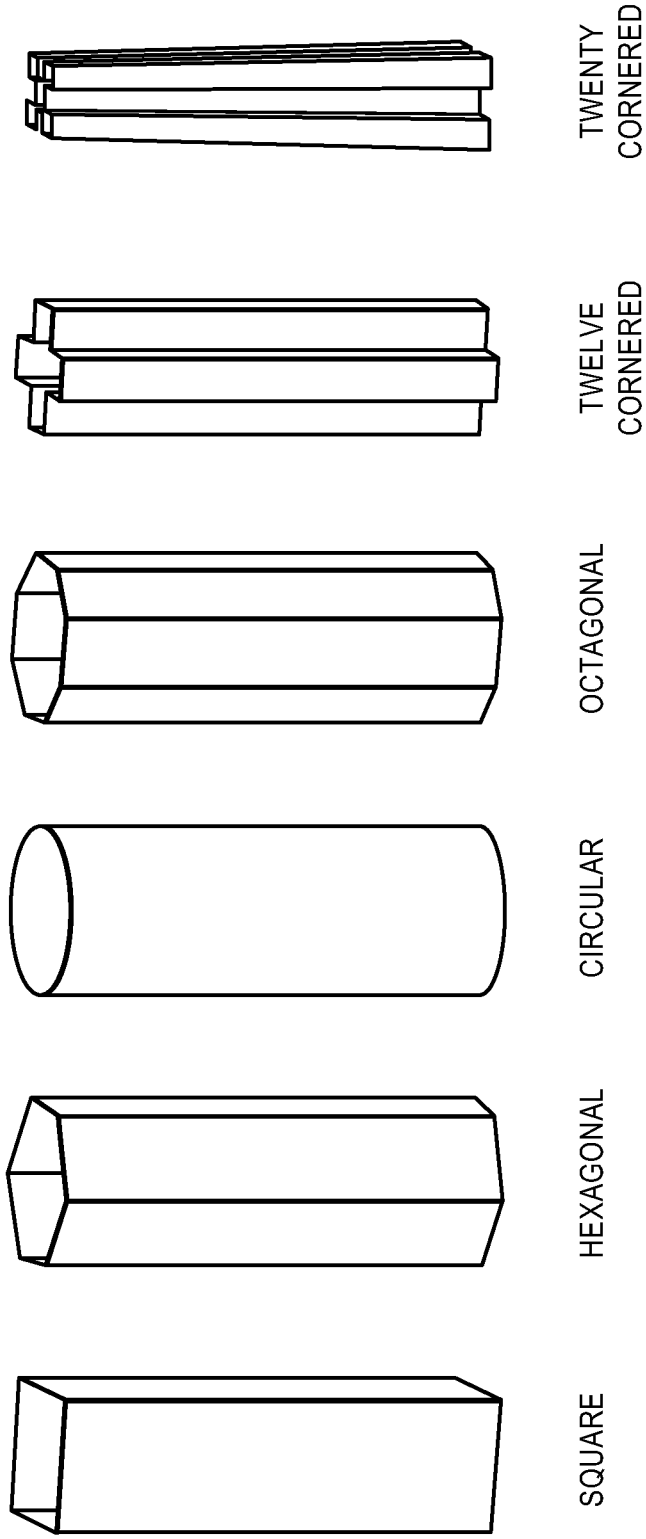
FIG. 79 illustrates strengthening members of varying cross sections having substantially the same thickness, length and perimeter.

Strengthening members of varying shapes (i.e., cross sections) having the same thickness, length and perimeter (e.g., each part having a mass of about 1.22 Kg) were modeled as illustrated in FIG. 79. Tests were then run for each member to simulate an impact with the same rigid mass (e.g. an impactor), impact speed, and initial kinetic energy. As shown in FIG. 80, the twenty-cornered cross section in accordance with the present teachings demonstrated the most stable axial collapse and the highest crash energy absorption. Furthermore, as shown in FIG. 81, the twenty-cornered cross section in accordance with the present teachings also demonstrated the shortest crush distance and smallest folding length.

Figure 82:
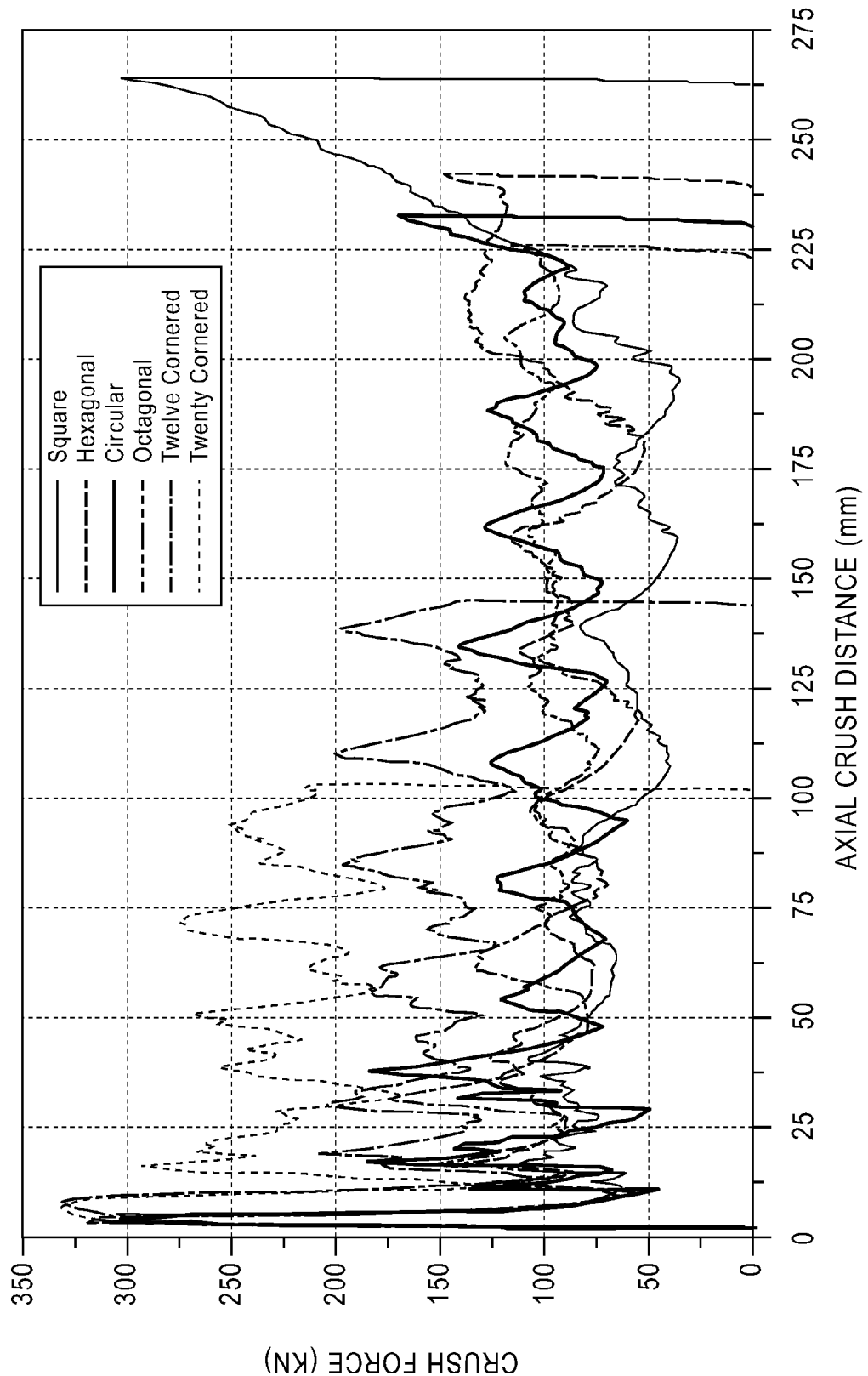
FIG. 82 is a graph of the crush force and associated axial crush distance for exemplary strengthening members having the cross sections shown in FIG. 79.

FIG. 82 illustrates the crush force (in KN) and associated axial crush distance (in mm) for the simulated impact, exerted axially on the exemplary strengthening members having the cross sections shown in FIG. 79. As shown in FIG. 82, the strengthening member having a twenty-cornered cross section could sustain a much higher crushing force for a given resulting crushing distance as compared with the square, hexagonal, circular, octagonal, and existing twelve-sided cross sections.

Figure 83:
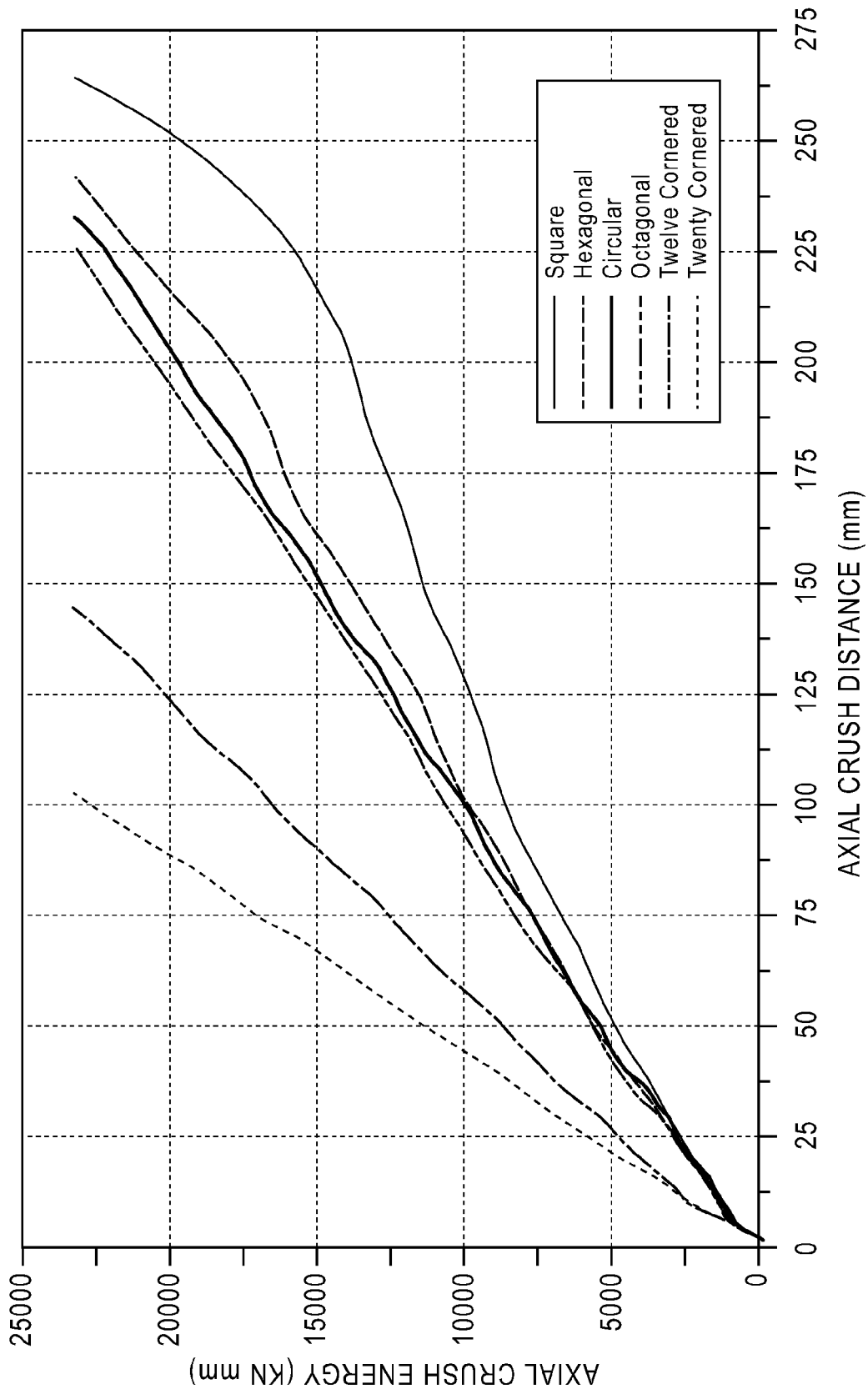
FIG. 83 is a graph of the axial crush energy and associated axial crush distance for exemplary strengthening members having the cross sections shown in FIG. 79.

FIG. 83 illustrates the axial crush energy (in KN-mm) and associated axial crush distance (in mm) for the exemplary strengthening members having the cross sections shown in FIG. 79. As shown in FIG. 83, the strengthening member having a twenty-cornered cross section could absorb the total kinetic energy of the impact (i.e., 22983 KN-mm) over a much shorter distance as compared with the square, hexagonal, circular, octagonal, and existing twelve-cornered cross sections.

As above, to further demonstrate the improved strength and performance features of a twenty-cornered cross section in accordance with the present teachings compared to basic twenty-sided cross section designs, exemplary strengthening members were modeled and experimental test runs were conducted, as shown and described below with reference to FIGS. 84-88.

Strengthening members of varying shapes (i.e., twenty-sided cross sections) having the same thickness, length and perimeter (e.g., each part having a mass of about 1.22 Kg) were modeled as illustrated in FIG. 84. As above, tests were then run for each member to simulate an impact with the same rigid mass (e.g. an impactor), impact speed, and initial kinetic energy. As shown in FIG. 85, the twenty-cornered cross section in accordance with the present teachings demonstrated the most stable axial collapse and the highest crash energy absorption. Furthermore, as shown in FIG. 86, the twenty-cornered cross section in accordance with the present teachings also demonstrated the shortest crush distance and smallest folding length.

Figure 87:
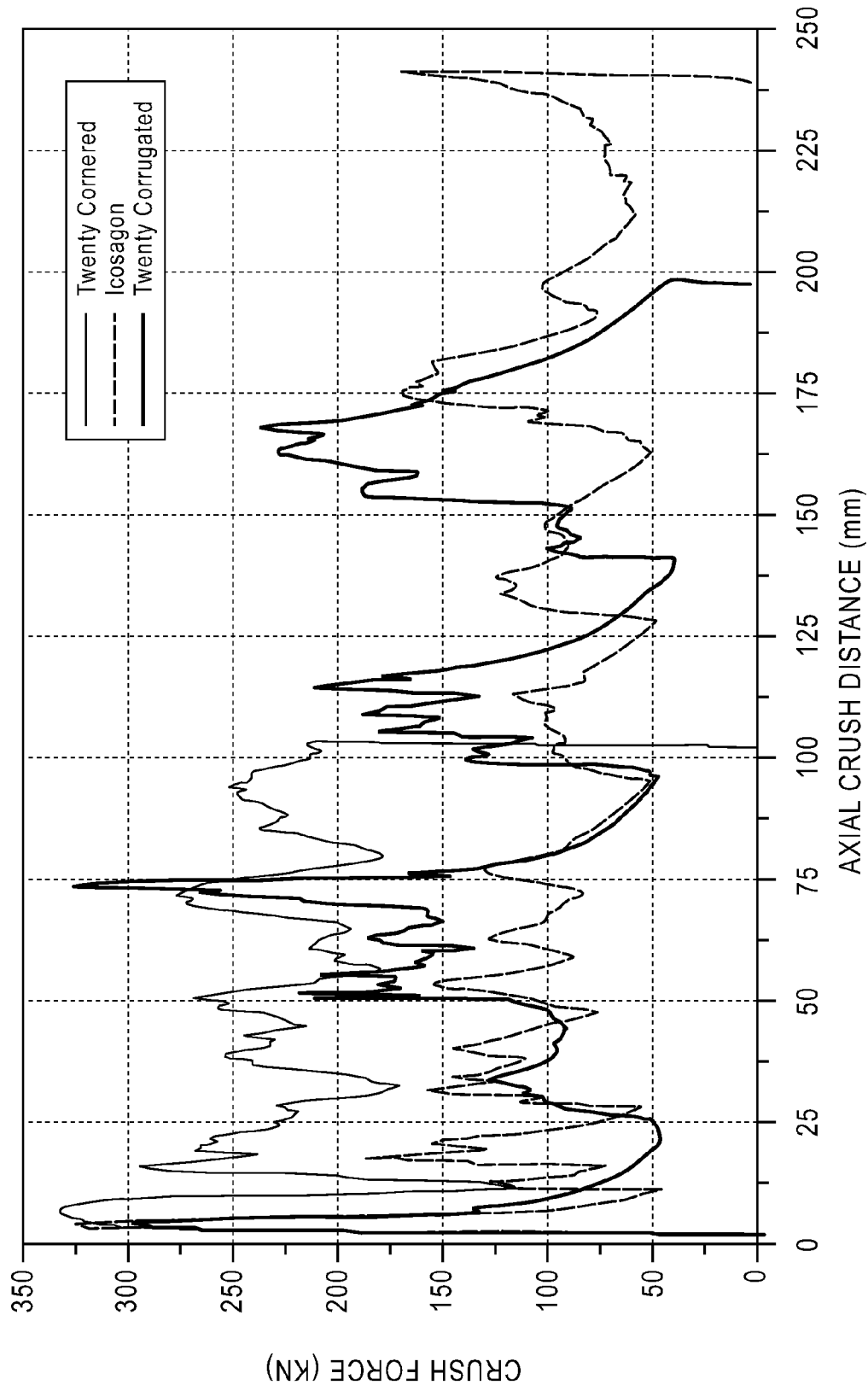
FIG. 87 is a graph of the crush force and associated axial crush distance for exemplary strengthening members having the cross sections shown in FIG. 84.

FIG. 87 illustrates the crush force (in KN) and associated axial crush distance (in mm) for the simulated impact, exerted axially on the exemplary strengthening members having the cross sections shown in FIG. 84. As shown in FIG. 87, once again, the strengthening member having a twenty-cornered cross section in accordance with the present teachings could sustain a much higher crushing force for a given resulting crushing distance as compared with the other twenty-sided cross sections (i.e., the basic twenty-sided polygon (icosagon) and twenty-sided corrugated polygon). In fact, the twenty-cornered cross section in accordance with the present teachings achieved about a 60% to about 70% increase in crash energy absorption as compared with the icosagon.

Figure 88:
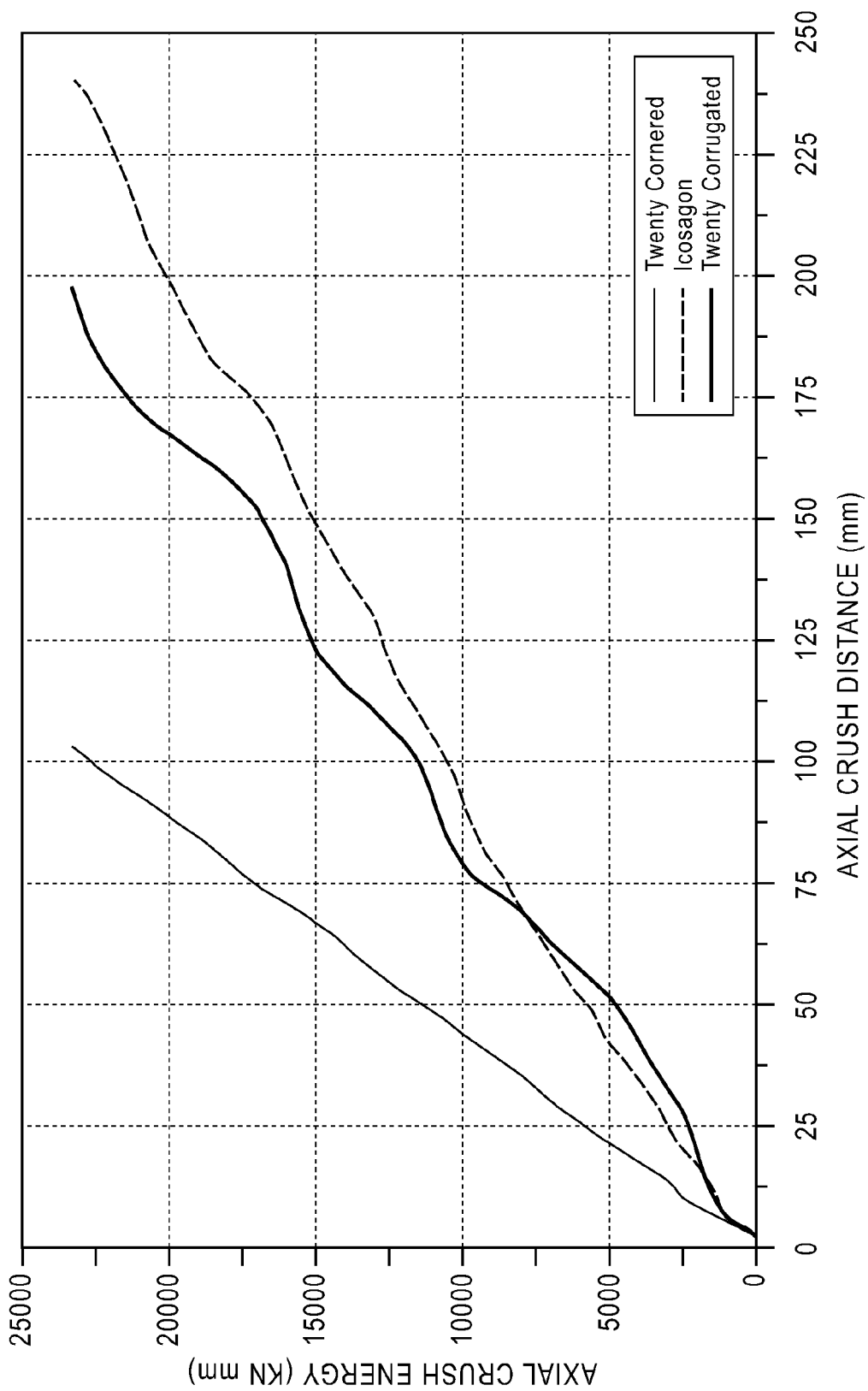
FIG. 88 is a graph of the axial crush energy and associated axial crush distance for exemplary strengthening members having the cross sections shown in FIG. 84.

FIG. 88 illustrates the axial crush energy (in KN-mm) and associated axial crush distance (in mm) for the exemplary strengthening members having the cross sections shown in FIG. 84. As shown in FIG. 88, once again, the strengthening member having a twenty-cornered cross section in accordance with the present teachings could absorb the total kinetic energy of the impact (i.e., 22983 KN-mm) over a much shorter distance as compared with the other twenty-sided cross sections. In fact, the twenty-cornered cross section in accordance with the present teachings absorbed the full axial crush energy in about 43% of the axial crush distance as the icosagon.

Twenty-cornered cross sections in accordance with the present teachings may, therefore, allow improved impact energy management over, for example, basic polygonal strengthening member cross sections, including basic twenty-sided polygonal cross sections, while minimizing mass per unit length.

Thus, as illustrated by the above exemplary embodiments, strengthening members in accordance with the present teachings are configured to achieve strength increases (i.e., load carrying and energy absorption) over basic polygonal designs (including polygonal strengthening member cross sections having the same number of sides), while also permitting flexibility in design to better meet vehicle space requirements. Strengthening members in accordance with the present teachings may, therefore, be used to replace existing strengthening member cross section designs (both traditional and non-traditional). While the present teachings have been disclosed in terms of exemplary embodiments in order to facilitate a better understanding, it should be appreciated that the present teachings can be embodied in various ways without departing from the scope thereof. Therefore, the invention should be understood to include all possible embodiments which can be embodied without departing from the scope of the invention set out in the appended claims.

Various exemplary embodiments of the present teachings contemplate, for example, strengthening members with corners having different bend radii, with non-uniform cross sections (e.g., having non-symmetrical shapes), and/or with sides having variable thicknesses (i.e., having tapered sides). Various additional exemplary embodiments contemplate strengthening members that are bent and/or curved. Moreover, to further adjust a member's folding pattern and/or peak load capacity, various additional exemplary embodiments also contemplate strengthening members having trigger holes, flanges, and/or convolutions as would be understood by those of ordinary skill in the art.

Furthermore, multi-cornered strengthening members in accordance with the present teachings are contemplated for use with a number of structural members, such as, for example, crush cans, front rails, mid-rails, rear rails, side rails, shotguns, cross members, roof structures, beltline tubes, door beams, pillars, internal reinforcements, and other components that can benefit from increased crash energy absorption. In addition, the present teachings can be applied to both body-on-frame and unitized vehicles, or other types of structures. Thus, depending on application, embodiments of the present teachings will have varied shapes (i.e. various cross sections) to accommodate specific member space constraints. When used as a vehicle front rail, for example, to achieve optimized axial crush performance, the lengths and thicknesses of the sides and/or angles of the corners can all be adjusted (tuned) to provide optimal strength, size and shape to meet engine compartment constraints.

Although various exemplary embodiments described herein have been described as configured to be used with automotive vehicles, it is envisioned that the various strengthening members in accordance with the present teachings may be configured for use with other types of vehicles and/or structures, for which it may be desirable to provide increased crash energy absorption. Thus, it will be appreciated by those of ordinary skill in the art having the benefit of this disclosure that the present teachings provide strengthening members for various applications. Further modifications and alternative embodiments of various aspects of the present teachings will be apparent to those skilled in the art in view of this description.

It is to be understood that the particular examples and embodiments set forth herein are non-limiting, and modifications to structure, dimensions, materials, and methodologies may be made without departing from the scope of the present teachings.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A strengthening member for an automotive vehicle, the strengthening member comprising an eight-cornered cross section including sides and corners, the sides comprising four straight sides and four curved sides, wherein a length of each straight side ranges from about 10 mm to about 200 mm and a length of each curved side ranges from about 10 mm to about 200 mm.

2. The strengthening member of claim 1, wherein the curved sides are semi-circular.

3. The strengthening member of claim 1, wherein the curved sides are semi-elliptical.

4. The strengthening member of claim 1, wherein the corners of the cross section have substantially the same thickness as the sides of the cross section.

5. The strengthening member of claim 1, wherein a thickness of the sides and corners ranges from about 0.7 mm to about 6.0 mm.

6. A strengthening member for an automotive vehicle, the strengthening member comprising a twelve-cornered cross section including sides and corners, the sides comprising eight straight sides and four curved sides, wherein a length of each straight side ranges from about 10 mm to about 200 mm and a length of each curved side ranges from about 10 mm to about 200 mm.

7. The strengthening member of claim 6, wherein the curved sides are semi-circular.

8. The strengthening member of claim 6, wherein the curved sides are semi-elliptical.

9. The strengthening member of claim 6, wherein the sides and corners create twelve internal angles, wherein each internal angle ranges from about 60 degrees to about 145 degrees.

10. The strengthening member of claim 6, wherein the corners of the cross section have substantially the same thickness as the sides of the cross section.

11. The strengthening member of claim 6, wherein a thickness of the sides and corners ranges from about 0.7 mm to about 6.0 mm.

12. A strengthening member for an automotive vehicle, the strengthening member comprising a fourteen-cornered cross section including sides and corners creating twelve internal angles and two external angles,
wherein each internal angle ranges from about 95 degrees to about 145 degrees and each external angle ranges from about 5 degrees to about 130 degrees, and
wherein the strengthening member has a substantially uniform cross-section or has a continuous taper along a substantial length of the strengthening member from a first end of the strengthening member to a second end of the strengthening member.

13. The strengthening member of claim 12, wherein a length of each side ranges from about 5 mm to about 200 mm.

14. The strengthening member of claim 12, wherein the corners of the cross section have substantially the same thickness as the sides of the cross section.

15. The strengthening member of claim 12, wherein a thickness of the sides and corners ranges from about 0.7 mm to about 6.0 mm.

16. A strengthening member for an automotive vehicle, the strengthening member comprising a sixteen-cornered cross section including sides and corners creating twelve internal angles and four external angles,
wherein each internal angle ranges from about 25 degrees to about 145 degrees and each external angle ranges from about 25 degrees to about 150 degrees, and
wherein the strengthening member has a substantially uniform cross-section or has a continuous taper along a substantial length of the strengthening member from a first end of the strengthening member to a second end of the strengthening member.

17. The strengthening member of claim 16, wherein a length of each side ranges from about 5 mm to about 200 mm.

18. The strengthening member of claim 16, wherein the corners of the cross section have substantially the same thickness as the sides of the cross section.

19. The strengthening member of claim 16, wherein a thickness of the sides and corners ranges from about 0.7 mm to about 6.0 mm.

20. A strengthening member for an automotive vehicle, the strengthening member comprising a twenty-cornered cross section including sides and corners creating twelve internal angles and eight external angles, wherein each internal angle ranges from about 25 degrees to about 145 degrees and each external angle ranges from about 25 degrees to about 150 degrees.

21. The strengthening member of claim 20, wherein a length of each side ranges from about 5 mm to about 200 mm.

22. The strengthening member of claim 20, wherein the corners of the cross section have substantially the same thickness as the sides of the cross section.

23. The strengthening member of claim 20, wherein a thickness of the sides and corners ranges from about 0.7 mm to about 6.0 mm.

24. The strengthening member of claim 1, wherein the eight-cornered cross section has no external angles.

25. The strengthening member of claim 6, wherein the twelve-cornered cross section has no external angles.

\* \* \* \* \*